Apr. 3, 1923.

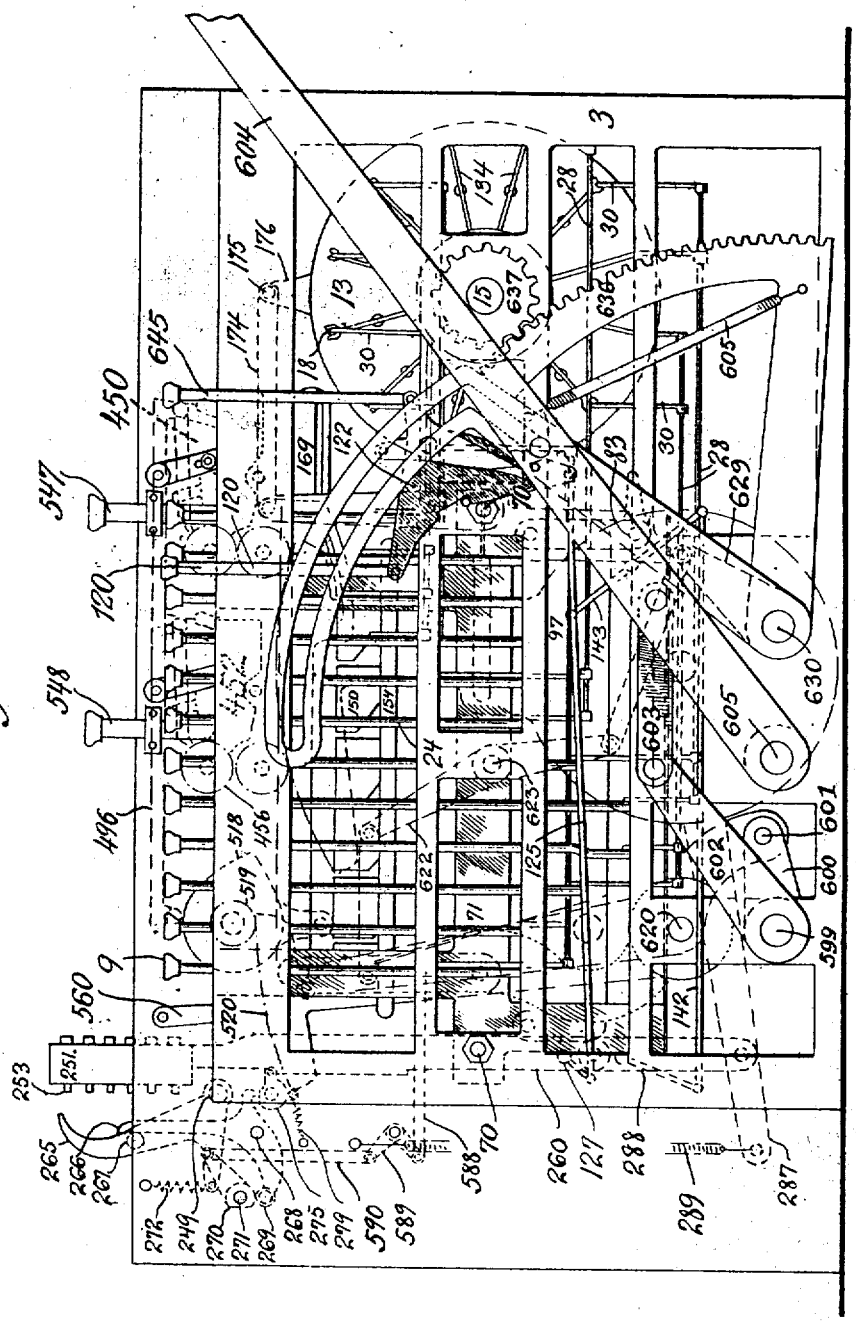

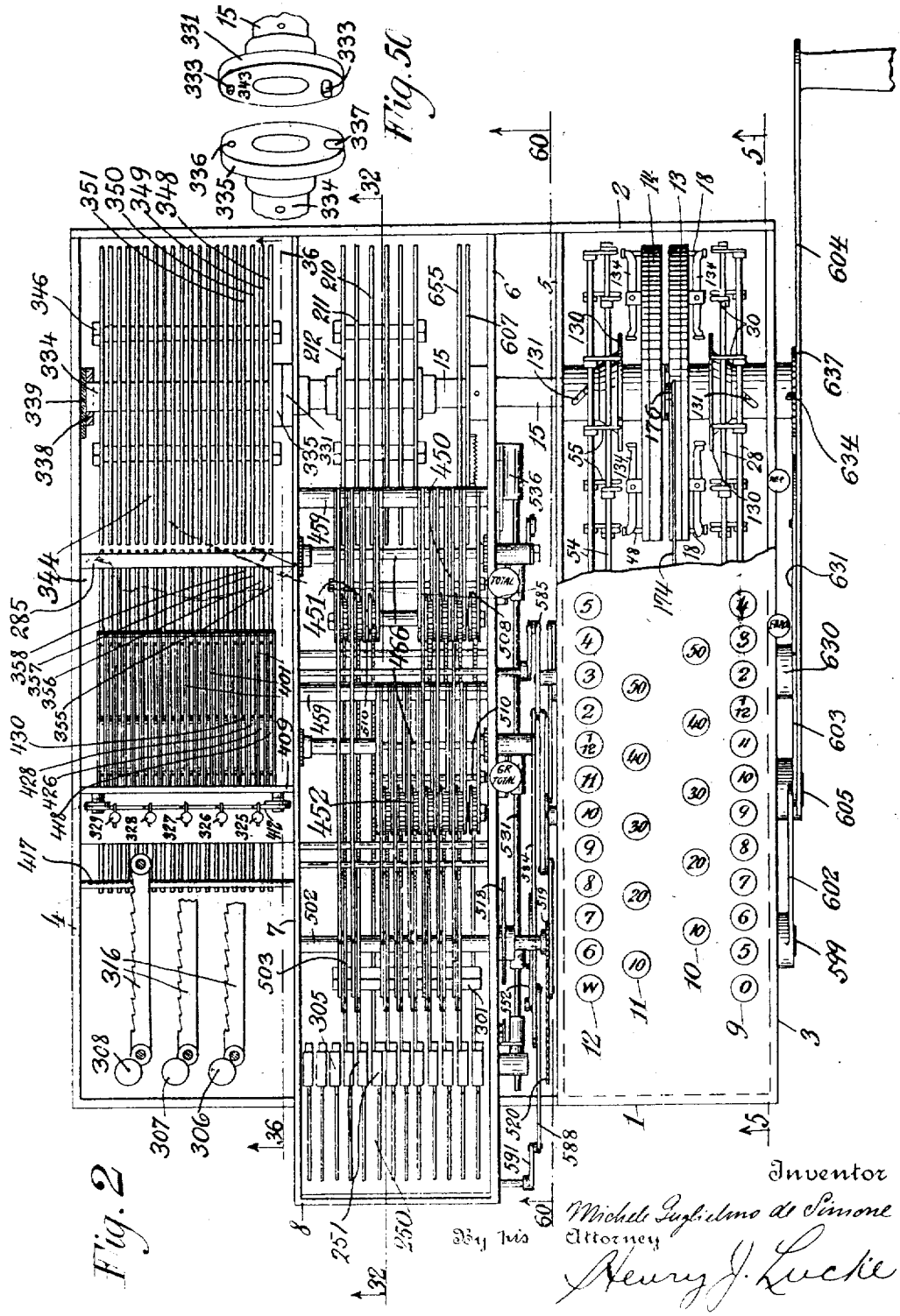

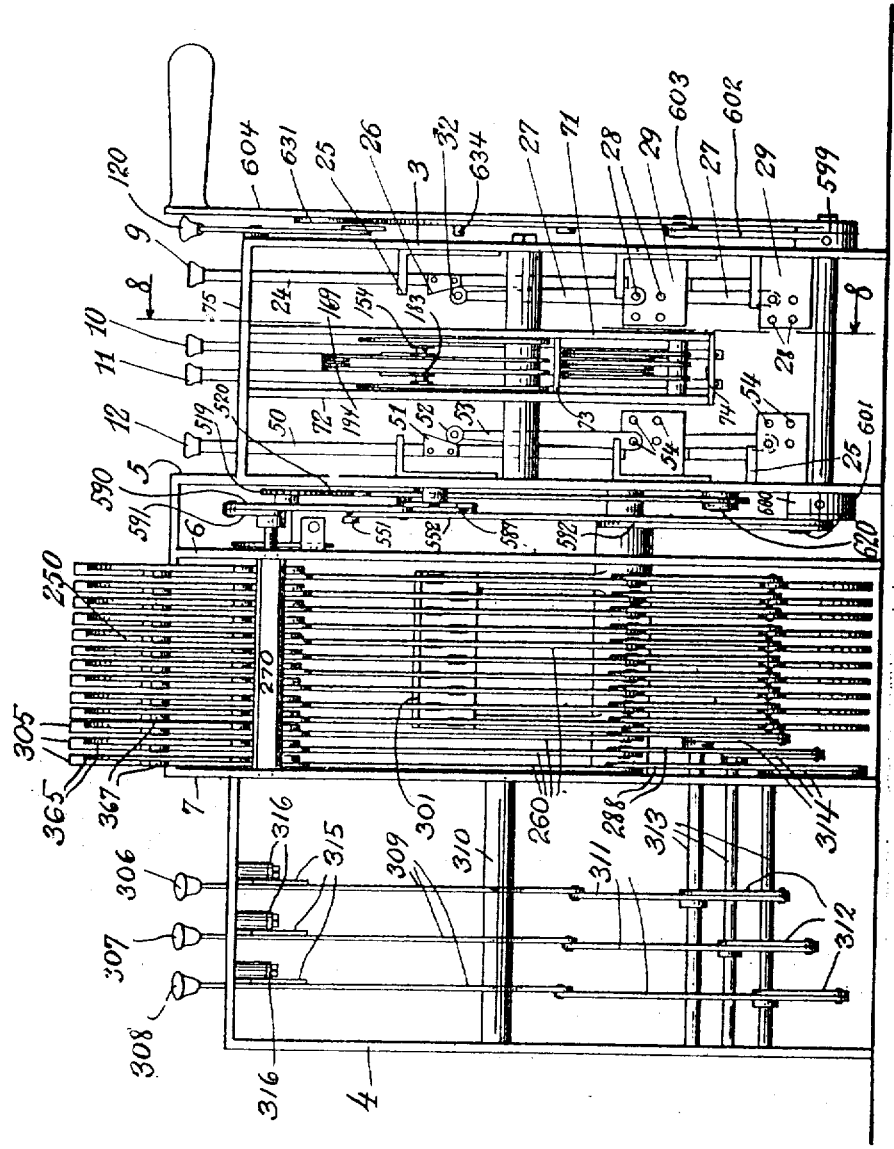

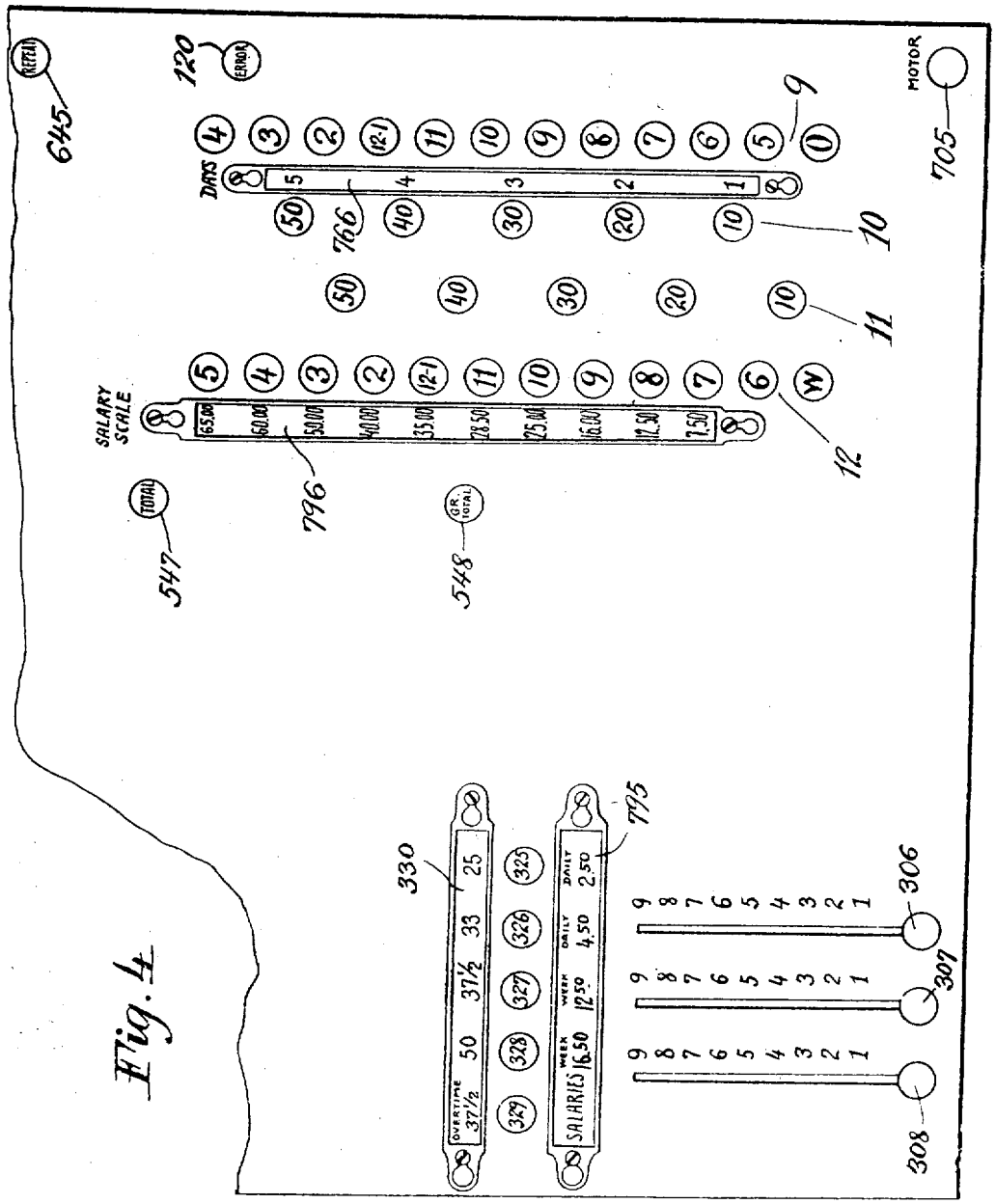

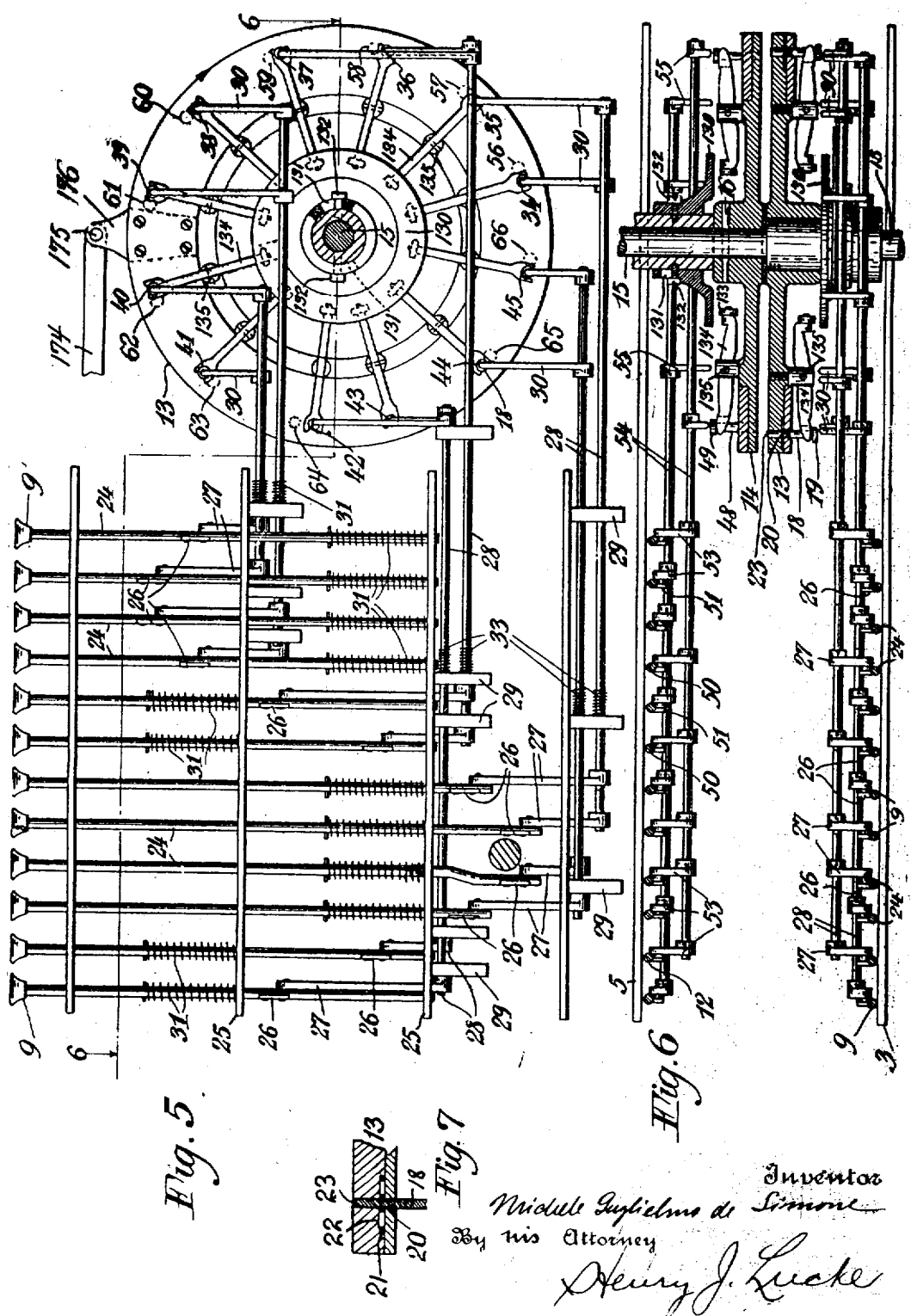

M. G. DE SIMONE

CALCULATING MACHINE

Filed June 17, 1918   30 sheets-sheet 6

1,450,718

Inventor
Michele Guglielmo de Simone
By his Attorney
Henry J. Lucke

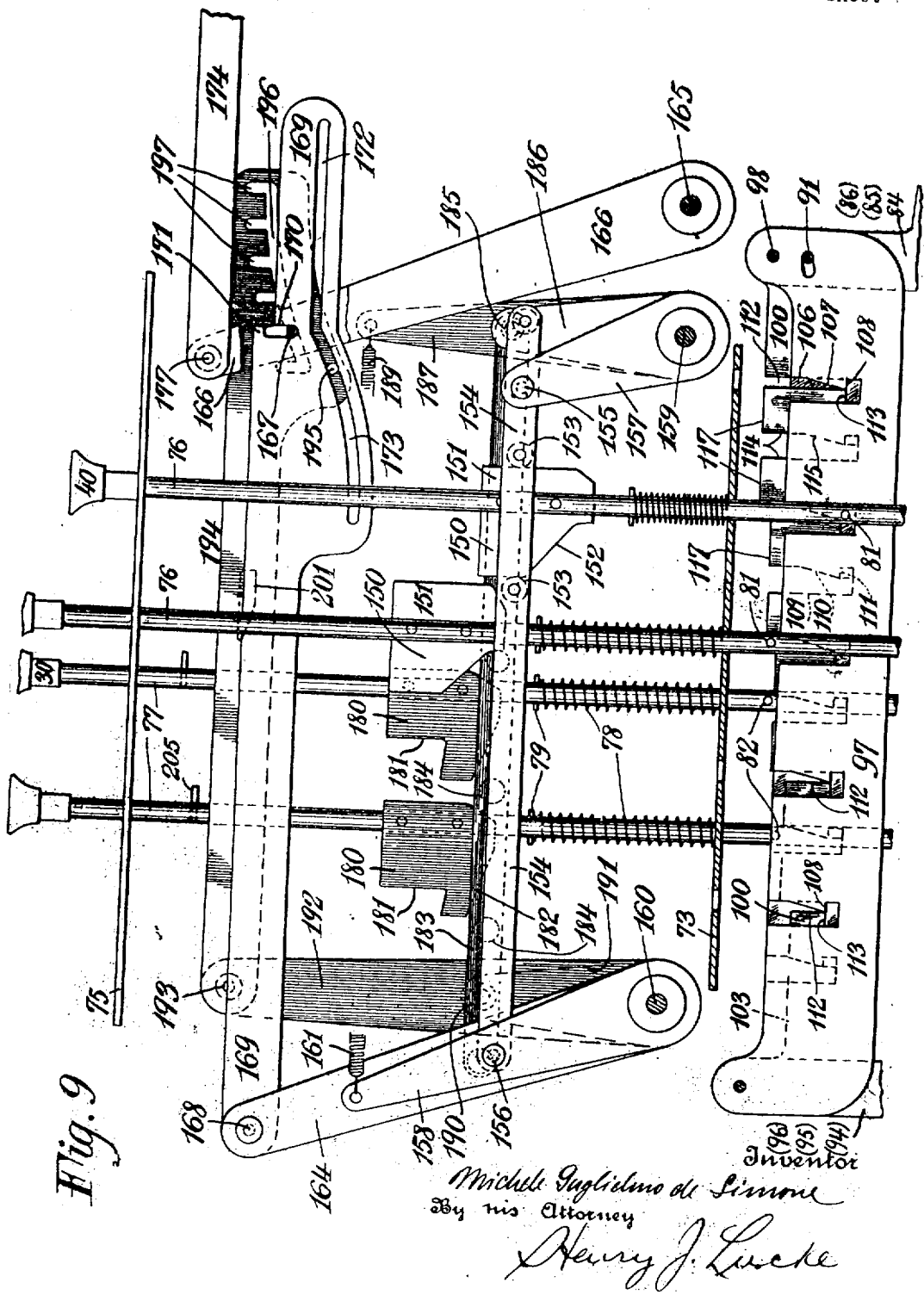

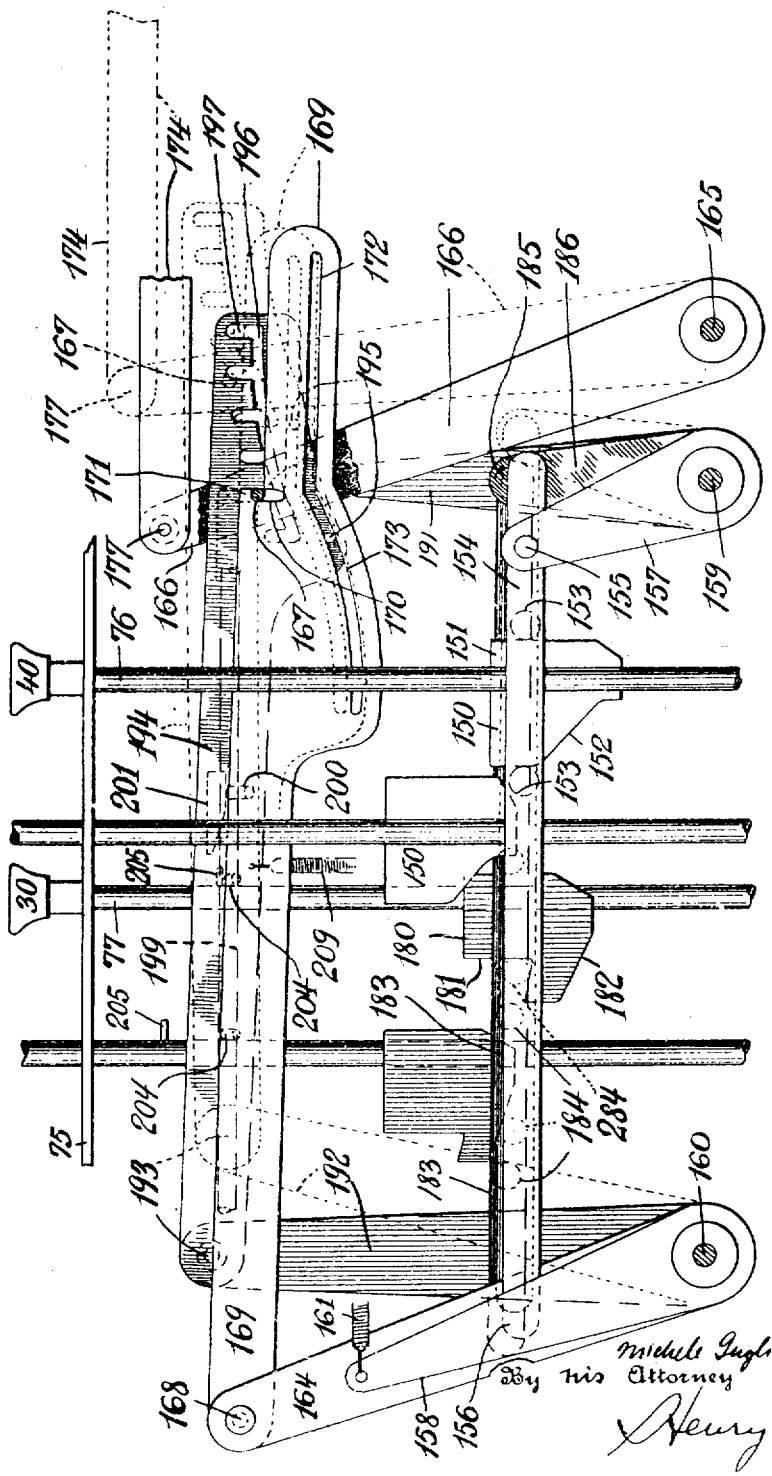

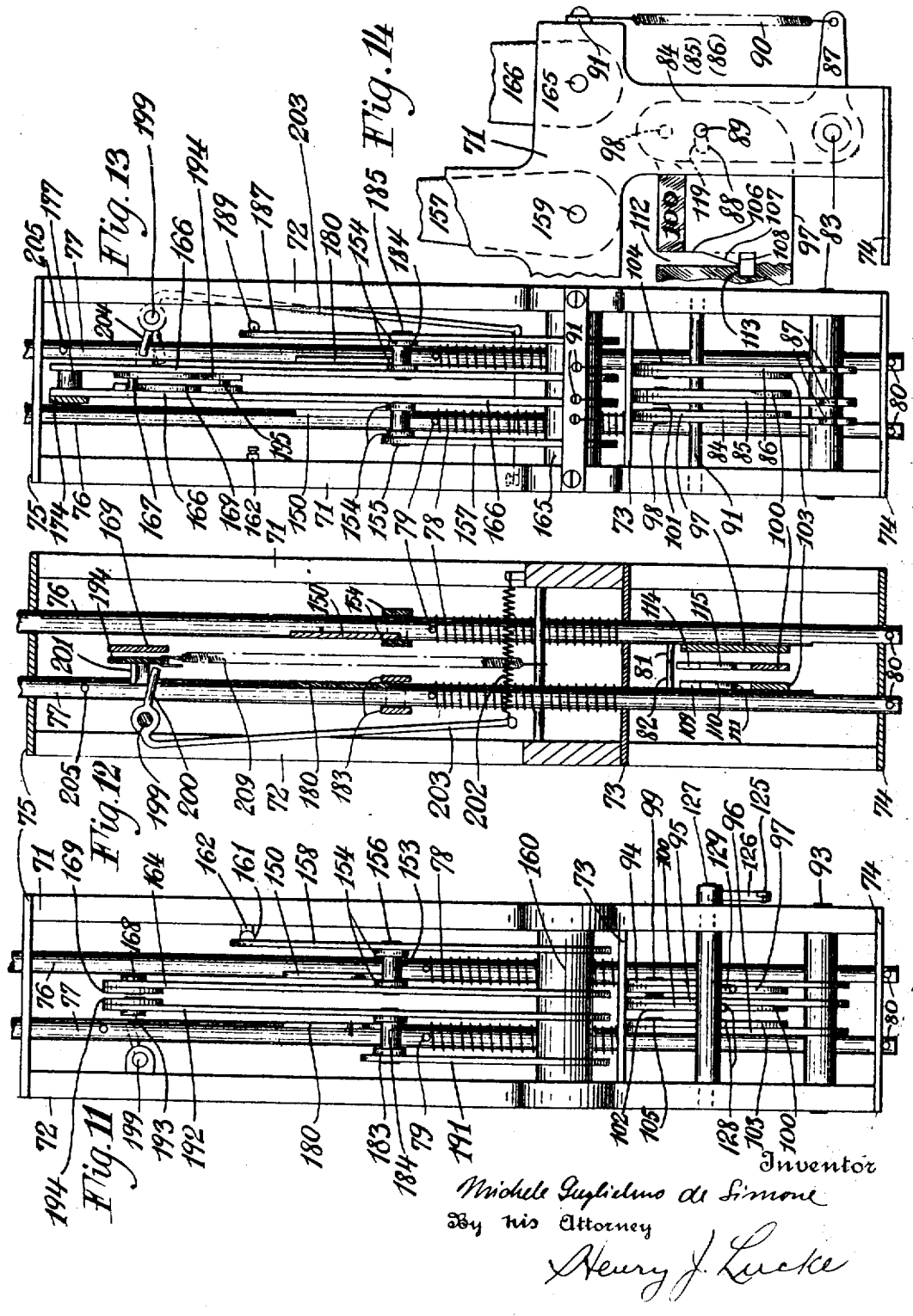

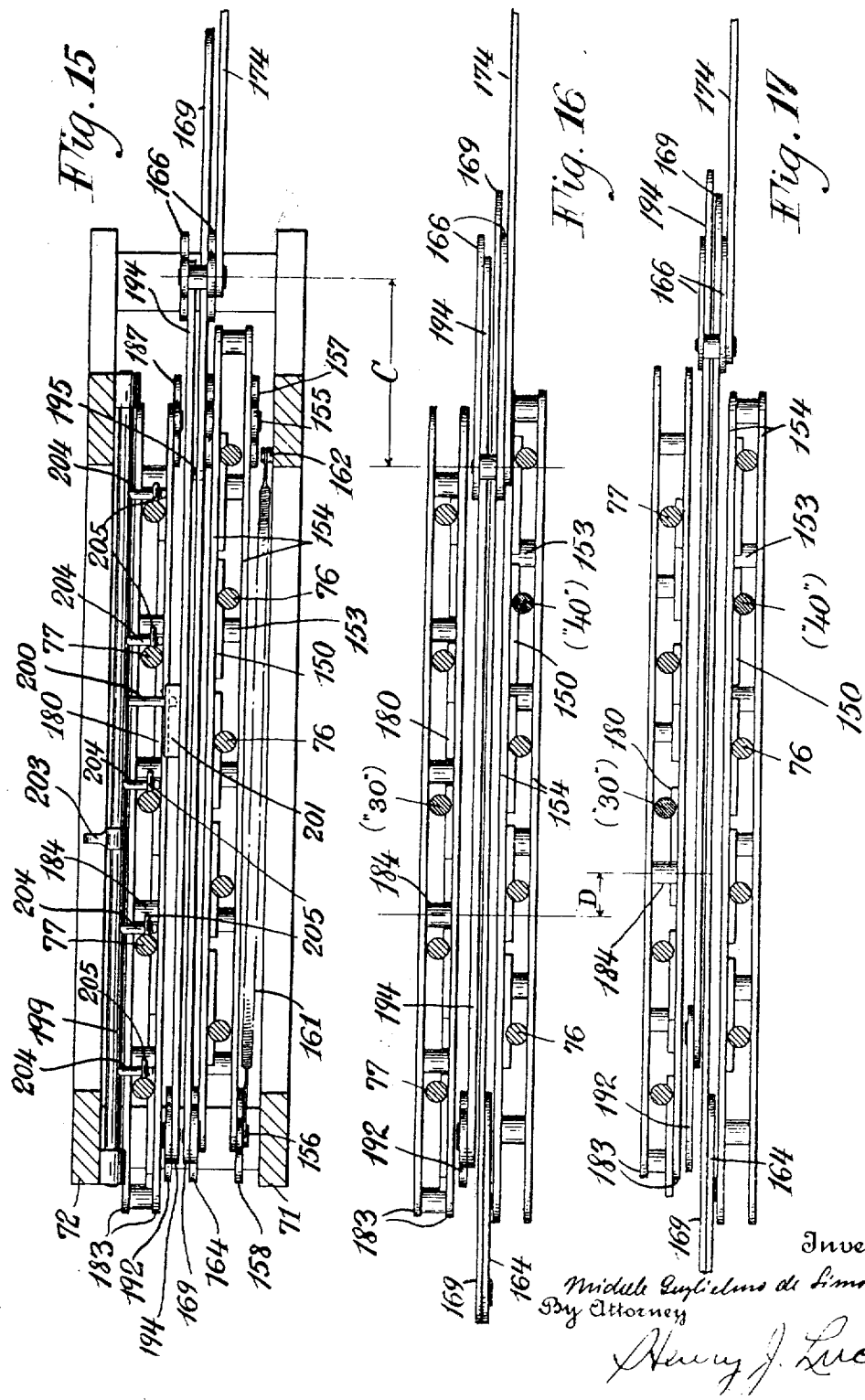

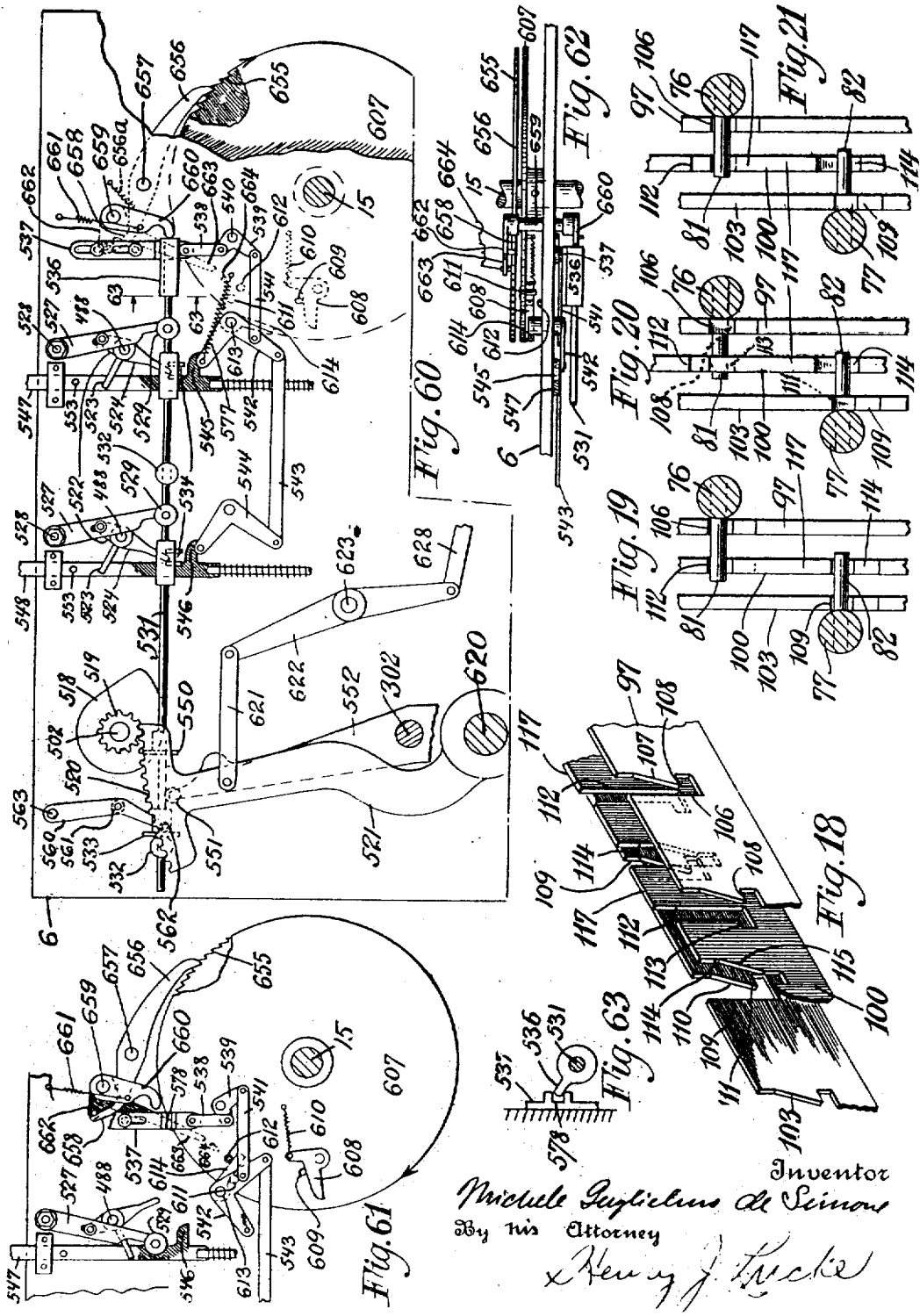

Apr. 3, 1923.
M. G. DE SIMONE
1,450,718
CALCULATING MACHINE
Filed June 17, 1918   30 sheets-sheet 13
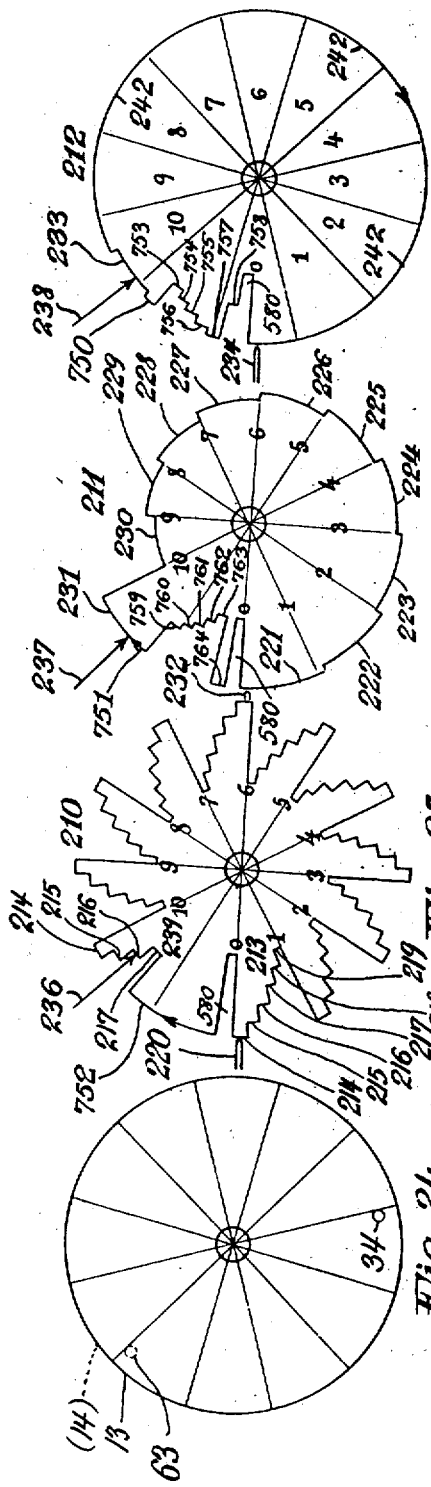
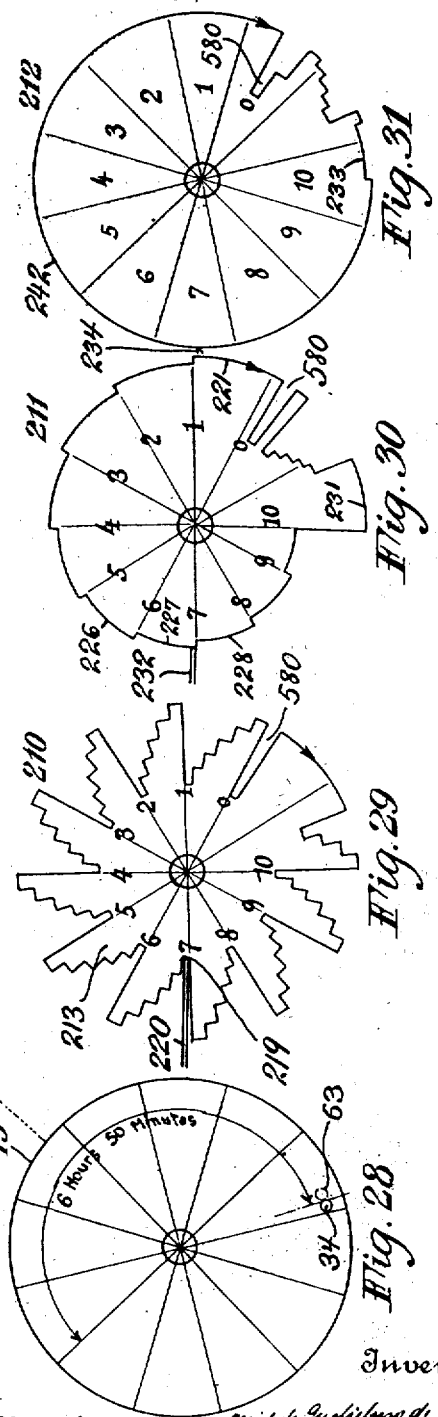
Inventor
Michele Guglielmo de Simone
By his Attorney
Henry J. Lucke

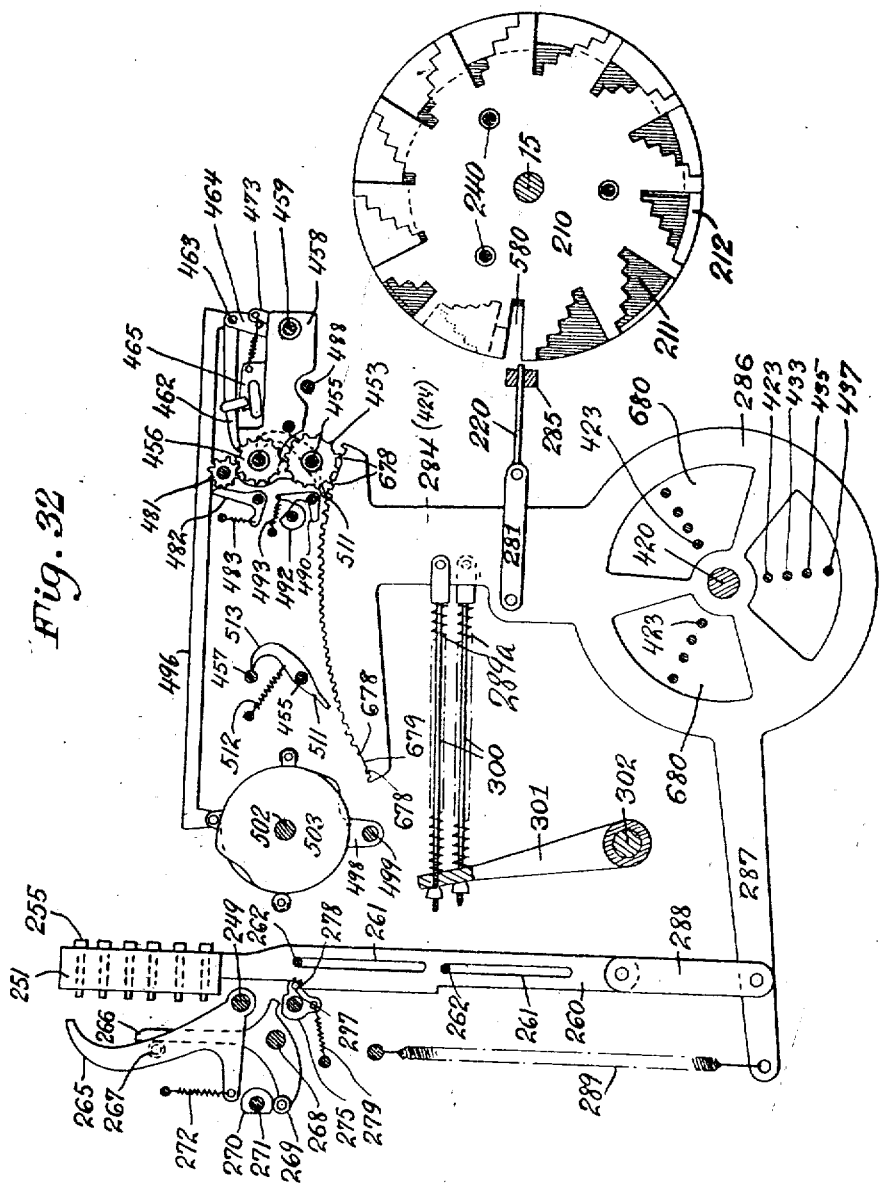

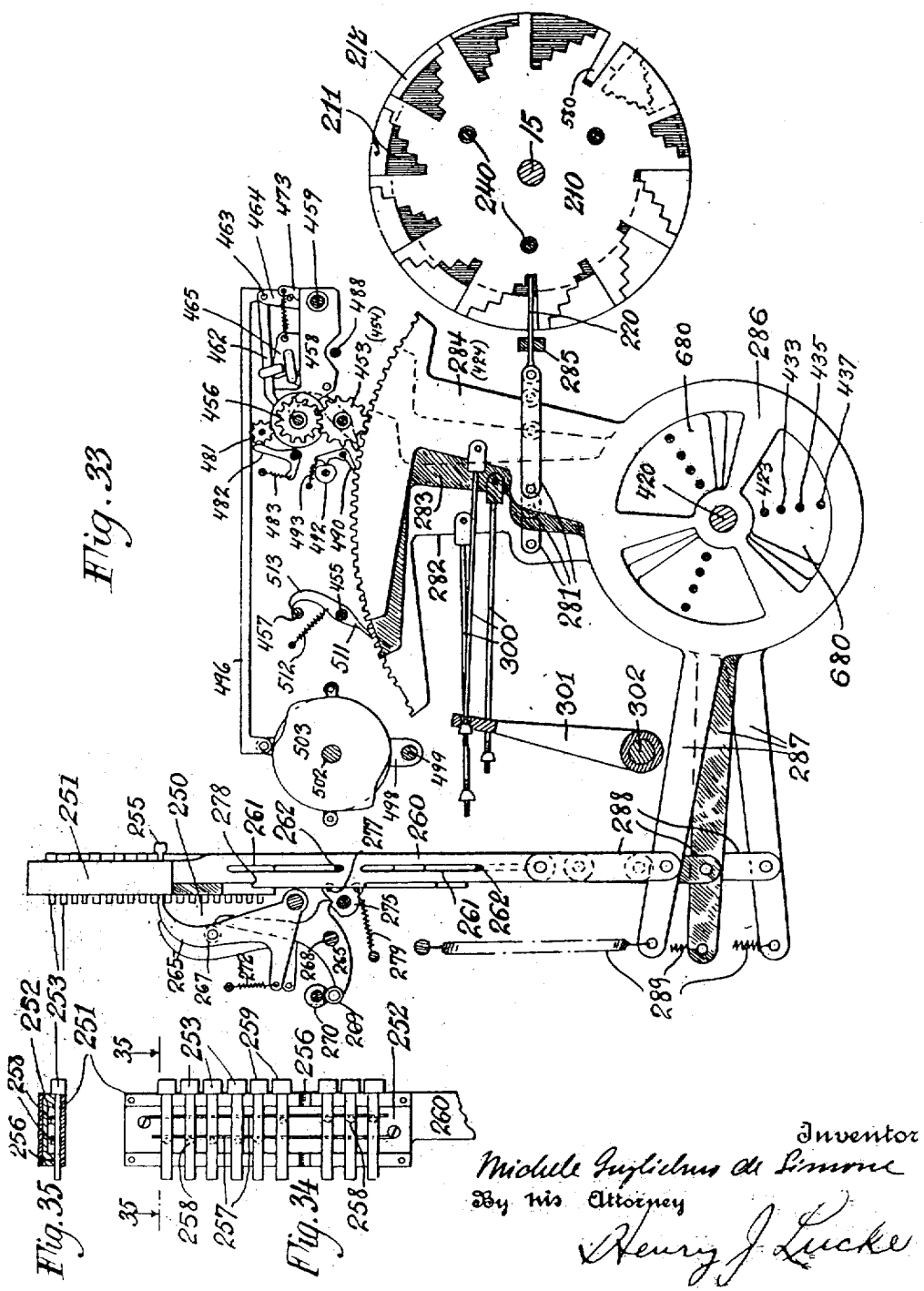

Apr. 3, 1923. 1,450,718
M. G. DE SIMONE
CALCULATING MACHINE
Filed June 17, 1918 30 sheets-sheet 16
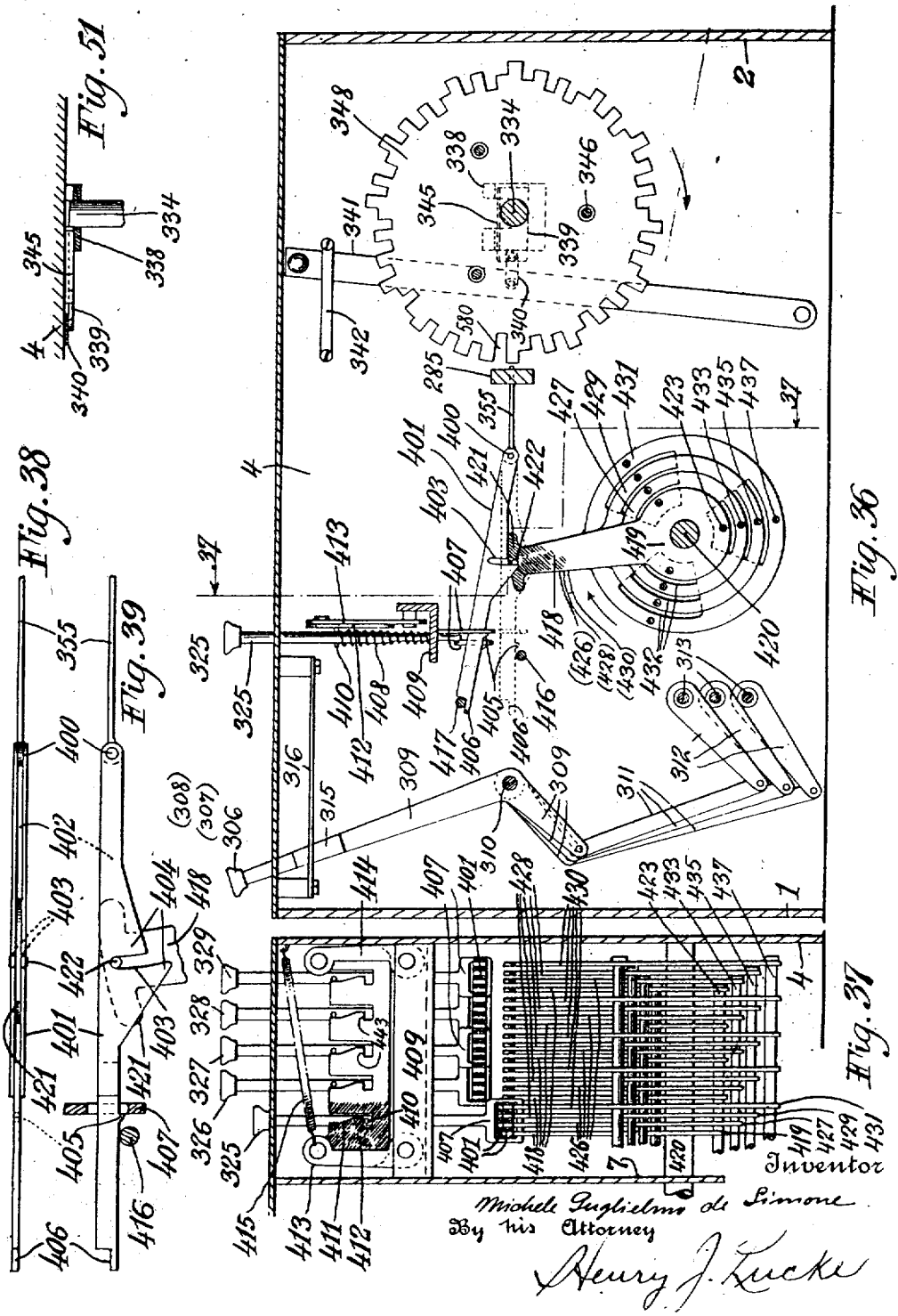
Inventor
Michele Guglielmo de Simone
By his Attorney
Henry J. Lucke

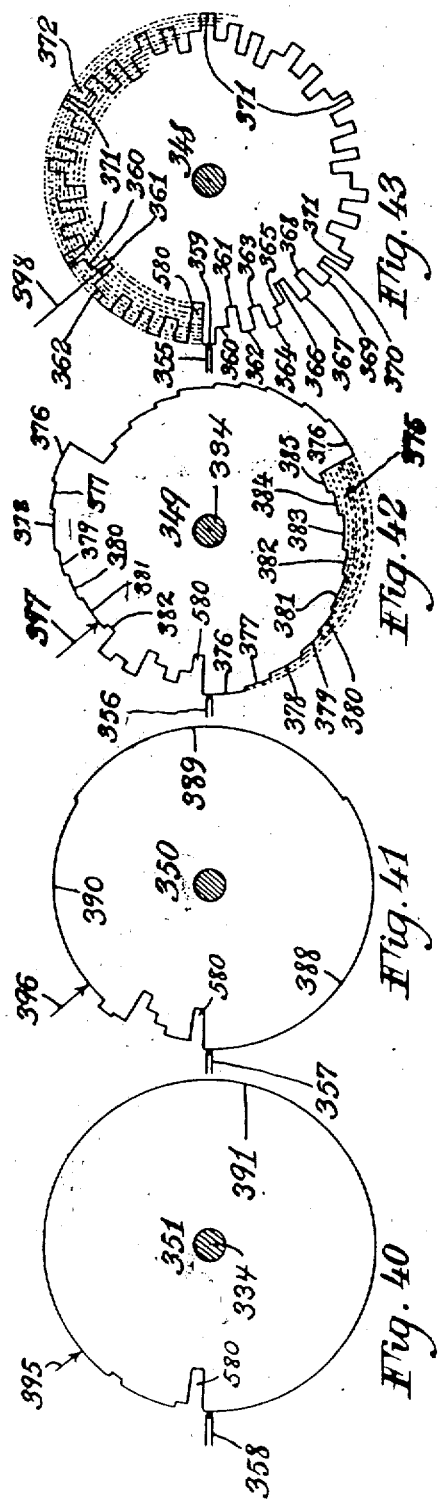

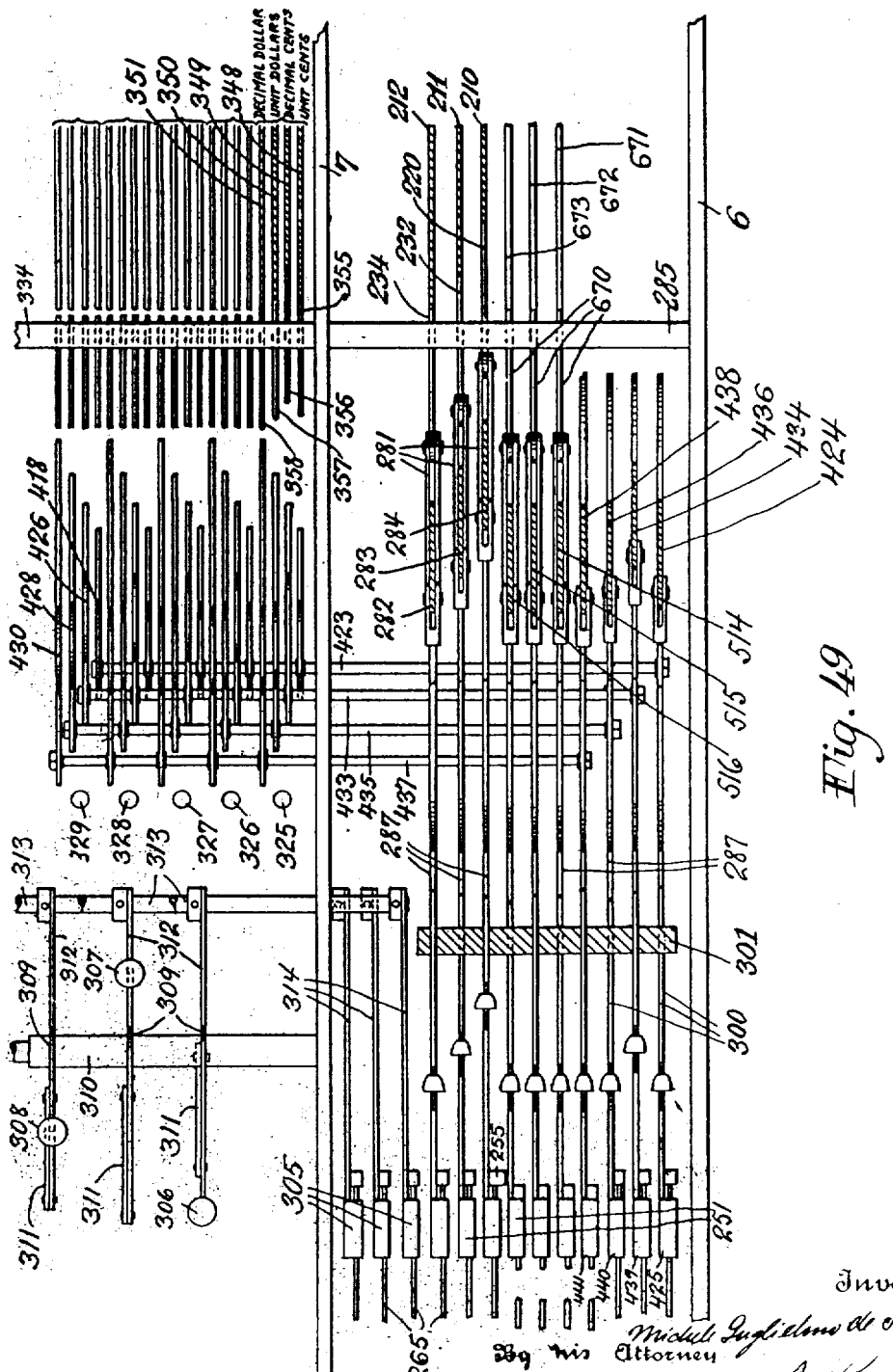

Apr. 3, 1923.  
M. G. DE SIMONE  
CALCULATING MACHINE  
Filed June 17, 1918  
1,450,718  
30 sheets-sheet 20
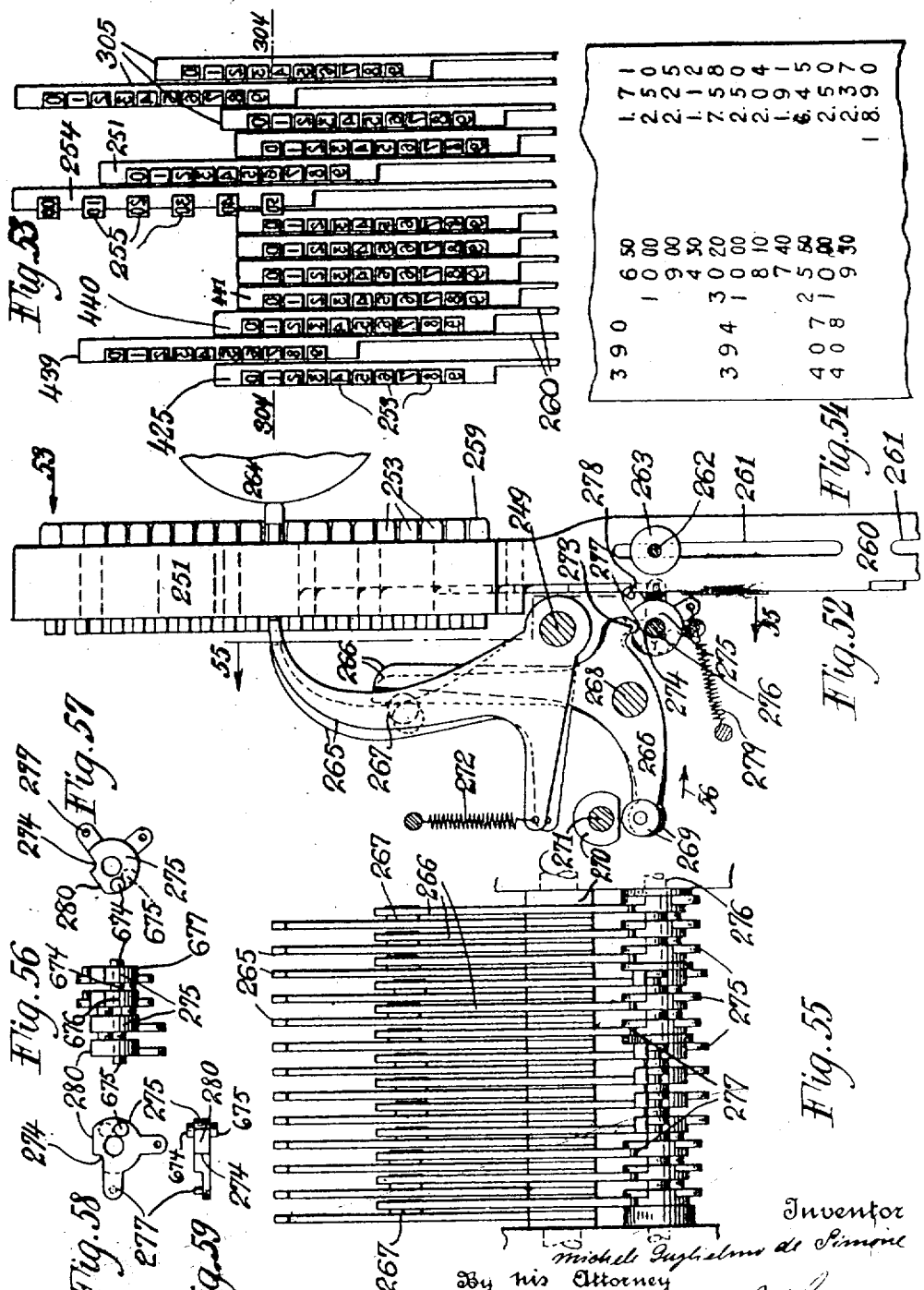

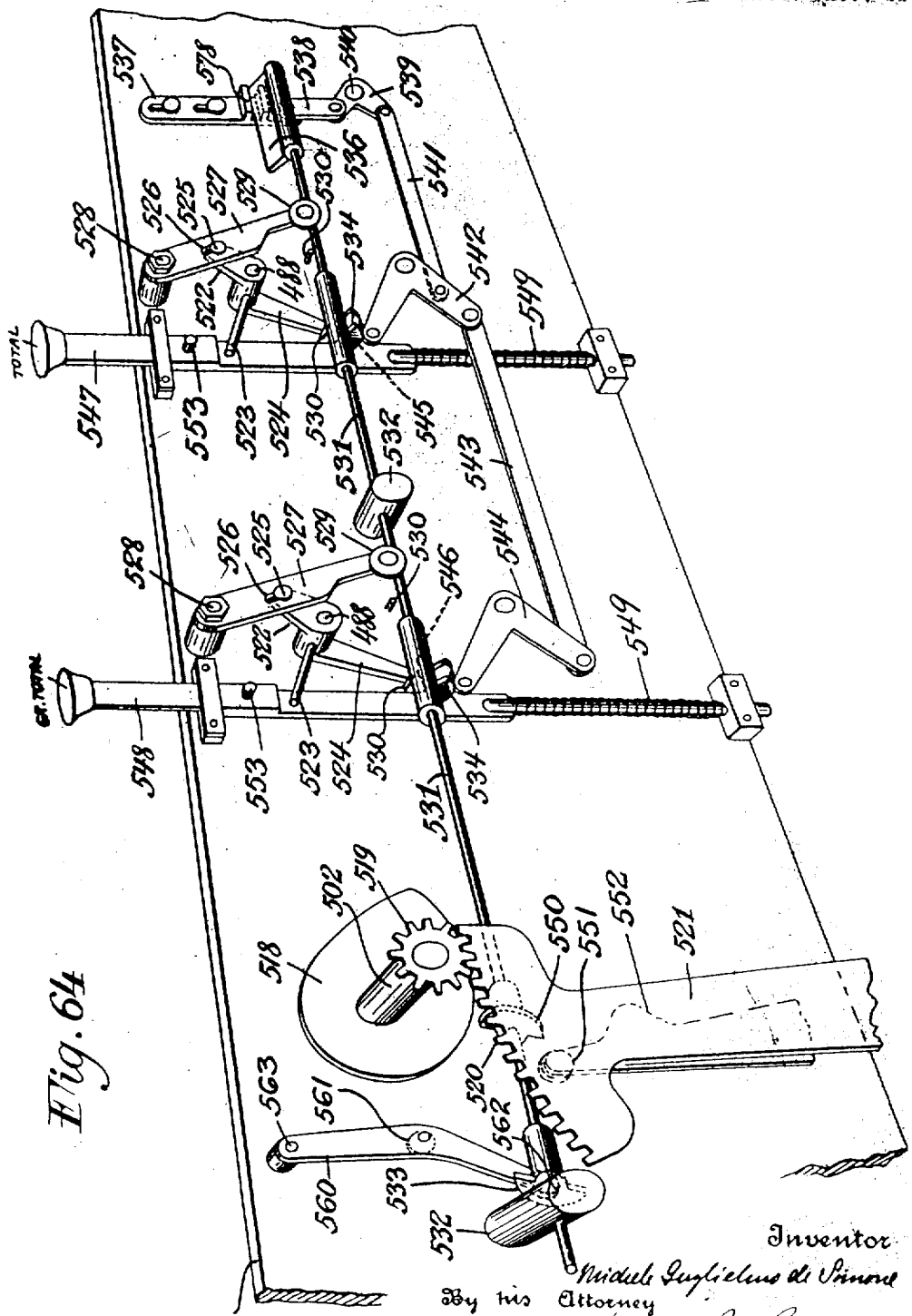

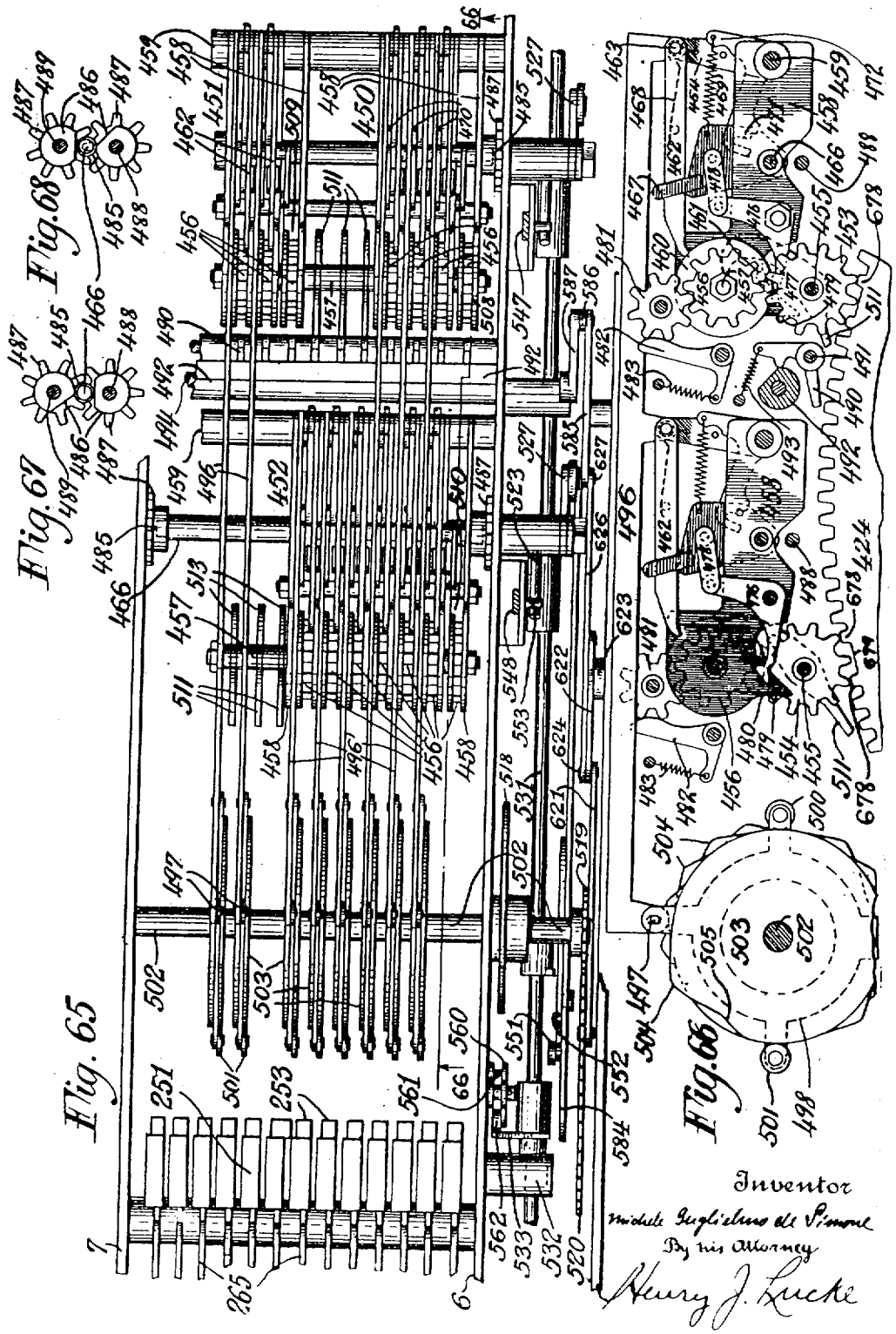

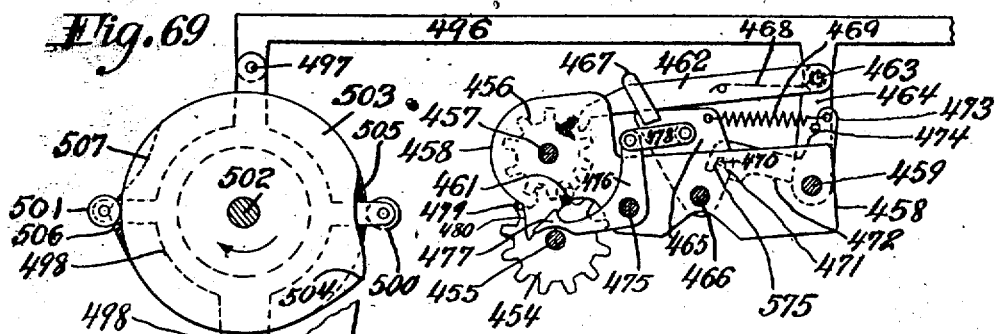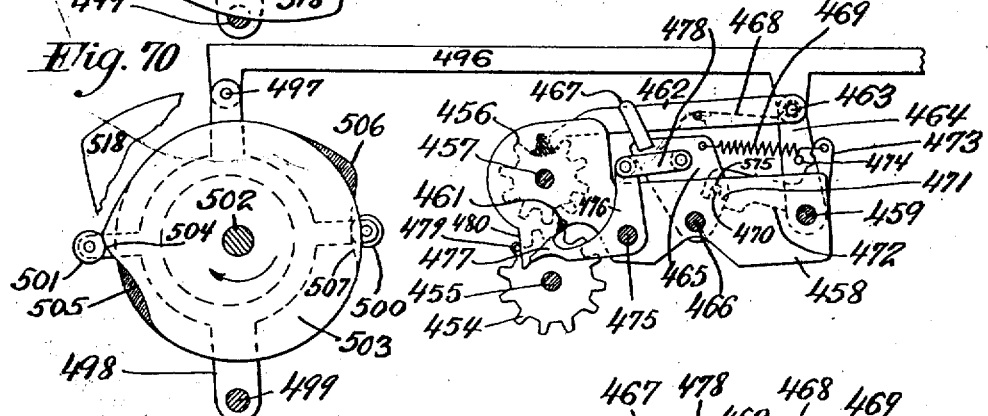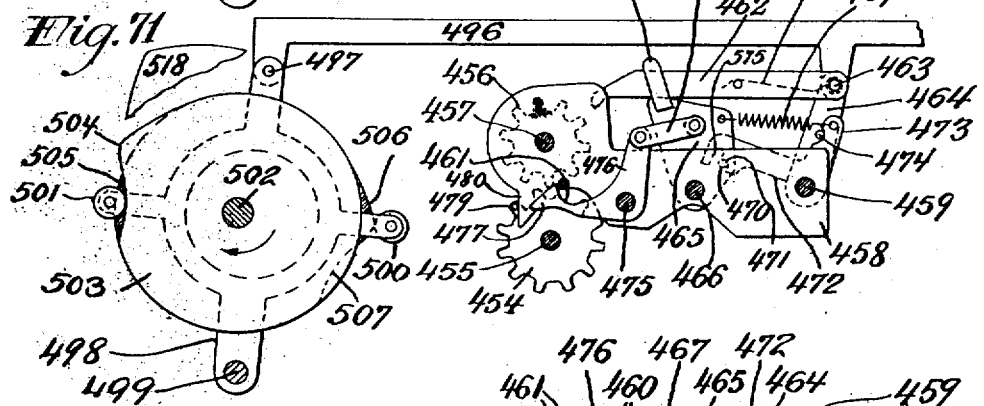

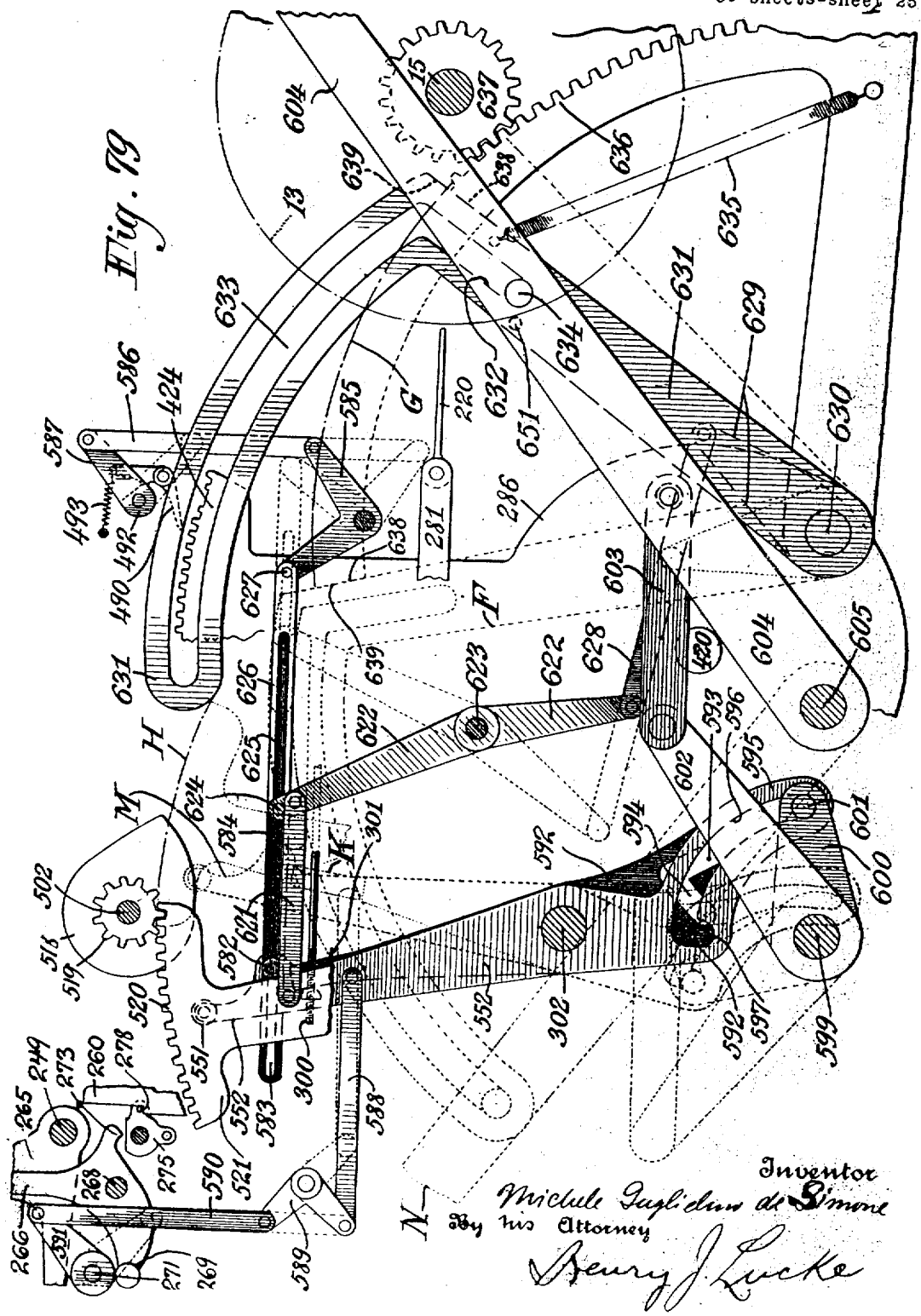

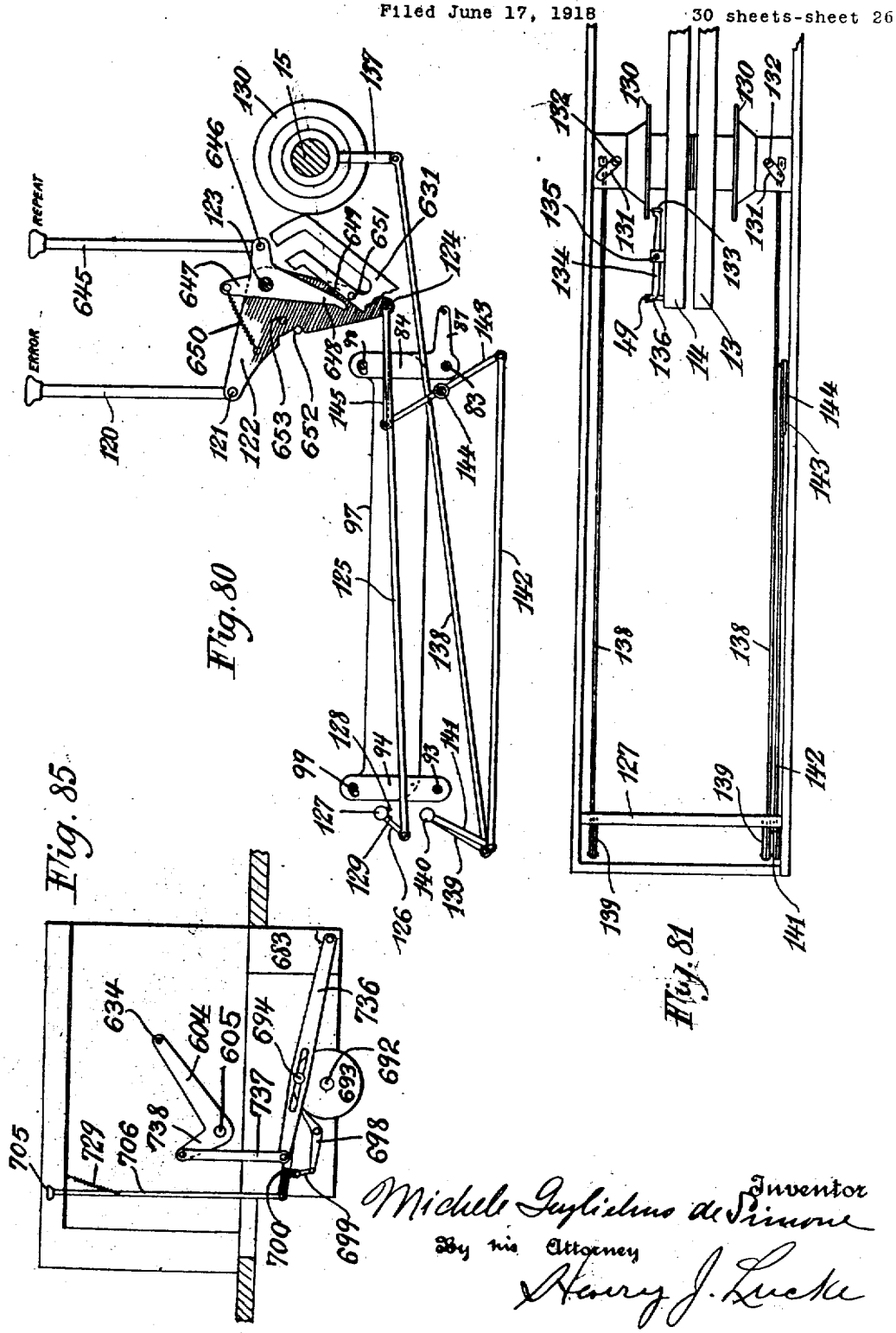

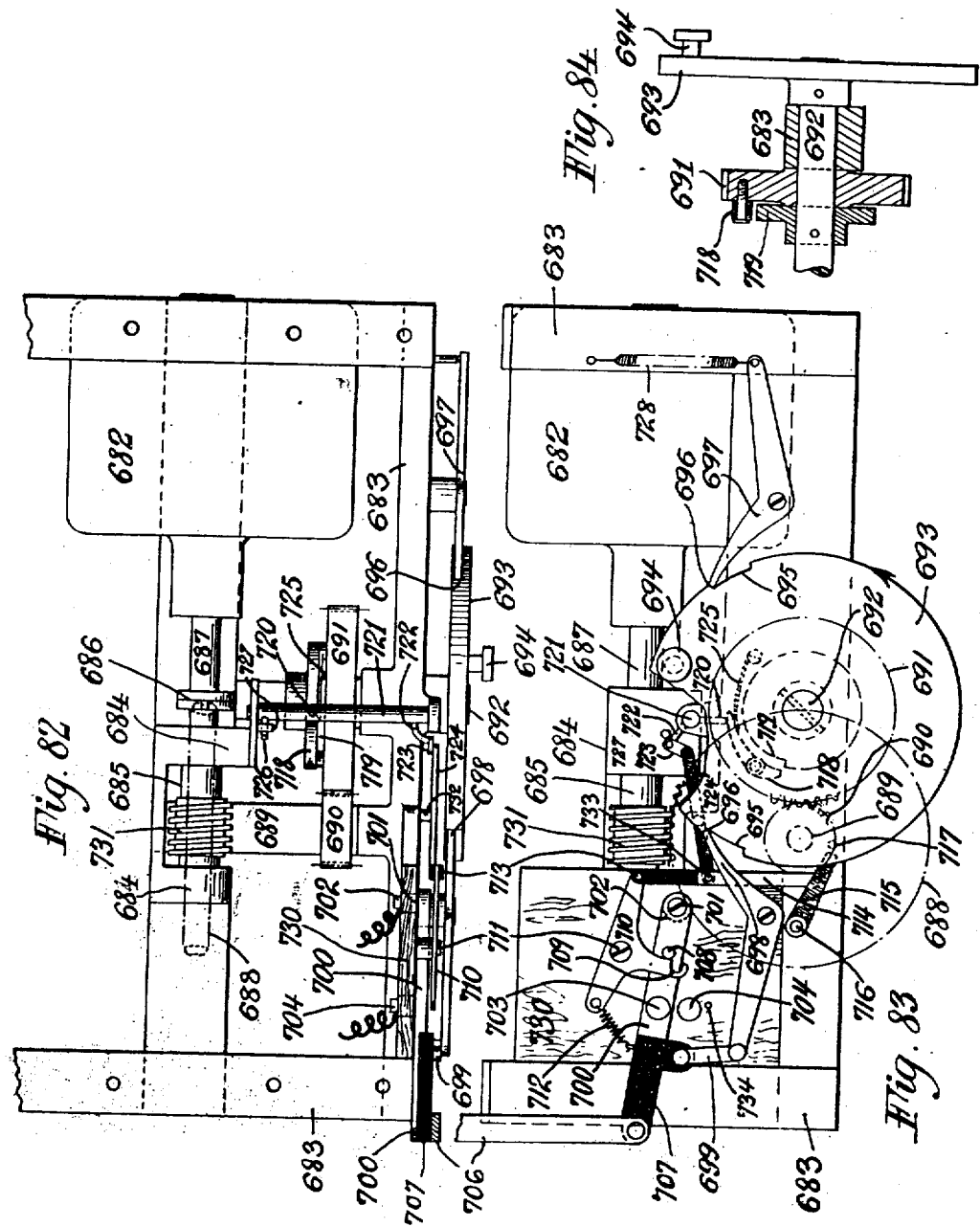

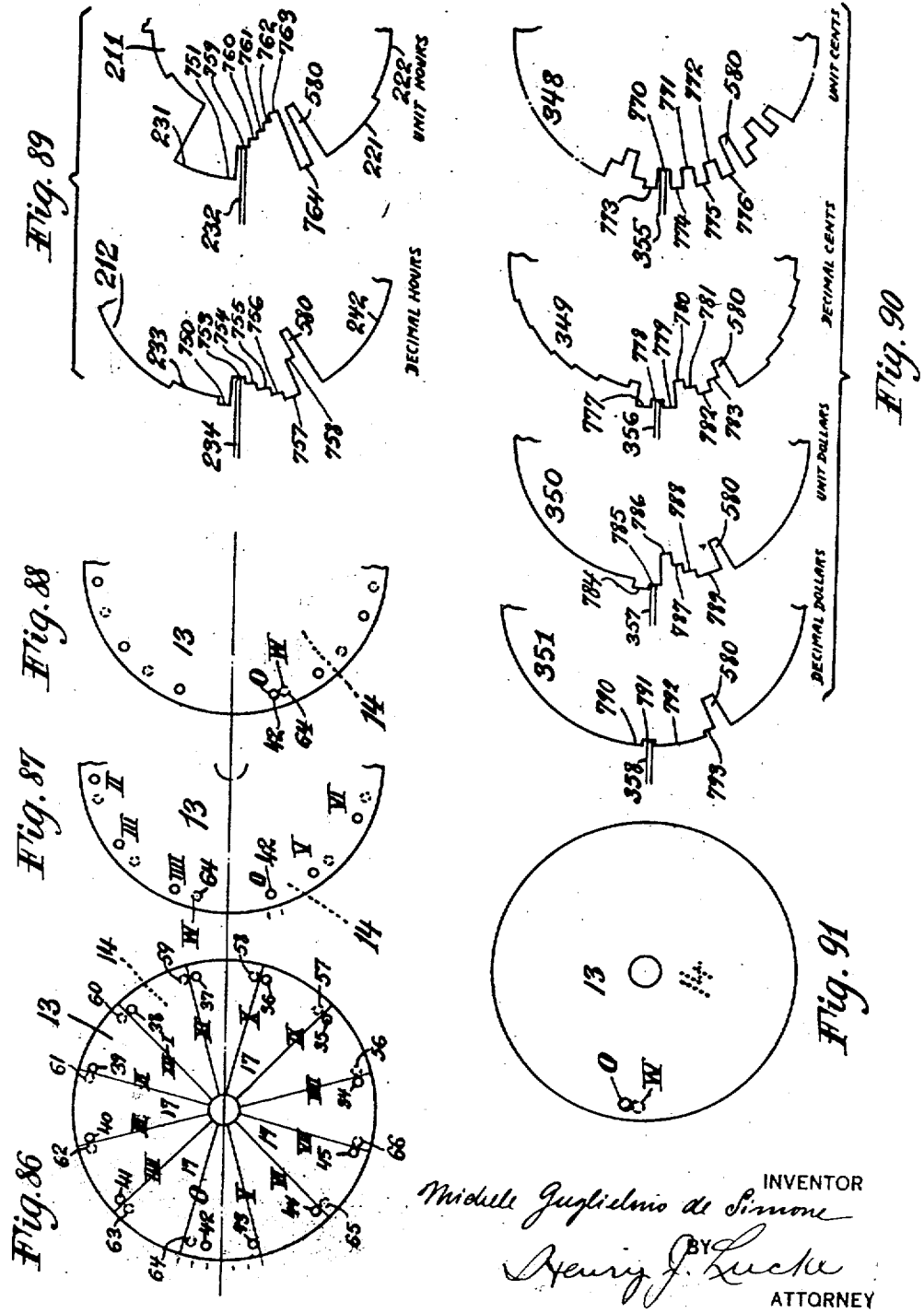

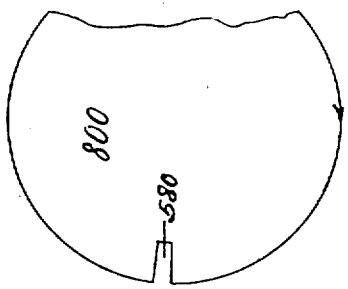
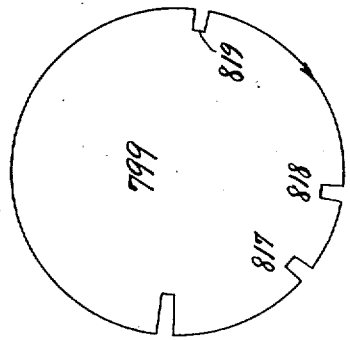
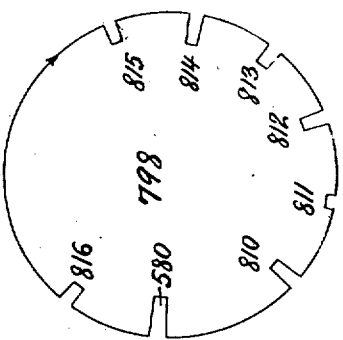
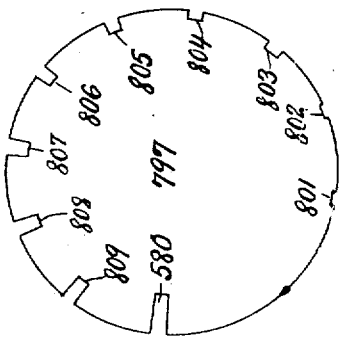

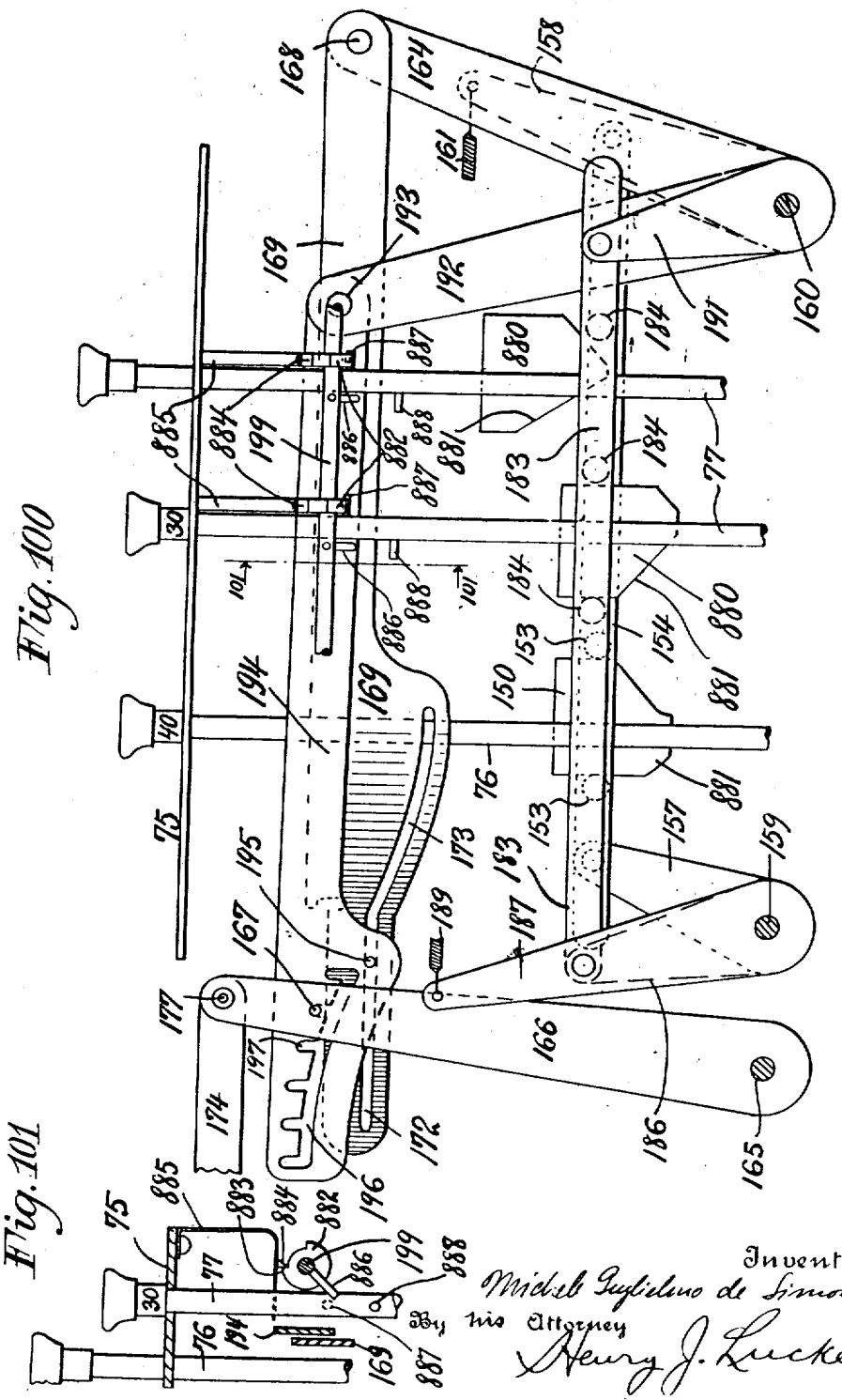

Patented Apr. 3, 1923.

1,450,718

UNITED STATES PATENT OFFICE.

MICHELE G. de SIMONE, OF STAPLETON, NEW YORK, ASSIGNOR TO GEORGE B. AGNEW, OF NEW YORK, N. Y.

CALCULATING MACHINE.

Application filed June 17, 1918. Serial No. 240,537.

*To all whom it may concern:*

Be it known that I, MICHELE GUGLIELMO DE SIMONE, a citizen of the United States, residing at Stapleton, county of Richmond, State of New York, have invented certain new and useful Improvements in Calculating Machines, of which the following is a specification.

This invention relates to calculating machines. More particularly, the invention is directed to calculating machines for ascertaining the difference between any two values of any unit whatsoever.

The invention is also directed to machines for ascertaining the product of any two values expressed in the same or different units whatsoever.

In the usual form of the invention, my calculating machine embodies mechanism for ascertaining the product of any value when multiplied by the difference between any two values.

In the ascertainment by the mathematical process of subtraction or multiplication, or both, the values may be expressed either as whole numbers or as mixed numbers.

A further feature of the invention is the provision of mechanism for adding two or more remainders and also for adding two or more products.

As one form of the invention embodying the several features hereinabove referred to, as well as other novel and useful features, I may set forth the invention in one particular embodiment thereof, directed to the computation of the difference of two or more values and the product of the same by a further value, together with desired further processes of the addition of such two or more remainders, and such desired further additions of two or more products as may be required to obtain the desired mathematical results.

The manipulation of the various forms of the invention is facilitated by a key-board having one or sets of keys arranged to effect convenience in operation, the particular arrangements of the keys of the key-board being determined by the nature of the computations and relative character of the units of the values involved.

The invention further provides means for printing or listing, as desired, any or all calculated results effected by the computing mechanism. It will appear that the calculated results may be uni-dimensional, such as time, money, etc., or poli-dimensional, such as wage, interest, cost, etc.

As one form of the invention, assuming elapsed time to represent the difference between two values and a weekly wage rate the value constituting the multiplier or multiplicand, accordingly the wage for any definite elapsed period at a definite wage rate representing the product, I shall set forth certain essential features applicable to such form of the invention, which may be called a wage computing machine. In such form of the invention, I, provide a key-board comprising a set of keys respectively representing hours and say ten minute intervals forming what may be termed "Starting time keys," and a similar set of keys forming what may be termed "Stopping time" keys. A further set of keys is provided for the respective wage rates which may be termed the "Wage" keys.

Additional keys are provided for effecting the printing of the total of the wage for any desired number of elapsed periods, and the total of the elapsed times termed the "Total" key; also, for effecting the printing of the total of any desired number of such "totals," corresponding say for a number of employees, termed the grand total or "Gr. Total" key; also, a key for repeating any computation as often as desired, termed the "Repeat" key; and, also, a key for eliminating any previously performed operation termed the "Error" key.

When the machine is actuated manually a crank or handle is provided, and operated after the proper keys have been manipulated or set. When the machine is actuated by power, as by an electric motor, a push-button key is provided in lieu of the crank, and termed the "Motor" key.

To determine the respective wages of any pay roll, upon manipulation of the proper key or keys corresponding to the hour, and minute if any, of starting time for any day, of an employee, and the proper key or keys corresponding to hour, and minute if any, of stopping, and also the wage rate of such employee, the crank or the push button key, is operated, whereupon the mathematical process is mechanically performed and the indicating elements actuated in correspondence to the product of the value of the elapsed time and the value of the wage rate. Such operation is repeated for the successive days comprised in the respective wage periods.

Upon operating the "Total" key, the summation of the wage for the wage period and the total of the elapsed time preiods of the employee is printed.

The machine effects also the printing of the wage of any employee for whole periods, such as one or more days, weeks, etc., when desired.

Upon operating the "Gr. total" key the summation of the wages of the respective employees is printed. The printing may be performed on a time card or a strip for listing.

The key-board provides also for printing any desired reference number such as the job number or wage rate or the reference number of the respective employees, to identify the respective wages as appearing on the time card or list.

The mechanism for computing the elapsed time or the remainder between any subtrahend and any numeral, comprises an element set under control of the starting and stopping time keys and provided with a set of stops respectively controlled by the whole hour keys, said stops being arranged along a projected line, the starting time hour key effecting the setting of one stop and the stopping time hour key the other stop, and upon actuation of the mechanism, manually or by power, such set stops control the extent of throw of the stop-provided elapsed time mechanism and computing mechanism for any particular wage rate.

Such stop-provided element is usually circular and the projected line accordingly a circle, thereby utilizing the advantages of rotative movement.

The operation of the proper wage key, corresponding to any particular wage rate controls mechanism adapted to control the wage computing mechanism comprising a cam, usually a composite cam formed of a number of individual cams determined by the individual integers comprising the dollar and cent values of the wage rate, thereby controlling the extent of movement or throw of the adding mechanism and therewith the positioning of the printing mechanism. The wage cams are constructed as replaceable units, either singly or as groups, thereby enabling computation for an indefinite number of wage rates by mere replacement of the wage rate groups. For the fractional hour or minute values the operation of a starting time minute key effects a decreased extent of throw and the stopping time minute key an increased extent of throw of the stop-provided or elapsed time control element.

The invention attains the aforesaid objects by combined mechanically operated parts arranged and constructed to effect the respective individual operations positively and independently of springs or other resilient means, to thereby insure absolute accuracy in operation.

An essential general object of the invention is simplicity in construction of the individual parts and in the association of the parts with one another, to facilitate construction, assembly and disassembly.

Further objects and features of the invention, generally and particularly, will appear more fully in the following detail description and from the accompanying drawings, forming a part hereof, in which—

Fig. 1 is a general side view of the machine with the casing removed and certain details omitted;

Fig. 2 is a general plan view of the machine with a portion of the cover plate removed, certain details being omitted and other parts broken away;

Fig. 3 is a front view of the machine, as viewed in the direction of arrow 3, Fig. 1;

Fig. 4 is a general plan view of the keyboard;

Fig. 5 is a side view of the starting time keys and the time measuring wheels, with parts in section, taken on line 5—5 of Fig. 2;

Fig. 6 is a horizontal sectional elevation on line 6—6 of Fig. 5;

Fig. 7 is a detail enlarged view of a portion of a stop device, shown in Figure 6;

Fig. 9 is an enlarged side view, similar to Fig. 8, showing the "40" minute starting key in depressed position, certain parts being omitted;

Fig. 10 is an elevational side view, similar to Fig. 9, showing the "30" minute stopping key, as also the "40" minute starting key, in depressed position;

Fig. 11 is a front or left hand end view of Fig. 8;

Fig. 12 is a sectional view on line 12—12 of Fig. 8;

Fig. 13 is a rear or right hand end view of Fig. 8;

Fig. 14 is a detail view of certain parts of the key locking mechanism of the starting and stopping minute keys;

Fig. 15 is a sectional plan view on line 15—15 of Fig. 3;

Fig. 16 is a plan view, similar to Fig. 15, but with parts omitted, showing the "40" minute starting key in depressed position, corresponding to Fig. 9;

Fig. 17 is a rear view, similar to Fig. 16, showing the "30" minute stopping key, as well as the "40" minute starting key, depressed corresponding to Fig. 10;

Fig. 18 is a perspective view of the locking slides for locking any minute key in depressed position;

Figs. 19, 20 and 21 are detail views illustrating the successive operations of the said locking slides;

Fig. 24 is a diagrammatic view of the time measuring wheels in neutral position;

Fig. 25 is a side view of the minute cam, in neutral position;

Fig. 26 is a side view of the unit integer hour cam, in neutral position;

Fig. 27 is a side view of the decimal integer hour cam, in neutral position;

Figs. 28, 29, 30 and 31 are side views respectively similar to Figs. 24 to 27, but illustrating the respective time cams in operated positions corresponding to the elapsed time determined by the operated hour and minute keys of Fig. 23;

Fig. 32 is a sectional view, with parts omitted, taken on the line 32—32 of Fig. 2, illustrating in neutral position the time cams, the printing mechanism and intermediate controlling parts; also the time adding mechanism in neutral position;

Fig. 33 is a sectional view, similar to Fig. 32, but showing the parts in the position of indicating and printing the aforesaid elapsed time period of 6 hours and 50 minutes;

Fig. 34 is a detail side view of one of the printing type members;

Fig. 35 is a horizontal section on line 35—35 of Fig. 34;

Fig. 36 is a sectional view on line 36—36 of Fig. 2, showing the wage keys and mechanism comprising pins and cams for determining monetary values;

Fig. 37 is a transverse sectional view on line 37—37 of Fig. 36;

Figs. 38 and 39 are respectively plan and side detail views of a pin of the wage mechanism;

Fig. 40 is a side view of the decimal dollar wage cam;

Fig. 41 is a side view of the integer dollar wage cam;

Fig. 42 is a side view of the decimal cents wage cam;

Fig. 43 is a side view of the unit cents wage cam;

Figure 48:
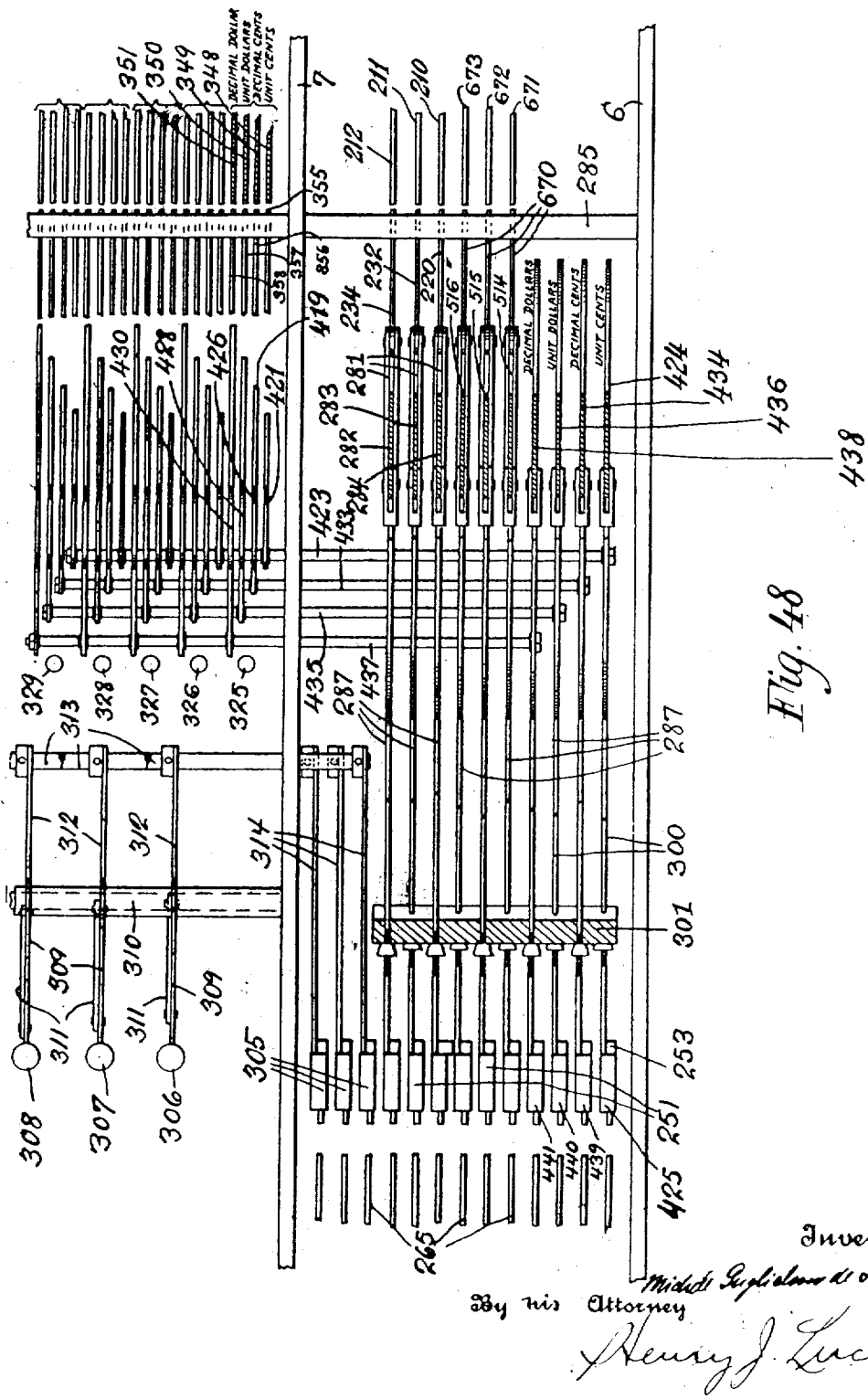

Figs. 44, 45, 46 and 47 are views of the 25¢ per day wage rate cams, corresponding to Figures 40 to 43, inclusive, but illustrating the same in position for determining the monetary value, for the elapsed time of 6 hours and 50 minutes, corresponding to Figs. 28 to 31 inclusive, aforesaid;

Fig. 48 is a general plan view, showing the time cams, the rate cams, portions of the rate mechanisms and the printing mechanism with intermediate parts, all in neutral position;

Fig. 49 is a plan view, similar to Fig. 48, but showing the parts in a set position, corresponding to the aforesaid 6 hours, 50 minutes elasped time and the 25¢ wage rate;

Fig. 50 (see Sheet 2) is a detail perspective view of the coupling between the shafts of the time cams and the rate cams;

Fig. 51 (see Sheet 16) is a view of an end of the wage rate shaft and coupling, permitting the replacement as a unit of a group of wage rate cams;

Fig. 52 is a side view of parts of the printing mechanism, showing the type members and type hammers in operated position;

Fig. 53 is an elevation of the type members, looking in the direction of arrow 53 in Fig. 52, i. e., towards the front of the machine;

Fig. 54 illustrates a time-card or portion of a paper strip, listing respectively the designations of a number of employees, the elapsed time periods, the total time, and the corresponding wages and total wage;

Fig. 55 is a sectional view of the type hammers, taken on the line 55—55 of Fig. 52;

Fig. 56 is a detail elevation of certain type hammer cams, looking in direction of the arrow 56 in Figure 52;

Fig. 57 is a right hand end view of Figure 56;

Fig. 58 is a left hand end view of Figure 56;

Fig. 59 is a plan view of a single type hammer cam, looking down upon Figure 58;

Fig. 60 (see Sheet 11) is a sectional view on line 60—60 of Figure 2, on a somewhat reduced scale, showing a portion of the control operating means of the adding and totalizing mechanisms, in neutral position;

Fig. 61 (Sheet 11) is a side elevation of a portion of Figure 60, but with certain parts in operated position;

Fig. 62 (Sheet 11) is a plan view of certain parts shown in Figure 60;

Fig. 63 (Sheet 11) is a detail enlarged view on the line 63—63 of Fig. 60;

Fig. 64 (Sheet 21) is an enlarged perspective view of parts shown in Figure 60;

Fig. 65 is a plan view of the adding mechanism and the control parts shown in Figure 64;

Fig. 66 is a sectional side view on line 66—66 of Figure 65;

Figs. 67 and 68 show the mesh controlling cams of the adding mechanism respectively in mesh and non-mesh effecting positions;

Figs. 69, 70 and 71 illustrate in side elevation progressed positions of the carry-over parts of the adding mechanism;

Fig. 72 is a plan view of a single adding element of the adding mechanism;

Figs. 73 to 78, inclusive, illustrate diagrammatically the operation of the "carry-over" pins in the adding mechanism;

Fig. 79 is an enlarged general side view of certain main elements of the actuating mechanisms of the machine;

Fig. 80 is a side view of the error and repeat keys and associated parts;

Fig. 81 is a plan view of the parts shown in Fig. 80;

Figs. 82, 83 and 84 (see Sheet 27) are respectively top plan, side and detail sectional views of the motor mechanism;

Fig. 85 (see Sheet 26) is a side view on a reduced scale of the push button key and control parts for starting and stopping the motor;

Figs. 86, 87 and 88 are diagrammatic side views of the elapsed time mechanism, shown in progressed positions corresponding to certain whole day periods;

Fig. 89 shows, in side views, the decimal and integer hour cams in comparative positions, corresponding to whole day periods;

Fig. 90 shows in comparative side views, the rate cams in positions corresponding to the positions of the time cams shown in Figure 89;

Fig. 91 illustrates the movements of the time wheels for an elapsed time period of one whole week;

Figs. 92 to 95, inclusive, illustrate in side views the neutral positions of certain wage rate cams;

Figs. 96 to 99, inclusive, illustrate in side views operated positions of the wage rate cams of Figs. 92 to 95; and Figs. 100 and 101 show a modification.

Understanding that the particular embodiment applicable for computing and indicating or recording wage is merely but one of a very large number of forms of machines or devices embodying the principles of my invention, I proceed now to describe the construction and arrangement of the parts of the particular wage computing machine shown in said drawings.

The wage computing machine comprises the following several general parts, which may be termed:

(1) "Starting and stopping time mechanism," including primarily the starting and stopping time keys and elapsed period measuring mechanism, with the sub-divisional headings.

(a) Elapsed time fractional hour mechanism, (b) Key locking mechanism,
(c) Error control mechanism,
(d) Elapsed time cam mechanism;
(2). Elapsed time printing mechanism;
(3). Rate mechanism;
(4). Adding and total mechanisms, with the sub-divisional heading "Grand totalizing mechanism;"
(5). General actuating mechanism;
(6). Repeat mechanism; and
(7). Whole period mechanism.

The operations of the respective general parts are set forth from stage to stage under the aforesaid headings and sub-headings.

The machine, as a whole, is mounted on a suitable frame-work comprising the front frame 1, rear frame 2, right end frame 3 and left end frame 4, see Fig. 2; the intermediate, inside, cross frames 5, 6 and 7; and the foremost frame 8. The cross frames 6, 7 extending from the frame 8 at the front to the frame 2 at the rear, are larger than the end frame 3, 4 (see Fig. 3); said frame 8 is slightly higher than the front frame 1 (see Fig. 3) whereby the cross frames 5, 6 and 7 are somewhat higher than the end frames 3, 4. Such frame-work affords a convenient arrangement of the frame parts and permits partial dismounting of separable groups of parts constituting more or less separable mechanisms, the interconnecting parts of such groups being removably connected or comprising separable portions.

(1) *Starting and stopping time mechanism.*

The key-board of the elapsed time mechanism (see Figs. 2 and 4) comprises a set of keys for the starting time and a set for the finishing time. The keys are marked to represent the respective hours and desired minute intervals. The starting and the finishing time sets of keys are divided into two rows each, one corresponding to hours and the other to minutes. Thus for the usual commercial requirements, the starting time hour keys 9 may be marked successively from 5 to 4 with one key marked "12–1"; representing respectively the elapsed period of a total of 10 hours from 5 a. m. to 12 m. and from 1 p. m. to 4 p. m. allowing for lunch or other recess between 12 m. and 1 p. m.

The key marked "0", positioned in alignment with the starting time hour keys 9, is operated initially when it is desired to derive wage values corresponding to whole day or weekly periods and for salary computations, as set forth more particularly hereinafter.

The row of keys 10 are the starting time minute interval keys, marked successively "10"—"20"—"30"—"40"—and "50"—representing in this instance ten minute intervals of the hour. The stopping time minute keys 11 are marked similarly for ten minute intervals. The stopping time hour keys 12 are marked successively from 6 to 12 a. m. and from 1 to 5 p. m. as shown.

The key marked "W", positioned in alignment with the stopping time hour keys 12 is operated when it is desired to derive a whole week wage or salary computation, as set forth more particularly hereinafter.

Such key-board accordingly provides for a twelve hour period, from 5 a. m. to 5 p. m. divided into hour and ten minute intervals. As indicated, the key-board is arranged to provide for an hour of rest during the hours of 12 and 1, which period may be varied as desired.

It will be understood that fractional hour or minute intervals other than ten minutes may be similarly provided for.

The elapsed time measuring mechanism may be conveniently considered as comprising an elapsed time hour measuring mechanism and an elapsed time minute measuring mechanism, coacting to derive all possible elapsed time intervals. Said mechanisms preferably form a separable section or unit of the machine, supported between the end frame 3 and cross frame 5, and are shown particularly in Figs. 5 to 23, and 81.

Referring to Figs. 5 and 6, the elapsed time mechanism comprises two time wheels 13 and 14, the wheel 13 being mounted free to rotate on the main shaft 15, while the wheel 14 is pinned at 16 to said shaft 15.

The principle of the circularly projected line for elapsed time measurement is indicated diagrammatically in Fig. 86, Sheet 28. The time wheels 13, 14 are divided circumferentially into twelve equal spaces 17, representing successively the hours indicated by roman numbers. Each hour spacing is divided projectively into six equal spacings, each representing a ten minute interval. The wheel 13 is provided with a stop pin 18, see also Figs. 5 and 6, at each hour division counting from the zero pin 42. The zero pin 42 is preferably located a "twenty minute" spacing posterior of the first hour division line, as shown.

The number of stop pins 18 corresponds respectively to the hour keys 9, and upon depression of any key 9, its stop pin 18 is projected inwardly or "set".

Referring now to Figures 6 and 7, the twelve pins 18 of the wheel 13 are shown in Fig. 6 in neutral position, in which position the inner end 23 of each pin 18 is flush with the inner face of the wheel 13. Each pin 18 is provided with a head 19 and a clutch portion 20 adapted to cooperate with a holding spring 21 disposed in the recess 22 (see Fig. 7) whereby the pin is held either in neutral or in its "set" position, as will be understood.

The stem 24 of each key 9 is guided in guide pieces 25, 25, suitably supported on the frames 3 and 5, Fig. 3. Each key stem 24 carries a cam 26, which, upon depression of the key, oscillates a lever 27 fixed to the rock shaft 28, journaled in suitable brackets 29, carried by said guide pieces 25. As is clearly illustrated in Fig. 5, the rock shafts 28 extend respectively to points opposite the respective pins 18, in wheel 13, at which point each rock shaft 28 carries a hammer 30 adapted to strike the pin 18 and set the same by inward movement relatively to the wheel 13. Each key 9 is returned to its neutral or upper position by a spring 31 coiled around the stem of the key. Each lever 27 preferably carries a cam roller 32 (see Fig. 3) cooperating with the cam 26, and each rock shaft 28 is provided with a spring 33 (see Fig. 5) tending to keep the cam roller 32 on the cam 26, and also the hammer 30 in retracted position away from its pin 18, as shown in Figure 6.

The operation of each pin 18 may be traced from its key through the following parts; key stem 24, cam 26, cam roller 32, oscillating lever 27, rock shaft 28 to the hammer 30. It is further apparent that upon depression of a key and release of the operator's finger, the key is immediately restored to neutral position by its spring 31, the movement of the hammer 30 being momentary only, merely to set its pin 18 inwardly, after which the spring 31 turns its rock shaft 28 back into neutral position and retracts its hammer 30.

The stopping hour wheel 14 is provided similarly with stop pins 48 corresponding similarly to the twelve whole hour intervals, the pins 48 for the respective hours being slightly displaced out of alignment relative to the pins 18 in wheel 13, whereby to permit two opposed pins to be projected inwardly one to the side of the other, as will be understood. The pin 48 in the wheel 14 adjacent the zero pin 42 in wheel 13 is marked "W". It will also be noted that there is no pin in wheel 14 corresponding to the five hour pin 43 of wheel 13, as will be apparent in view of the particular key-board shown beginning with the starting hour of five. Said pin "W" may be permanently positioned in projected relation to the wheel 14, if desired, since it is positioned at the extreme termination of a complete revolution.

The pins 48 are similarly provided with clutch portions and springs, marked with like reference characters. The heads 49 of pins 48 are operated respectively by the finishing hour keys 12 (Fig. 3) through the instrumentality of the key stems 50, cams 51, cam rolls 52, levers 53 on rock shafts 54, carrying the hammers 55, all of which parts are arranged, constructed, supported and operated in a manner similar to the aforesaid corresponding parts of the starting hour elements, and bearing like reference characters, as appears in Figs. 3 and 6. The respective pins 48 are successively marked 56 to 66, for the successive hours (Figs. 5 and 86) and are located along the circular line of projection on the periphery of the wheel 14.

Briefly reviewing the operations of the parts of the starting and stopping time mechanism thus far described, and assuming as an example, the starting time at 8 a. m. and the stopping time at 4 p. m., the operator depresses the "8" key of the starting time hour keys 9, thereby rotating its rock shaft 28, causing its "VIII" hour pin 34, corresponding to the hour of eight, of the group of pins 18, in the time wheel 13 to be "set"; similarly, upon depression of the "4" key of the stopping time hour keys 12, its rock shaft 28 will be similarly rotated to cause its "IIII" hour pin 63 of the group of pins 48 in the stop time wheel 14 to be "set". As is explained more fully hereinafter, after the proper setting of the starting and stopping time keys, the shaft 15 is actuated, either manually or under power, through an arc of movement determined by the particular pin of the group of pins 18 in the starting time wheel 13 and the particular pin of the group of pins 48 in the stopping time wheel 14. In this particular instance, the extent of throw of the shaft 15 corresponds to an elapsed time period of seven hours, omitting the noon or luncheon hour.

With such preliminary description of operation of the elapsed time mechanism for whole hour periods, I now proceed to set forth the construction and operation of the aforesaid parts as modified by fractional hour periods.

(a) ELAPSED FRACTIONAL TIME MECHANISM.

Referring more particularly to Figs. 8 to 17, and 22, and 23, as well as the general showing in Fig. 2, each fractional hour key 76 is provided with a cam fixed to its stem, said cam comprising an actuating portion 150 and a stop portion 151, the former including the inclined cam face 152 cooperating with the respective rollers 153, mounted between the double, reciprocating parallelly moving bar 154. Said bar 154 is pivotally mounted at one end at 155 and at the other end at 156 on the pair of oscillating, parallel arms 157, 158, one arm 157 being fixed to the shaft 159 and the other arm 158 to the shaft 160. Said shafts 159 and 160 are supported in the frames 71, 72.

Figure 8:
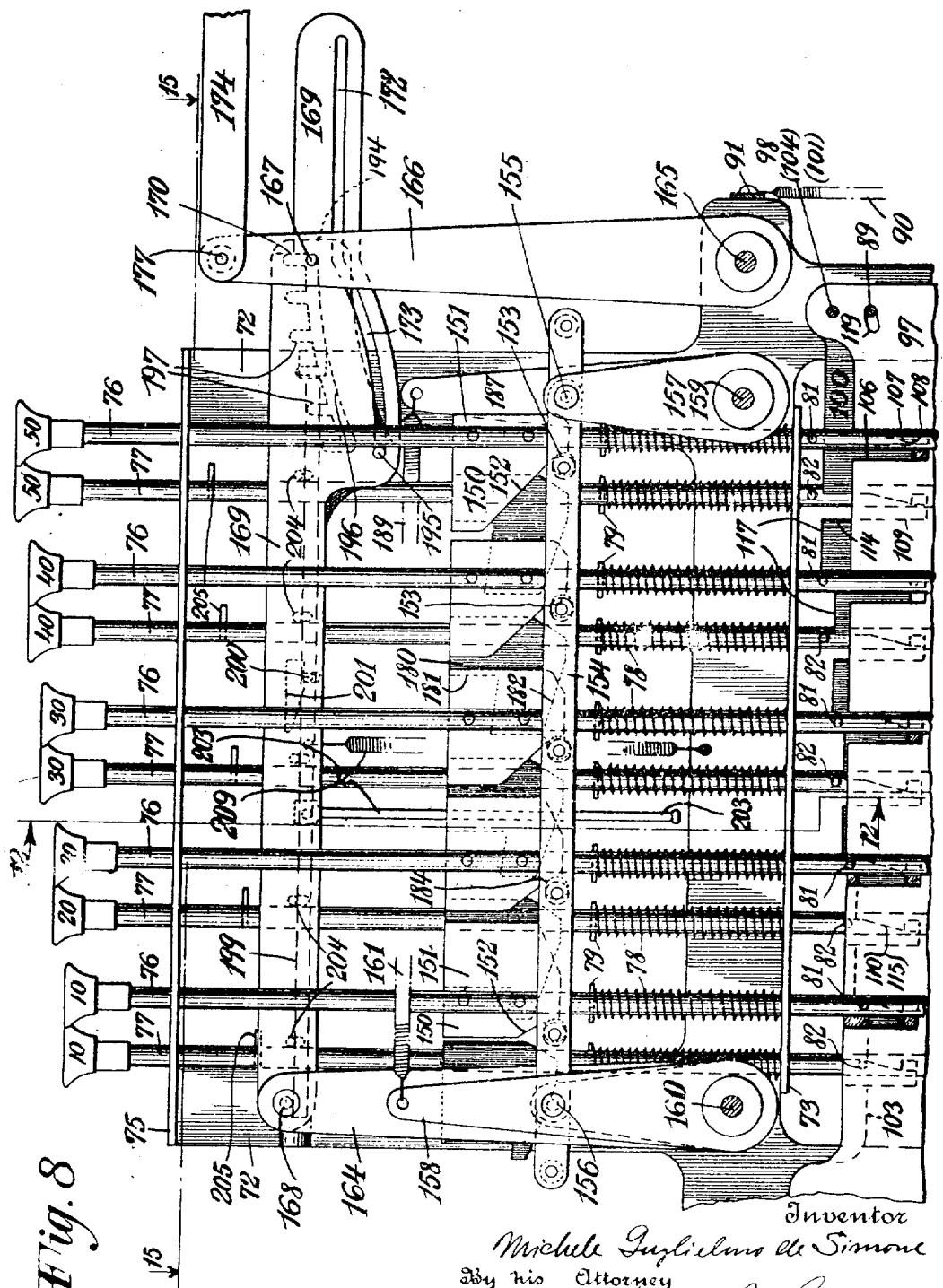
Fig. 8 is an enlarged side view, with parts broken away, of the fractional hour starting and stopping keys and key locking mechanism, in neutral position, taken on the line 8—8 of Fig. 3.

Referring particularly to Fig. 8, the spring 161 has one end fixed to the frame 71 (see Fig. 11), and normally tends to hold the arm 158, and therewith the double bar 154, to the right.

The effective cam faces 152 vary progressively in correspondence to value of the represented time periods, thus the cam face for the value of ten minutes is the least and that of the fifty minute period the greatest, as appears in Fig. 8.

The double lever 166, pivoted on the shaft 165, carries a pin 167 (see Figs. 8, 9 and 13) said pin 167 being guided in the notch 170 in the guide link 169, pivoted at 168 to the arm 164, fixed to said shaft 160. Said link 169 is further provided with the slot 172, comprising the anterior curved slot portion 173.

The time wheel 13 (see Figs. 5, 22, 23) is connected with said double lever 166, by means of the link 174, pivotally connected at 175 to the lug 176 fixed to said wheel 13. The link 174 is shown pivotally connected to the lever 166 by means of the roller 177 (see Figs. 8 and 17).

The stopping time minute keys 77 are similarly provided respectively with the cams 180, each having the stop portion 181 and the clearance 182, the stop portions 181 being of increasing effective values, in the order of the minimum value of "10" and the maximum value of "50," for the respective ten minute intervals (see Figs. 8, 9). The double bar 183 carries the rollers 184, cooperating with the respective cam faces 182. Said bar 183 is pivoted at 185 to a pair of parallel arms 186, 187, said arm 186 being pivoted on the shaft 159, on which said arm 157 is also pivoted, and said arm 187 being pivoted on the shaft 160, to which said arm 158 is also pivoted.

It will be noted that each cam surface 152 of the respective starting time minute key 76 is arranged to positively force the actuating bar 154 to the left (Figs. 8, 9 and 10) whereas the effective stop portions 181 of the respective stopping time keys 77 are each arranged to effect movement of the actuating bar 183 to the right, thereby differentially controlling the operating lever 166 and therewith the link 174 and the time wheel 13, as explained more fully hereinafter. Upon the manipulation of any particular starting time minute key 76, said time wheel 13 is rotated in anti-clockwise direction through an arc commensurate with the effective value of the cam 152 of such key; and similarly, upon manipulation of any particular stopping time key 77 the time wheel 13 is not actually rotated but permitted, in subsequent actuation, as explained hereinafter, to rotate clockwise through an arc commensurate with the effective value of the stop 181 of such particular key 77. Accordingly, the resultant rotation of the time wheel 13 relative to the time wheel 14, and therewith the main shaft 15, is determined by the difference between the values of the extents of opposite rotation, affording thereby generally a differential control of the extent of movement of the movable element of the machine along the projected line of mathematical derivation, constituted by the outlines of the subtraction and multiplication measuring means, described more fully hereinafter.

Between the arm 187 and any suitable pin 188 positioned on the frame 72, extends the retractile spring 189, normally tending to hold said bar 183 to the left (see Figs. 9 and 10). The left hand end of said double bar 183 is pivotally connected at 190 to the conjoint arms 191, 192 (see Fig. 11) the former being a short lever and the latter a long lever. At the free end 193 of said long lever 192 is pivotally connected the bar 194 having the pin 195 (see Fig. 9) fixed thereto and extending laterally in the said slot 172—173 in said stop bar 169, whereby said bar 194 is supported at its free end by means of its said pin 195 riding in the slot 172, 173 of the link 160.

The neutral position of said pin 195 relative to said slot 172, 173 is shown in Fig. 8, i. e., at the extreme anterior portion of the curved slot 173 and, as is also shown in Fig. 8, the neutral position of said pin 167 carried by said operating lever 166 relative to the slot 196 of the link 169 is at the extreme posterior portion of said slot 196. The retractile spring 209 extends from the link 169 to any fixed point on the frame whereby said link 169 normally tends to move downwardly. The main slot 196 is provided with laterally communicating spaced slots 197, in this instance six in number, corresponding to the number of fractional time intervals. The groove of said main slot 196 is that of a circle having its center coincident with the center of the shaft 165, to which is fixed the radial operating lever 166, connected by the link 174 to the time wheel 13. The distance between any two immediate lateral notches 197 corresponds projectively to the fractional interval of ten minutes and is commensurate with the required throw of said operating arm 166 corresponding to the rotation of the time wheel 13, 14 for a time interval of ten minutes.

Means are provided to retain the control elements of the manipulating starting and stopping time minute keys and comprise the following specific parts.

Upon actuation of any starting time minute key 76, thereby moving the bar 154, arm 164 and link 169, to the left (see Figs. 8 and 9) said pin 195 fixed to the link 194 is relatively moved in the curved portion 173 of the slot 172 in said link 169, whereby the right hand end of link 169 is depressed by the rotation of the actuating lever 156 anti-clockwise.

It will be noted that the width of the stop-portion 151 of each starting time key 76 is related inversely to the width of its cam portion 150, whereby all the keys 76 have the same combined width of cam portion 150 and stop-portion 151, which combined width is approximately equal to the distance between any two consecutive rollers 153, 153, of the double bar 154.

Accordingly, upon the entry of the cam-portion and stop-portion of the depressed starting time key 76 between its forward roller 153 and its rearward roller 153, the double bar 154 is precluded from any possible overthrow and is also held against displacement, thereby in turn holding the lever 166 and the time wheel 13 against displacement and locking the same in commensurate position.

It will also be seen that each roller 153 serves the double function of the motion roller for one key and the stop-roller for the consecutive key.

Upon such movement of the bar 183 to the left the bar 194 is similarly moved to the left, causing the pin 167 to be moved relatively in the slot 196 of the bar 194, into alignment with one of the lateral slots 197. Under action of the spring 209 of the bar 194, the pin 167 relatively will enter the corresponding slot 197. It will be noted that the particular slot 197 with which the pin 167 will be brought into alignment corresponds in number of its order beginning at the extreme right hand lateral slot 197 to the order of the depressed starting time minute key, the extreme right hand slot 197 denoting "zero" fractional value or the absence of any depressed starting time minute key. Thus, as indicated in Fig. 10, upon depression of the starting time "40" minute key, in the selected example, the pin 167 is brought in alignment with the fifth lateral slot 197, and its entry therein is effected upon depression of the stopping time minute key.

Upon actuation of the main shaft 15, explained more fully hereinafter, the manipulated starting time minute key or stopping time minute key, or both, and the parts connecting the same with the actuating lever 166, as aforesaid, are released from their "set" positions, respectively, by suitable means operative upon actuation of the main shaft 15, as set forth more fully hereinafter.

Upon the release of the keys the link 194, and therewith the link 169, are released by the abutment 201 adapted to be engaged by the pin 200, fixed to the link 169. Normally, as shown in Fig. 8, said abutment 201 is held in contact with the pin 200, under tension of the spring 209 pulling the bar 194 downwardly, but upon depression of any stopping time minute key its pin 205 engages a corresponding pin 204 (see Figs. 10, 15) carried by said rock bar 199 and rotates the said rock bar 199, and therewith the pin 200 below the abutment 201. Upon release of said link 194, the same is restored to neutral position by the retractile spring 209.

Continuing, with further details, the example given above, and assuming the starting time as 8.40 a. m. and the stopping time as 4.30 p. m., the "VIII" pin 34 of the hour pins 18 of time wheel 13 is set, the "IIII" pin 63 of the hour pins 48 of the time wheel 14 also set, and the time wheel 14 rotated through an arc in clockwise direction corresponding to the forty minute interval, and the bar 194 set to be moved toward the right (see Figs. 10, 11, 22, 23), for the minute interval of thirty minutes, the last named being determined by the stop portion 181 of the "30" minute key of the stopping time minute keys 77.

Figure 22:
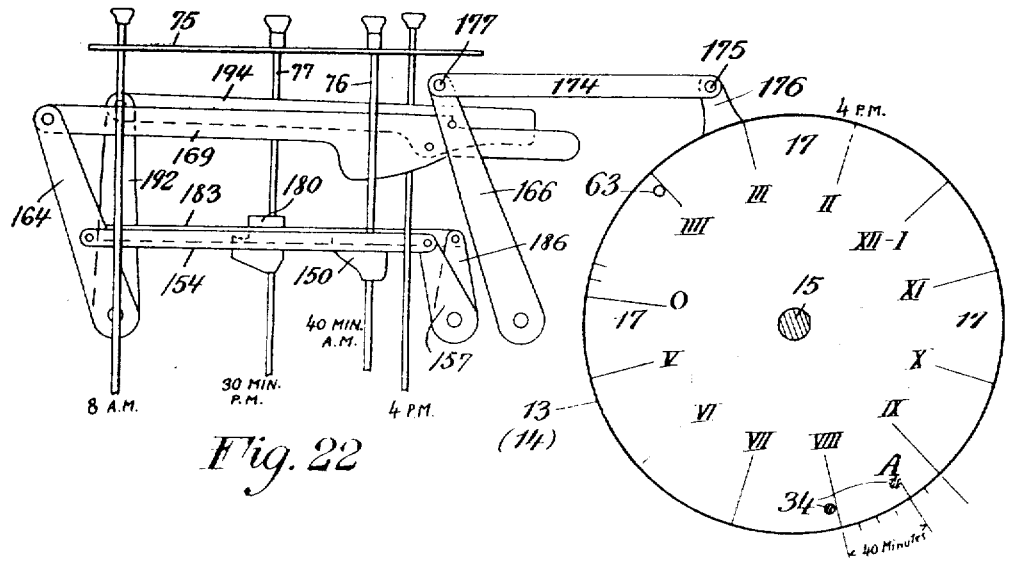
Fig. 22 is a diagrammatic view illustrating the position of the time measuring mechanism upon depression of the "40" starting and "30" stopping minute keys.
Figure 23:
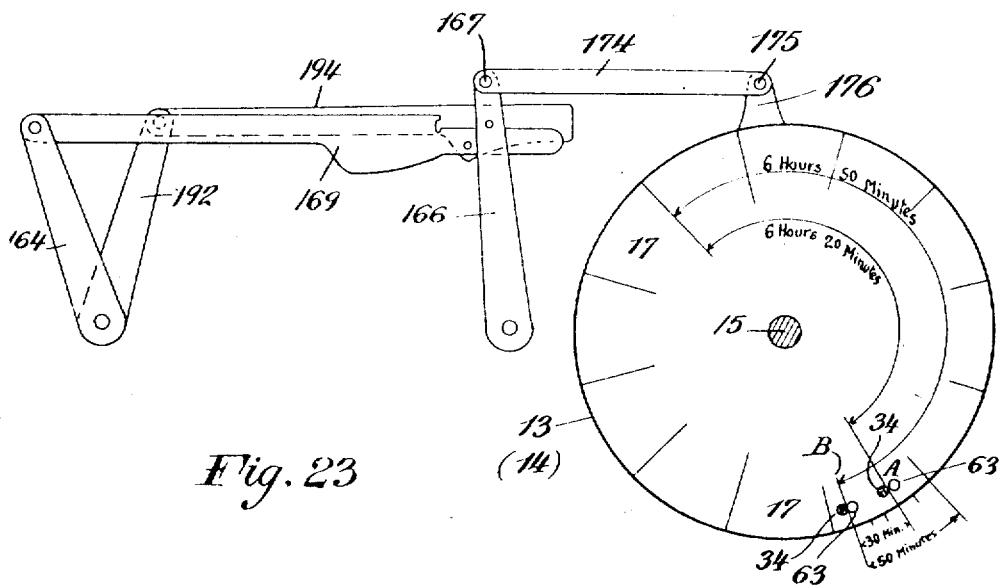
Fig. 23 is a similar view showing the completion of the operation of the elapsed time mechanism, for the period of 6 hours and 50 minutes, upon the depression of the "8" starting and "4" stopping hour and the aforesaid minute keys.

As will be noted from Figs. 22, 23, and 24, said time wheel 13 is positioned concentrically with the time wheel 14. Upon clockwise rotation of the main shaft 15 and therewith the time wheel 14, fixed thereto, the time wheel 14 is rotated until its set pin 63 strikes the set pin 34 of the time wheel 13, but previously rotated in anti-clockwise direction by the set minute interval of forty minutes, indicated in Fig. 22 by the distance from the point A to the full line position of the pin denoted 34, the point A indicating the point of first engagement of the pin 63 with the pin 34. However, the extent of clockwise rotation of the time wheel 14 and therewith the main shaft 15, is not terminated upon the instant of first engagement of the pin 63 with the pin 34 at the point A, since by reason of the potential setting of the stopping time bar 184 relative to the stop edge 181 of the depressed "30" stopping time key, said bar 184 and therewith the link 194 permits the further clockwise rotation of the time wheel 14 and therewith the main shaft 15 to the point marked B (Fig. 23), the distance between the point A and the point B being of the value of thirty minutes as indicated, whereby the eventual arc of movement of the time wheel 14 and therewith the extent of throw of the main shaft 15 is of the value of six hours and fifty minutes, deriving the elapsed time between the selected starting time of 8.40 and the selected stopping time of 4.30, less one hour for luncheon.

In this last named movement, the pin 167, lodged in the fifth lateral slot 197 of the link 194, as aforesaid, emerges from the slot 170 of the link 169, freeing the link 194 from the link 169 and effecting the throw of the operating lever 166 to attain clockwise rotation of the time wheels 13, 14, simultaneously, for the value of thirty minutes. In Fig. 10, the aforesaid movements of the link 194 and the operating lever 166 are indicated, their final positions being shown in dotted lines. Such movement of the link 194 is upwardly, and towards the right, whereby the pin 195, fixed to the link 194 rides in the curved slot portion 173 in the link 169 until it reaches the straight slot portion 172, whereafter the link 169 is also moved upwardly, as indicated in dotted lines, to insure the catching of the pin 167 again within the slot 170 upon restoration of the aforesaid parts.

(b) KEY LOCKING MECHANISM.

The machine illustrated in the drawings is further provided with means for locking the depressed keys during the operation of setting the desired time keys, which key locking mechanism is now described.

Supported between the frames 3 and 5, by suitable bolts 70, Figs. 1 and 3, is a subframe comprising two similarly opposed frames 71, 72, carrying the shelf 73 (see Figs. 3, 11, 12 and 18) and the bottom plate 74. The plate 75 serves as a common top plate for the machine and the sub-frame 71, 72, above which top plate project the starting time hour and minute keys 9, 10 and the stopping time hour and minute keys 11, 12.

Said starting time minute keys 76 and said stopping time minute keys 77 respectively project through registering openings in said shelf 73 and said bottom 74 as indicated in Fig. 3, and the springs 78, coiled about the respective stems of said keys 76, 77, extend at one end in contact with said shelf 73 and at the other end with a pin 79 on the stems of said keys, normally tending to hold said keys in their uppermost or neutral positions. The maximum extent of movement of the respective keys 76, 77, is determined (see Figs. 11, 12 and 13) by the pins 80, carried by each key stem below said bottom plate 74. As indicated in Fig. 8, said minute key stems are of graduated length, the ten minute keys being of least length and the fifty minute keys of greatest length, whereby the extent of depression of said keys is commensurate with the magnitude of values represented respectively by said keys.

Each starting time minute key 76 is provided with a locking pin 81, carried by the key stem and extending in a certain direction therefrom. Each stopping time minute key 77 is similarly provided with a locking pin 82, carried, by the key stem and extending in an opposite direction. Positioned below said minute keys 76, 77 are three, parallelly arranged slides 97, 100 and 103 (see Fig. 18) said slides 97, and 103 being disposed outwardly of and on opposite sides of the central slide 100. Said slide 97 is provided with the set of notches 106, each notch having a cam portion 107 and a locking shoulder 108, said notches 106 being respectively normally disposed below and in alignment (see Fig. 19) with said pins 81 of said starting minute keys 76. Similarly, said slot 103 is provided with a set of notches 109, each notch comprising a cam portion 110 having a locking shoulder 111, said notches 109 being respectively normally disposed below and in alignment with said pins 82 of said stopping time minute key 77 (see Fig. 19).

Said slide 100 is provided with two sets of notches, one set of notches 112 being linear and of non-cam effect but having the locking shoulders 113 (see Fig. 18) and disposed normally laterally in alignment with said notches 106 in said slide 97 and another set of notches 114, each having a cam 115 and disposed normally laterally in alignment with said notches 109, in said slide 103. In such arrangement said notches 107 in slide 97 are staggered relatively to said notches 109 in said slide 103 and the non-cam notches 112 alternate with the cam notches 114 in said slide 111, the notches 112 and 114 (Figs. 8 and 18) and of graduated vertical heights respectively corresponding to the normal vertical positions of said pins 81, 82.

Said slides 97, 100 and 103 (see Figs. 9 and 14) are respectively pivoted to three upright arms 84, 85 and 86, each loosely pivoted on the stud 83 and provided with a tail portion 87, respectively normally tensioned by individual springs 90. Each arm 84, 85 and 86 is provided with the slot 88 through which projects a pin 89 fixed in the sub-frame 71, 72, whereby the normal positions of said arms 84, 85 and 86 and therewith said slides 97, 100 and 103 are determined.

Upon depressing any starting time minute key 76 its locking pin 81 engages the cam portion 107 of the notch 106 of slide 97, and forces said slide 97 (see Figs. 9 and 18) to the right and counter to the tension of its spring 90 and for an extent determined by the effective value of its cam portion 107, until said pin 81 passes below the locking shoulder 108 of said notch 106, whereupon said slide 97 is forced to the left, to securely lock said pin 81 under said shoulder 108. In said Figure 9, the starting time "40" minute key is shown in fully depressed position.

Simultaneously upon depressing any starting time minute key 76, and by reason of its pin 81 being in alignment with the notch 112 of the central slide 100, its pin 81 enters said non-cam notch 112, but without disturbing the slide 100 from its normal position.

Now, upon depression of any stopping time minute key 77 (see Fig. 10) its pin 82 enters the notch 109 of slide 107, then rides the cam 110 thereof, thereby forcing the slide 107 to the right, while the pin 82 simultaneously enters the notch 114 of the central slide 100, riding its cam 115, thereby forcing the central slide 100 to the right (see Fig. 20), until it attains its extreme depressed position, where the pin 82 is locked under the locking shoulder 111 of said notch 109 in said slide 103 but holding the central slide 100 to the right. Such movement of the central slide 100 to the right causes the pin 81 of said starting time minute key 76 to be held under the locking shoulder 113 of said non-cam notch 112. The final positions of the pins of the depresed fractional hour keys and the slides are represented in Fig. 21.

Such movement of the central slide rearwardly, upon depression of any stopping time minute key 77, as is apparent from Fig. 20, causes the stop portions 117 to be brought below the respective pins 81 of the starting time minute keys 76, thereby preventing after depression of any stopping time minute key the operation of any starting time minute key. Such preclusion of the operation of any required stopping time minute key in advance of any required starting time minute key applies merely by reason of the pins 18 of the time wheel 13 being positioned clockwise relatively to the corresponding pins 48 of equal fractional value in the time wheel 14, as will be apparent from the particular construction shown in the drawings and described hereinabove.

Upon the rearward movement of the central slide 100, under locked conditions of said starting and stopping minute keys, said face portions 117 will be brought below the respective pins 81, 82 of the non-manipulated keys, whereby any attempt to depress additional starting or stopping time key or keys is precluded.

The release of the depressed keys from locked position is effected upon operation of the main shaft 15, as is explained more fully hereinafter, or by operation of the error key, and its control mechanism.

(c) ERROR CONTROL MECHANISM.

In the particular form of the invention illustrated in the drawings, the error control mechanism is associated with the key locking mechanism. Referring to the general view in Fig. 4, the "Error" key is indicated at 120. Referring now to Fig. 80 (Sheet 26) said key 120 is connected to the bell crank 122, pivoted at 123 to a stud fixed to the end frame 3. The bell crank 122 is pivotally connected at its lower arm 124 to the link 125, the latter extending forwardly of the machine and at its forward end pivotally connected to the arm 126 fixed to the rock shaft 127, suitably mounted between the sub-frames 71, 72, as particularly shown in Fig. 11 (Sheet 9). Said rock shaft 127 is further provided with three pins, two designated 128 and normally positioned slightly forwardly of the respective arms 94 and 95, respectively, suspending the aforesaid locking slides 103 and 100, and the third pin 129 similarly arranged with respect to the arm 96 suspending the locking slide 97. As will be noted from Fig. 80, the two pins 128 and the pin 129 are staggered to actuate the three slides successively in a determined order. Thus, upon manipulation of the error key 120, the said rock shaft 127 is rotated in anti-clockwise direction, causing the pins 128 to respectively strike and rotate the suspension arms 94, 95, thereby pushing the slides 103 and 100 to the right (see also Figs. 18 and 21), and to further cause the pin 129 at a subsequent instant to strike and rotate the suspension arm 96 and thereby push the slide 97 also to the right. Such movement of the locking slides releases firstly the depressed stopping time minute key, as appears from Figs. 18 and 21, namely by releasing the locking pin 82 of the depressed stopping time minute key 77 from its locking notch 111 in the outer slide 103, and also from the pin 81 of the depressed starting time key from the notch 113, of the central slide 100, whereupon the subsequent sliding of the other outer slide 97 releases the locking pin 81 from its locking notch 108 in the slide 97.

In addition to restoring the manipulated minute key or keys, as aforesaid, means are provided for releasing the set hour pins in the time wheels 13, 14. Referring to Figs. 5, 6 and 81, as well as Fig. 80, I have provided the releasing cams 130 rotatably and axially mounted on bearings of the main shaft 15, guided by the pins 132 fixed to said bearings and received in the axis slots 131 extending transversely to the axis of the shaft 15. Fixed to each cam 130, and projecting downwardly (see Fig. 80) is an arm 137 connected by a link 138 to the arm 139 fixed to the rock stud 140, also connected by its arm 141 to the link 142, lever 143 (pivoted at 144) and link 145 to the bell crank 122.

The hour pins of the time wheels 13, 14 are respectively provided with means cooperating with said time cams 130 to restore the set hour pins for all possible positions of the time wheels 13, 14. As indicated in Fig. 81, and also in Fig. 6, such suitable restoring means comprises the head 49 on each pin and the individual levers 134 pivoted to the studs 135, respectively carried on the outer faces of the time wheels 13, 14, each lever 134 coacting at one end with the head 49 of each pin and provided with the roller 133 at its other end, adapted to be engaged by the cams 130.

The aforesaid restoring or cancelling means of the hour and minute keys and control mechanism is controlled manually by the "Error" key 120, or is operated automatically as releasing means through the instrumentality of the angular lever 631 (see Fig. 79) an element of the general actuating mechanism of the machine, as appears more fully hereinafter.

(c) REPEAT MECHANISM.

The repeat control mechanism is associated with the hour and minute key control mechanism. The repeat key is marked "Repeat" and designated 645, see Fig. 4.

Referring to Fig. 80, the repeat mechanism comprises the bell crank lever 647, to which the repeat key 645 is pivotally connected at 646, said lever 647 being loosely mounted on the stud 123 carried by the frame of the machine, on which stud 123 is also pivotally mounted the bell crank lever 122, referred to under "error mechanism". The arm 648 of lever 647 is normally held against the pin 649 fixed to said error lever 122 by the retractile spring 650 extending from the lever 122 to the lever 647. Upon the anti-clockwise rotation of said angular arm 631 (see Fig. 80) its pin engages the hook of said arm 648, thereupon causing said lever 647 to rotate until the pin 631 is freed from the arm 648, which is an idle movement, but upon the opposite rotation the pin 651 is caught in the hook 648, forcing the lever 647 against pin 649, thereby rocking the releasing lever 122 to release the depressed hour and fractional time keys, thereby clearing the time key mechanism which ensues, as explained above, automatically under operation of the general actuating mechanism.

However, to effect the repetition of any mathematical computation, the repeat key 645, is depressed thereby rocking the lever 647 until it strikes the pin 653, on the lever 122, (the latter being limited in movement by the pin 652, fixed to the frame of the machine), whereby upon operation of the general actuating mechanism, including the angular arm 631, the tip 64 of lever 647 will not be encountered by the pin 651, of the arm 631, and the releasing mechanism is not operated, and accordingly the manipulated keys retained in position as if again manually depressed. Such repeat operation is continued as often as the repeat key 645 is operated.

(d) ELAPSED TIME CAM MECHANISM.

As generally referred to hereinabove, the remainder mechanically derived between the two values, represented by the manipulated keys, specifically the elapsed time between the starting and stopping times, is mechanically transferred through the intermediation of the main shaft, namely, by controlling the extent of effective rotation of the main shaft.

The determination in value of the derived difference or remainder is performed mechanically by elapsed time determination means comprising time cams embodying means arranged projectively with reference to the circular peripheries of the time cams and coacting means for indicating or recording the determined values.

Referring to Fig. 2, showing the general plan, and also to Figs. 25 to 27, for more detail construction, the time cam mechanism comprises three individual cams designated 210, 211 and 212, the first named being constructed to determine minute values, the second named constructed to determine unit integer hour values, and the last named constructed to determine decimal integer hour values. In specific forms of the invention herein, wherein the elapsed time values, or other remainder values of a plurality of subtrahends and minuends, exceed two integers, then the number of time cams is correspondingly increased, as will be understood.

Said cams 210, 211 and 212 are fixed on the main shaft 15 and in fixed relation to one another.

The positions of the cams 210, 211 and 212 are respectively shown in Figs. 25, 26 and 27 in the neutral positions. Referring to Figs. 25 et seq., each time cam is subdivided into substantially eleven portions, corresponding to the maximum elapsed time period for the specific key board shown in Fig. 2, and accordingly, the sub-portions of the time cams correspond in number to the maximum time interval for which the machine is designed.

The sub-portions of the minute value time cam 210 are indicated by the arabic numbers appearing on the radial lines of sub-division, one radial line being designated "0." The subdivision marked 213 extends from the "0" to the "1" radial lines and comprises six steps respectively designated 214, 215 to 219, the first step 214 representing zero minute value, 215 ten minute value, 216 twenty minute value, etc., 219 representing fifty minute value. Similarly, the remaining sub-portions of the minute value time cam 210 are provided with corresponding six steps for the value of ten hours. The sub-portion designated 239 between the "10" radial line and the succeeding unnumbered radial line comprises but four steps respectively, representing zero, ten, twenty, and thirty minute values, in view of the value of ten hours and thirty minutes being the maximum possible elapsed period for the selected time key.

Substantially coincident with the "0" radial line extends the edge of the recess 580 serving as a neutral clearance to provide an unobstructed path for the finger 220 in the operation of recording the determined value of the minute time cam.

Similarly, the unit time wheel 211 is subdivided into radially arranged portions between the equi-divergent lines marked with arabic numbers, to the maximum of ten hours. Thus, the circularly projected portion 221 represents zero value in unit hours, 222 one hour, 223 two hours, etc., 230 representing the nine hours. The step 231 represents zero hour value, since the unit integer of ten is zero and the decimal integer values in excess of nine are taken care of in the decimal integer hour value cam 212, as appears more fully hereinafter. The unit integer hour cam 211 is similarly provided with the clearance 580, cooperating with the finger 232 of the elapsed time designation means.

Similarly, the decimal hour cam 212 is projectively sub-divided as indicated by arabic number of hours, wherefore the circular ime of projection 242 represents zero values. The step 233 represents the value of "one," and steps of increased decimal integer values are unnecessary in view of the maximum possible elapsed time represented by the particular key board shown. Said decimal integer time wheel 212 is similarly provided with the clearance 580 cooperating with the finger 234 of the determination means.

The minute, unit, decimal time cams 210, 211 and 212, are arranged on Sheet 13 in their respective neutral positions corresponding precisely to the neutral position of the aforesaid time wheels 13, 14, shown in Fig. 24. In Figs. 29, 30, and 31, the aforesaid minute, unit and decimal hour cams are shown in their respective positions for the elapsed time period of six hours and fifty minutes derived in the aforesaid example, comparing precisely with the corresponding rotation of the time wheel 13, 14 for the same elapsed time period, indicated in Fig. 28.

In Figs. 29, 30, 31, the time cams 210, 211 and 212 have been rotated in clockwise direction by the main shaft 15, and the determination fingers 220 (see Fig. 29), projected to seat on the fifty minute step 219, of the sub-portion between the radial hour lines marked "6" and "7"; the finger 232 (see Fig. 30) seated on the step 227, corresponding to the hour of six of the unit integer hour cam 211, and the finger 234 (see Fig. 31) seated on the circumferential step 242, corresponding to the value of zero of the decimal hour cam 212.

Referring now to Fig. 32, the aforesaid parts and other parts of the elapsed time determinating means are shown in their neutral positions, the said time cams 210, 211, 213, being fixed in parallel planes on the main shaft 15, and fixedly connected to one another by the bolts 240, and showing also the clearances 580 of all cams in lateral alignment to one another and in register with the respective determining fingers.

As shown in Fig. 32, the projecting mechanism of the determinating fingers comprises the common bar 285, suitably supported on the frame, and provided with perforations for the respective fingers 220, 232 and 234. Also each finger is pivotally mounted on a link 281, respectively pivoted to the segments 282, 283, 284 (indicated generally in Fig. 48 Sheet 19) each having an open hub portion 286 loosely mounted on the common rod 420. Each segment is provided with a tail portion 287, tensioned by the retractile spring 289 (see Figs. 32, 33). Said segments are held in neutral positions by the respective rods 300, respectively uni-directionally connected to the multiple arms 301, fixed to one another and to the downwardly projecting arm 592, (see Fig. 3). Said arms 301 are loosely mounted on the rod 302.

By reason of the uni-directional connection of each rod 300 with its arm 301, clockwise rotation of the multiple arms 301, the spring 289 effect operation of the segments, respectively determined by the fingers 220, 232, and 234 in coaction with the time cams 210, 211, and 212, for measuring the decimal and unit hour and minute values, as indicated above in reference to Figs. 29, 30 and 31.

Fig. 33 shows the aforesaid parts of the determination mechanism in projected positions corresponding to the elapsed time value of 6 hours, 50 minutes, the relative positions of the time cams 210, 211 and 212 being respectively shown in Figs. 29, 30 and 31.

To indicate the elapsed time measurements, I have shown a printing mechanism comprising printing elements for recording the elapsed time periods.

As is explained more fully hereinafter, the time segments 202, 203, and 204 of the time measurement mechanism coact with the adding mechanism under the control of an adding key.

(2) *Elapsed time printing mechanism.*

The portion of the printing mechanism for indicating any desired elapsed time period, is shown operated directly by the elapsed time measurement mechanism. Referring to Figs. 32, 33, 34, and 35, the printing mechanism comprises vertically moving type carriers, in the specific case illustrated being three in number and corresponding respectively to the decimal integer hours, the unit hours and the minutes at the selected minute intervals, said carriers being contained in the minute intervals, said carriers being contained in the laterally surrounding casing 252. The type carriers 251 for the decimal and unit hours respectively, each contain a set of ten type bars 253, bearing types in successive order, reading vertically downwardly, from "0" to "9". The carrier 254, of the minute values, contains a set of six type bars 255, each of double types, reading in successive order, vertically downwardly, "00", "10", "20", "30", "40", and "50" (see Fig. 53, Sheet 20).

Each type bar is mounted in an open-sided slot in the carrier 251, as indicated in Fig. 34, which figure shows for the sake of clearness one type bar, the seventh in its order, removed. The sets of type bars are held in their respective carriers by the springs 257, which springs also coact with the respective pins 258 to normally hold each type bar so that its type head 259 abuts against the front face of the casing.

Each type carrier is supported on its carrier arm 260, provided with a longitudinal slot 261, receiving the guide bars 262, fixed to the frame work. Spacing collars 263 (see Fig. 52) are located on the guide rods 262, to space the carrier arms 260 as desired.

The types co-operate with the typing roll 264, similar to a type-writer, as indicated in Fig. 52.

The specific form of type indicated is of the hammer type, each type carrier being provided with a type hammer 265, each loosely mounted on the fixed shaft 249. Each hammer 265 is normally held in retracted position by its individual hammer lock 266, engaging a roller 267 carried by each hammer 265. The locks 266 are individually loosely mounted on the fixed shaft 268, suitably carried by the frame. Each hammer 265 is provided at the end of its tail with a roller 269, cooperating with the respective cams 270 fixed to the common shaft 271 and each lock 266 with a nose 273 cooperating with the cam 275 mounted on the shaft 276. The hammers 265 are actuated by their individual springs 272.

Each cam 275 is provided with an upwardly extending arm carrying the pin 277, fixed thereto, said pins 277 coacting with the respective shoulders 278 on the carrier arms 260. Each cam 275 is further provided with a downwardly extending arm, normally tensioned by the spring 279 to keep its pin 277 in engagement with the shoulder 278 of the respective carrier arms 260. As further shown in Figs. 56, to 59 (see Sheet 20) each cam 275 is provided with a stop surface 280 adapted to coact with the nose 273 of each hammer lock 266 and thereby hold the hammer lock against its hammer and prevent printing.

Returning to Figs. 32 and 33, Sheets 14 and 15, it will be noted that said tail portions 287 of the respective segements 282, 283 284 are connected by the links 288 to the respective type carrier arms 260. Upon setting the determining fingers 220, 232 and 234, the extents of projection of the same correspond to the extent of vertical elevation of the three type carriers, 251, 252 and 254. In Fig. 53, Sheet 20, I have indicated the printing line at 304—304, corresponding to the plane of alignment of the heads of the hammers 265, as shown in comparative vertical relation in Fig. 52. In Fig. 33, the determining fingers 220, 232 and 234 have been projected relatively to the time cams 210, 211 and 212, respectively; for the above assumed elapsed time period of 6 hours, 50 minutes, and in Fig. 53 the integer hour type carriers 251 and the minute type carrier 254 are shown respectively elevated to print the aforesaid value of "6 50", in correspondence therewith, as appears on the printing line 304—304.

Upon elevated movement of any carrier arm 260, of the respective decimal and unit hour and the minute type carriers, its pin 277 of the cam 275 will have been unseated from the shoulder 278, on its cam 260, thereby rotating its cam 275 sufficiently to present its notch 274 in advance of the nose 273 of its lock 266 to thereby release the lock, whereby upon subsequent rotation of the common release cam 270 (by operation of the shaft 271 through the instrumentality of the handle of the machine or under power of the motor, as explained more fully hereinafter), each hammer 265 of the operated decimal and unit hour and the minute type carriers is actuated to impact the respective type bars. In the example given, the type bar "6" of the unit hour type carrier and the type bar "50" of the minute type carrier; thus effect the printing of "6 50" as appears in Fig. 54, second printed column.

It is here pointed out that whereas other type carriers are provided for printing other data, as will appear in detail hereinafter and the cams 275 of such other type carriers are similarly mounted on the common supporting bar 276, and their operating cams 270 simultaneously rotated by the shaft 271, only the cams 275 corresponding to the elevated type carriers are operated to impacting position, and the non-elevated type carriers, by means of their respective pins 277, seated against the shoulders 278 of their respective carrier arms 260, cause their cams 275 to remain in neutral position to lock the corresponding hammers 265 in non-operating positions, by means of their noses 273 being held against the stop portions 280, of such neutrally positioned cams 275.

For the purpose of printing a zero indication by a type carrier representing the lower denomination or denominations when its associated type carrier of higher denomination is moved to printing position, I have provided the pins 674 on the cams 275 of the denominations above the lowest, each cam 674 being adapted upon the operation of its segment of higher denomination to engage the pin 675 of the adjacent cam corresponding to the segment of the next lower denomination and thus rotate the cam or cams 275 of the lower denominations or denominations, and permit the hammers of the same to print "0", even though its segment has not been actuated from neutral. Thus, as illustrated on the printed list, Fig. 54, second line, middle column, the printing of the time value "10 00" is effected by the actuation of the decimal integer hour segment through an extent of movement representing the value of one, with corresponding movement of its type carrier arm 260, whereby its cam 275 is rotated to release its hammer lock and also the hammer locks of the unit hour and minute type carriers, whereby upon movement of the common release cams 270, the respective three hammers 265 effect the printing of the value of ten hours.

(3) *Wage determining mechanism.*

The means for determining the wage for any particular elapsed time period and at any particular wage rate comprises generally determination means operated by the main shaft through an extent of actuation corresponding to the derived elapsed time period, said determination means being provided with determination steps corresponding to the possible wage values for the possible elapsed periods at the particular wage rates respectively. For simplicity of operation, each wage determining means in the specific embodiment of the invention shown in the drawings, comprises individual means for the respective particular wage rates, arranged as replaceable, and mounting means for readily receiving or removing such unitary group of wage rates, thereby providing for an indefinite number of wage rates.

Each individual wage determining means comprises a number of wage cams, respectively corresponding to the cent and dollar values to the extent for which the machine may be designed. In the particular embodiment shown in the drawings, each particular wage determining means comprises four cams corresponding respectively to the unit and decimal cent values and the unit and decimal dollar values, thereby providing for the maximum monetary value of $99.99 for each particular wage rate. The mechanical unit of a group of particular wage rates is shown as comprising five (see Fig. 4), corresponding to the wage rate keys 325 . . . . 329. For each group of particular wage rates, there is provided an indicating scale 330, bearing the respective values of the particular wage rates adapted to be positioned on the top plate of the machine and in alignment with the said wage rate keys. Such scale is readily demountable to be replaced by the scale corresponding to another group of particular wage rates replaced in the machine.

The particular scale 330 shown in Fig. 4, provides for hour wage rates, say "25," "33," "37½" and "50" cents per hour, and the overtime wage rate of "37½" cents per hour.

In the particular embodiment of my invention illustrated in the drawings, the indication of the wage determination is effected by printing on the paper strip or listing, as indicated in Fig. 54, the same appearing in the extreme right-hand column.

The individual wage cams are shown in Figs. 40 to 47, Sheet 17, respectively representing in neutral positions the decimal dollar cam 351, the unit dollar cam 350, the decimal cent cam 349 and the unit cent cam 348. As indicated in Fig. 36, these respective cams are mounted fixedly on a common shaft 334, and in fixed relation to one another by means of the bolts 346.

Referring to Fig. 43, the unit cent cam 348 is provided with steps arranged projectively, circumferentially and radially, for the required unit cent values occurring in the wage for the possible elapsed periods and for the particular wage rates. The unit cent wage cam 348 is divided circumferentially into twelve equal sub-divided portions, each portion containing six steps, the radial displacements of each step corresponding to the unit cent values, occurring in the wages for the respective hours and ten-minute intervals, the nine values in unit cents being indicated by the dotted circumferential lines designated 372, each displaced radially from the next immediate by a unit value spacing. Thus, as shown in Fig. 43, the stop 359, being on the extreme circumference, represents zero cent value, step 360 a four cent, step 361 an eight cent, step 362 a two cent, step 363 a seven cent, step 364 a one cent, step 365 a five cent, step 366 a nine cent, step 367 a three cent, step 368 an eight cent, step 369 a two cent value and finally step 370 a six cent value. These respective twelve steps comprise an elapsed time period of two hours, embracing twelve ten-minute periods, and correspond to the unit values, in the 25¢ wage values of 4, 8, 12, 17, 21, 25, etc. to 50 cents.

The determining pin 355 coacts with the aforesaid steps of the unit cent wage cam 348.

Similarly, as indicated in Fig. 42, the decimal cent wage cam 349 is sub-divided circumferentially into twelve equal sub-divided portions, the radial displacement of each step corresponding to the decimal cent value occurring in the wage for the respective hours and ten-minute intervals, the nine decimal cent values being indicated by the dotted circumferential lines designated 375 displaced successively radially by a ten cent value spacing. Thus, the step 376 being disposed on the extreme circumference represents a zero value, step 377 the decimal one, step 378 the decimal two, etc. to step 385 representing the decimal nine value, the aforesaid comprising ten steps, covering the extent of four hours for the specific wage rate of twenty-five cents per hour. The steps of the remaining sub-portions of the decimal minute time cam 349 provide for the decimal cent values for the respective wages in excess of the elapsed time of four hours. The determining finger 356 coacts with the aforesaid steps of the decimal cent wage cam 349.

The unit dollar wage cam 350 is similarly divided into sub-portions, see Fig. 41, the step 388, coincident with the circumference of the cam 350 representing zero value, the step 389 the value of one and the step 390 the value of two. The determining finger of the unit hour wage cam 350 is indicated at 357.

Similarly, as indicated in Fig. 40, the decimal hour wage cam 351 is provided with the required number of steps, which in the specific instance of the wage rate of 25¢ per hour for the elapsed time values represented by the keyboard, comprises but the zero step indicated by the long arc designated 391. The determining finger of the decimal hour wage cam 351 is indicated at 358.

The clearances 580 of the decimal and unit dollar wage cams 351, 350, and decimal and unit cent cams 349, 348, are in alignment with the recesses 580 of the time cams 210, 211, 212.

In Figs. 44 to 47, the aforesaid four wage cams for the particular wage rate of 25¢ per hour are shown actuated through an arc of movement corresponding to an elapsed time period of 6 hours, 50 minutes, and in accordance therewith, the determining finger 355 abuts the "1" step 362 of the unit cent cam 348, the determining finger 356 abuts the "7" step 383 of the decimal cent wage cam 349, the determining finger 357 abuts the "1" step 389 of the unit dollar wage cam 350 and the determining finger 358 the "0" step 391 of the decimal dollar wage cam 351, thereby registering in projected positions the monetary value of $1.71, the wage for the elapsed period of 6 hours, 50 minutes at the particular wage rate of 25¢ per hour.

The individual decimal and unit dollar and cent wage rate cams are thus constructed and arranged for the particular wage rates respectively of each group of wage rates, as indicated in Fig. 49 by the bracketed groups each of four cams, all mounted fixedly on the common shaft 334 of the replaceable unit.

As shown in Figs. 2 and 50, Sheet 2, the shaft 234 of the grouped rate cams, is removably connected to the main shaft 15, of the machine; this specific construction as shown comprises the coupling member 331, fixed to the end of the main shaft 15 and the coacting coupling member 335 fixed to the shaft 334 and a pin and recess connection comprising the pins 333 on the coupling member 331 and the recess 336 and slot 337 in the other coupling member 335. As shown in Figs. 36 and 51, Sheet 16, the opposite end of the shaft 334 is removably seated in the bearing 338 having an open upper side, and locked therein by the slide 339, operated by the pivoted arm, 341 and link 340. The plate 342 is a guide for the arm 341. The locking slide 339 is provided with the upper laterally extending flange 345, to preclude the dislocation of the shaft through the open side of the bearing 338. Fig. 36 shows the lock in closed position, whereas Fig. 51 shows the same in unlocked position.

It will be understood that the rate cams for any particular wage rate operate separately from the rate cams of any other particular wage rate or rates, and that the set of cams for any particular wage rate may be grouped with the set or sets of cams for any other wage rate or rates as desired.

Referring now more particularly to Fig. 36, the determining finger 355 of the unit cent wage cam 348, (similarly the fingers 356, 357 and 358) respectively of the decimal cent and unit and decimal dollar wage cams, is mounted in and guided by the recessed bar 285, suitably supported by the side frames 4, 7. Each such determining finger is pivotally connected at 400 to the double link 401, is carried in a common stirrup 407, pivotally depending from its wage rate key. In Fig. 36, the key 325 and unit cent wage link 401 are shown in neutral positions, whereas in Fig. 37 they are shown in depressed positions.

The two parts of the double link 401 of the unit cent rate cam, are spaced apart to form the slot 402, and are provided with the double arcuate slots 403, affording ready connection with and disconnection from the head 421, and its opposite pins 422, of the unit cent wage transfer member 418. The posterior sides 404 of the slots 403 extend downwardly to form wings, to insure catching the pins 422 within the slots 403, when the link 401 is being depressed to position the head 421 within the slot 402. The depressed position of each link 401 is indicated by the dotted outline shown in Fig. 36, in which position each link remains in neutral or retracted position. Similar connection and disconnection means is provided for the three other links 401 with their respective transfer members 426, 428 and 430, respectively corresponding to the decimal cent, unit dollar and decimal dollar values.

Each link 401 is provided with the tail piece 406, adapted to strike the stop bar 417, when in neutral position, and the stop bar 416 is positioned to limit the downward movement of each set of links 401.

Each transfer member 418, 426, 428, 430 comprises a hub loosely mounted on the fixed shaft 420. Said unit cent transfer member 418 is connected by the set of three equi-spaced rods 423 to its segment gear 424, (see legend "Unit cents" Fig. 48) which in construction and operation is similar to the aforesaid segment gear 284 (see Fig. 32), of the elapsed time determining and printing mechanism, said wage determining and printing segment gear 424 being similarly released by link 300, release arm 301, mounted on the common shaft 302, and similarly controlling a carrier arm 260 secured to the type carrier 425 (see Figs. 48, 49) similar to said type carrier 251, comprising type bars 255. Similarly, the transfer members 426, 428 and 430 are respectively connected by the three sets of equi-spaced bars, 433, 435 and 437, to the wage segments 434, 436 and 438, respectively designated in Fig. 48 by the legends "Decimal cents", "Unit dollars" and "Decimal dollars", corresponding to their monetary values.

The type carriers respectively controlled by said wage segments 434, 436 and 438 are designated 439, 440, 441 respectively. Fig. 53 shows the face of the types of the unit cent carrier 425, decimal cent carrier 439, unit dollar carrier 440 and decimal dollar carrier 441, and in accordance with the design of the machine may comprise ten single types each, from "0" to "9", each type carrier being provided with its individual type hammer 265, operated and controlled similarly to the aforesaid corresponding parts of the elapsed time printing means.

Fig. 54 shows the extreme right-hand column bearing the printed data of the determined wage values.

Fig. 48, for the sake of clearness, shows but one connecting rod of each set of rods 423, 433, 435 and 437, and illustrates the general arrangement of each unit cent wage transfer member, each of the sets of wage cams which may be grouped as desired in the replaceable unit, controlling the unit cent segment, in turn controlling the unit cent printing means; similarly, the decimal cent transfer member controlling the decimal cent printing means, and the unit and decimal dollar transfer members respectively controlling the unit and decimal dollar printing means.

Fig. 48, also Fig. 36 generally, shows the hubs 419, 427, 429 and 431, in the first named, of increasing diameters and, further, the three last named hubs respectively provided with one, two, and three arcuate slots 432 to afford non-interfering arcuate paths of movement of the respective sets of rods.

Means are provided for positively effecting the operation at any time of solely one wage rate key and its set of wage determining fingers and coacting wage indicating means. To this end, the wage rate keys 325 . . . 329 are provided with the control slide 412 having cam slots 411 adapted to receive the pins 410 respectively carried by said wage rate keys, said slots 411 being each provided with the locking notch 443; the slide 412 is normally biased by the retractile spring 415, having its one end connected in the eye 413, of the slide 412, and its other end connected at any fixed point on the side-frame 4, see Fig. 37. Each wage rate key, see Fig. 36, is further provided with a restoring expansive spring 408 having its one end engaging the pin 410, and its other end abutting the shelf 409, having recesses through which the said wage rate keys are respectively projected. Such shelf 409 serves also to loosely support said slide 412. Thus, upon depression of any wage rate key, as for example the key 325 shown depressed in Fig. 37, its pin 410 is locked in the locking notch 443 of its slot 411, whereby upon attempting to depress any other wage rate key the pin 410 of such other key engages its cam 411, causing the slide 412 to move to the left, see Fig. 37, causing the pin 410 of the previously depressed wage rate key, say key 325, to emerge from its locking notch 443 and enter its slot 411, whereupon its spring 408 restores such depressed key to neutral position, and its set of determining fingers thereupon moved to non-operative position.

It will be noted that the effective portion of each cam slot 411 is reached by the pin 410 of any manipulated wage rate key in advance of its locking notch 443, whereby any wage rate key is not set in depressed position unless manipulated to its extreme depressed position; and, accordingly when it is desired to have all wage rate keys in neutral position, the depressed wage rate key employed in the last calculation is restored by partial depression of any other wage rate key.

As will be recalled from the aforesaid operation of the elapsed time measurement mechanism, the depressed starting and stopping timekeys, in the computations of the successively elapsed time periods are automatically returned to neutral upon the operation of the main shaft and other actuated parts of the machine. The setting of any wage rate key, however, continues until manually caused to return to neutral, in conformity to the usual circumstance in the calculation of pay rolls of a number of elapsed time periods being at the same wage rate, either for the same employee or a number of employees employed at a common wage rate.

The determining fingers 355, 356, 357, 358 are projected relatively to their respective wage cams by their respective springs 289, see Fig. 32, of the corresponding segments 424, 434, 436, 438, of the wage determining mechanism. Accordingly, the respective determining fingers 355, 356, 357 and 358 are projected for extents of movement determined by the encountered steps on the respective wage cams, thereby rotating their transfer members respectively through commensurate arcs in clockwise direction, (see arrow in Fig. 36) and corresponding extents of movement imparted through the respective sets of connecting rods to the respective segments 424, 434, 436 and 438, controlling the respective printing carriers.

Fig. 48 shows the aforesaid parts of the elapsed time and wage determining mechanism in neutral positions, whereas Fig. 49 shows the same in position for printing the elapsed time period of 6 hours, 50 minutes and the wage determining segments in position for determining the corresponding wage of $1.71 at the assumed wage rate of 25¢ per hour.

The resulting actuation of the printing mechanism is indicated in Fig. 53 and the printed data in Fig. 54 (Sheet 20), namely, "6 50", the elapsed time period, and "1.71", the corresponding wage at the assumed wage rate of 25¢ per hour.

(4) *Adding and total mechanism.*

The adding mechanism comprises two sets of adding mechanisms, one for the summation of the wage for any desired sequential number of computations and the other for the summation of the corresponding elapsed time periods. The recording of the summations is controlled by a common key 547, denoted "Total," see general view of machine in Fig. 4. The adding mechanisms effect the summations of the monetary values and elapsed time periods as the successive computations are derived, and upon recording the summation by operation of the "Total" key 547 are "cleared" to zero resetting, preparatory to effect the summations of subsequent computations.

The elapsed time mechanism comprises co-ordinated counter mechanisms individually co-operating with the respective three elapsed time segments 282, 283 and 284, representing respectively the decimal and the unit hour and the minute values; and suitable carry-over means for carrying-over the values from the counter mechanisms of lower denomination to the higher. Similarly, the wage value adding mechanism comprises co-ordinated counter mechanisms co-operating respectively with the four wage segments 424, 434, 436, and 438, representing respectively the unit and decimal integer cent and the unit and decimal integer dollar values. The general view, in top plan, of the two adding mechanisms is shown in Fig. 2 on a reduced scale and in Fig. 65, Sheet 22, on an enlarged scale, the adding mechanism of the wage values being designated 450 and that of the elapsed time periods designated 451, the former comprising four component trains of counter mechanism, corresponding to the four actuating wage segments and the latter three component trains of counter mechanism, corresponding to the three actuating elapsed time segments, said component trains being mounted on separable frames and positioned above the respective groups of actuating segments, as will be seen by comparing Fig. 2 with Fig. 48, Sheet 18.

The respective adding mechanisms of the wage values and the elapsed time periods are of like construction and operate in like manner, and accordingly a detail description of the adding mechanism of the elapsed time period determining mechanism, will suffice to fully disclose the construction and operation of the adding mechanism of the wage values.

Referring to Fig. 32, Sheet 14, each segment is provided with spur teeth at its upper, enlarged head, meshing with the gear 453, loosely mounted on the fixed shaft 455, mounted at its ends in the frames 6, 7. Said gear 453 is brought in mesh with the origin counter wheel 456 under control of cam mechanism controlled by the shaft 488, actuated in proper sequence under manual or power control, as indicated in Figs. 64, (Sheet 21) and Fig. 66 (Sheet 22).

The counter mechanism is shown on an enlarged view in Fig. 66 (Sheet 22) in neutral position, but in Figs. 69 to 72 (Sheet 23) in sequential operated position.

Each origin adding wheel 456 is fixed to a disk 460 carrying the carry-over pin 461; in Figs. 69, 70 and 71 the pin 461 is in section by reason of the removal in these figures of the adding wheel 456 of lowest denomination to show more clearly other parts of the adding mechanism. The carry-over finger 462 is pivoted at 463 to the rock arm 464, pivoted on the stud 459 on which the sub-frame 458 is pivoted. The operating end of the finger 462 is controlled by the movable support 465 pivoted on the shaft 466 carried by the sub-frame 458. The movable support 465 is provided with the ears 467 for retaining the adding finger 462. The spring 468 tends normally to bias the finger 462 downwardly. The bell crank 472 is pivoted on the stud 459, one end 473 of said bell crank being connected by the retractile spring 469 to the pivoted finger support 465. Said bell crank 472 is provided with two spaced recesses, one designated 471, relatively shallow and more closely adjacent the pivot 459, serving as the neutral recess, and the other designated 575, relatively deeper and more distant from the pivot 459, serving as the operative recess, enabling the finger 462, when actuated as set forth hereinafter, to engage its counter wheel 456 to advance the same effecting the carrying-over of the value of unity.

The sub-frame 458 carries the lever 476 by means of the pivot stud 475, said lever 476 being connected by the link 478 to the movable support 465 of the said finger 462.

The retention of the counter wheel 456 at any given position is insured by the ratchet gear 481 (see Fig. 66) provided with the dog 482 and tensioned by the spring 483 to brake the ratchet gear 481.

Referring to Fig. 65, it will be noted that the respective origin counter wheels 456 are similarly mounted, side by side, and controlled in movement by individual retaining means as aforesaid.

Each segment of the wage and elapsed time mechanisms is provided with its respective train of counter mechanism, each comprising such origin counter wheel 456, the counter wheel of the wage mechanism being constructed on the basis of ten, whereas the counter wheels of the elapsed time mechanism are constructed respectively on the basis of sixty for the minutes, twenty-four for the hours, seven for the days, etc., and for a further extent as may be desired.

The meshing of the respective origin counter wheels 456 is effected upon the downward movement of each sub-frame 458 through the instrumentality of cam control means comprising (see Figs. 67, 68) pairs of intermeshing gears 487, mounted respectively fixedly on the shaft 488 and the shaft 489, and cams 486 engaging on opposite sides the roller 485 on the shaft 466 controlling the adding sub-frame 458, said cams having their cam portions displaced angularly whereby upon clockwise rotation of the shaft 488, the shaft 466 and sub-frame are elevated, as indicated in Fig. 68, and the adding mechanism moved to non-operative position and upon anti-clockwise rotation of the shaft 488, the shaft 466 and sub-frame 458 are depressed, as indicated in Fig. 67 and the adding mechanism moved to operative position.

The control of the carry-over movement of the fingers 462 of the respective individual adding mechanisms is effected by means of the four-arm rocking lever 498 and double cam 503 mounted on the shaft 502, one arm of said lever 498 being pivotally connected at 497 to the link 496 oscillatably mounted by pivotal connection at 463 with the arm 464, as aforesaid, pivotally mounted on the sub-frame 458. The opposite arm of the four-arm rocking lever 498 is pivotally mounted on the rod 499, the remaining two arms laterally and oppositely disposed, being provided with the rollers 500, 501, in operative relation with the double cam 503. Each cam 503 is provided with an elevated cam portion 504 and a depressed cam portion 505, respectively cooperating with the roller 500 and further with the elevated cam portion 506 and the depressed cam portion 507, respectively cooperating with the roller 501. Said elevated portion 504 is circumferentially displaced substantially 180 degrees in respect to the depressed portion 507, and similarly, the depressed portion 505 is circumferentially displaced substantially 180 degrees in respect to the elevated portion 506 thereby yielding a to-and-fro oscillation of the four-arm lever 498, with both cam rollers 500, 501 at all times in positive engagement with the cam surfaces, and thereby correspondingly rocking each link 496 in an oscillatory path of movement. Such movement of the fingers 462, as is explained more fully hereinafter, effects the carrying-over from one counter wheel 456 to its next associated counter wheel 456 of higher denomination, and accordingly the individual counter mechanism of the unit cent and that of the minute values are not provided with such carry-over finger 462 since they represent respectively minimum denominational values.

Figure 73:
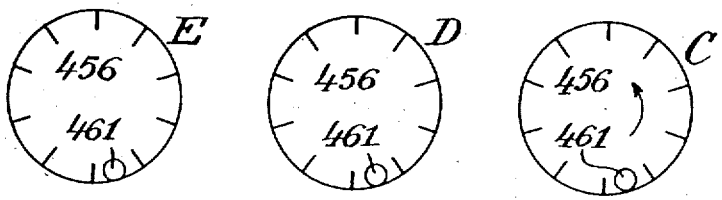

In Figs. 73 to 78, see Sheet 24, I have indicated the disks of the counter wheels 456 of the wage denomination, the disk C representing unit cent values, the disk D decimal cent values and the disk E representing unit dollar values. Fig. 73 shows the said disks C, D and E in their respective neutral positions, each pin 461 of the same being positioned posterior of the zero value. In this instance, by reason of monetary values being based on the decimal relation, each pin 461 of the said adding disks are located between the values of "9" and "0".

Illustrating the relative movements of the said monetary adding disks C, D, E, let us assume the values to be added to be, in the order named, seven, thirty-four, ninety-five and sixty-eight, the total of which is two hundred and four.

Figure 74:
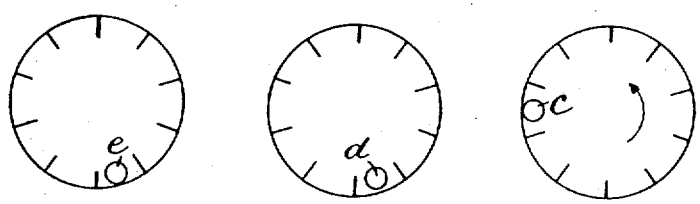

Performing the operation corresponding to the first value of seven, the unit cent disk C alone is rotated, as indicated in Fig. 74, said disk C being moved in anti-clockwise direction, as shown by the arrow, its pin 461 assuming the position indicated c, the remaining adding disks remaining in neutral position.

Figure 75:
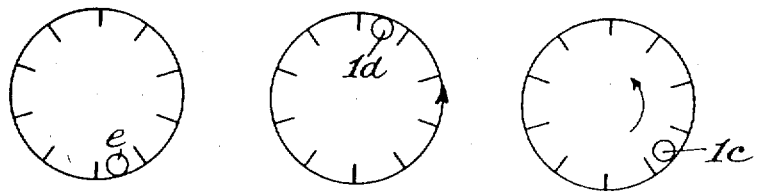

Performing the operation corresponding to the second value, of thirty-four, the unit cent C is moved to the position 1$^c$ as indicated in Fig. 75, and the decimal cent disk D is moved through a spacing of three teeth and an additional spacing of one tooth by reason of the pin 461 of the unit cent disk C having completed a full revolution, tripping the hook lever while passing from its value of "9" to its value of "0", as previously explained, in connection with Figs. 69, 70 and 71. The final positions of the pins 461 of the unit and decimal cent disks C and D are indicated in Fig. 75, corresponding to the value of "41". It will be noted that in this operation, the unit dollar disk E has not moved and is in its neutral position.

Figure 76:
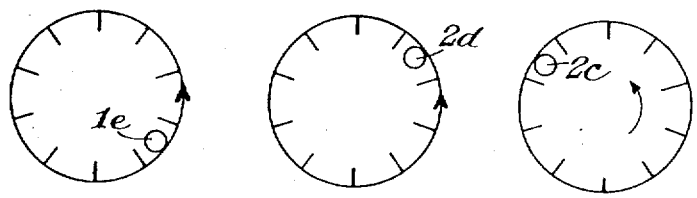

Performing now the operation corresponding to the third value of ninety-five, the unit cent disk C is moved through the arc corresponding to the unit value of 5, to the position 2$^c$ indicated in Fig. 76, while the decimal cent disk D is moved through an arc corresponding to the value of nine, passing through the zero position, to carry-over the value of "one" to the unit dollar disk E, causing the pin 461 of the unit dollar disk E to assume the position 1$^e$ corresponding to the value of "1" whereas the pin 461 of the decimal cent disk D continues to move until it attains the final position 2$^d$ corresponding to the value of three. In such positions, the adding disks represent the summation of one hundred and thirty-five.

Figure 77:
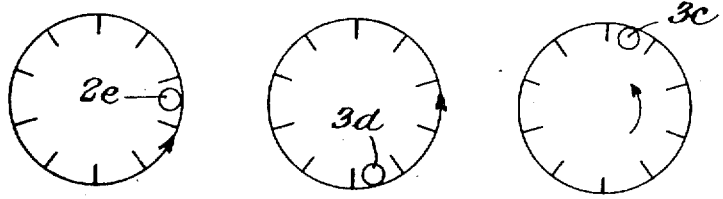

Performing now the last value of sixty-eight, the pin 461 of the unit cent disk C is moved through the value of eight, passing intermediately through its zero position and assumes the final position indicated in Fig. 77 at 3$^c$, corresponding to the value of four; such movement effects the carrying-over of the value of "one" to the decimal cent disk D which with the value of six yields a total movement corresponding to the value of seven, the final position of its pin 461 being indicated at 3$^d$, corresponding to the value of zero, and accordingly its pin 461 causes the "carrying-over" of "one" to the unit dollar disk E, whereby its pin 461 assumes the position indicated at 2$^e$, corresponding to the value of two. In the final positions shown in Fig. 77, the monetary counter disks represent the value of two hundred and four, the desired total.

Figure 78:
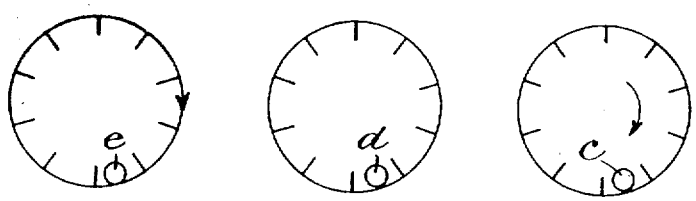

Fig. 78 shows the said unit and decimal cent disks C D and the unit dollar disk E returned to neutral positions, and the directions of such return movement, as indicated by the appended arrows. The mechanism for effecting such return movement and thereby transferring the indicated values to the printing mechanism is described more fully hereinafter.

Referring to Figs. 64, 69, 70 and 71, upon anti-clockwise rotation of the cam shaft 502 carrying the cam 518 and the pinion 519, meshing with the teeth 520 actuating segment 521, the actuation of which is set forth more particularly hereinafter, the double cams 503 are rotated anti-clockwise, whereby the four-arm lever 498 is rocked clockwise, rocking the link 496 and carry-over finger 462 to the right, which general movement is a preparatory movement.

In the event that a carry-over operation is to be effected, the pin 451 of the lower denomination, as described above, passing through the zero position, encounters and glides along the slanting face 477 of the hook lever 476 of the adding element of the next higher denomination, displacing the same anti-clockwise (see Fig. 71), which lever 476 by means of the link 478, depresses the finger support 465, whereupon its pin 470 is moved out of the shallow notch 471 and into the deeper notch 575, whereupon the spring 469 sets the finger support 465 and the carry-over finger 462 in depressed position, see Fig. 69, preparatory to the subsequent carry-over operation.

The operative movement of the double cams 503, ensuing upon clockwise actuation of its shaft 502, whereupon the four-arm lever 498 is rocked to the left, thereby oscillating the link 496, and therewith the carry-over finger 462 to the left. Under the condition of the finger 462 being set in its depressed position, and upon the oscillation to the left, the finger 462 engages posteriorly the next tooth (shown shaded) of the origin wheel 456 of next higher denomination, and at the end of its oscillation moves the wheel 456 of higher denomination through a spacing of one tooth, i. e., one unit, as indicated in Fig. 70.

The comparative rotational movement of the cam 518 is indicated in Figs. 69 and 70, and also in Fig. 71.

Upon further clockwise actuation of the double cam 503 (likewise the cam 518) the link 496 and carry-over finger 462 is rocked to the right and therewith the arm 464, whereby its pin 474 encounters the arm 473, oscillating the bell-crank 472 and the pin 470 is drawn out of the notch 575, into the neutral notch 471, as indicated in Fig. 71, whereupon the spring 469 holds the finger-support 465 and therewith the finger 462 in neutral positions.

As set forth above, there is provided an individual adding element for each time and wage value segment and the carry-over fingers 462 are provided for the adding elements of the denominations higher than the minimum, since the carry-over operation ensues from each minimum to the next higher denomination. and similarly to the succeeding higher denomination or denominations. The several double cams 503 are mounted in the shaft 502 relatively to one another to effect a segment of actuating movements of the carry-over fingers progressively from the minimum denomination to the higher denominations in the order of their relative values.

Referring to Figs. 65, 66 it will be observed that the segments are provided individually with the stop pawls 490, tensioned by spring 493 and mounted on a common rod 491, and controlled by the common cam shaft 492.

The cam shaft 492 is operated to hold the segments during the stages when the adding mechanism is in non-operative position, as appears more fully hereinafter.

As appears hereinabove, the determination of elapsed time and wage values ensues upon the release of the multiple arms 301 in clockwise rotation, whereupon the time and wage segments are respectively projected for extents of movement commensurate with the individual values to be determined.

The operation of adding ensues upon the anti-clockwise or return movement of the respective time and wage segments, actuated by the respective multiple arms 301, whereby the individual adding elements are operated for values commensurate with extents of return movement of the respective time and wage segments.

RECORDING OF SUMMATION INDICATIONS.

The recording of the summations of the successively derived elapsed time and wage values is effected by depressing the "Total" key 547 and thereupon setting in operation the actuating mechanism of the machine. The recording operation results generally in causing the individual adding elements to be brought into mesh with their respective time and wage segments, the operation of the multiple arms 301 to release the segments, the neutral clearances 580 of the respective time and wage cams affording unobstructed paths of movement for the segment determining pins, whereupon the respective segments under action of their springs 289 are actuated through extents of movement clockwise commensurate with the respective values represented by their individual adding elements. To attain such result means are provided for stopping the respective segments upon their individual adding elements being brought to zero.

The recording operation will be understood from the general representation indicated in Figs. 32 and 33, together with Figs. 66 and 69, 70, 71 showing the specific adding elements.

Upon the clockwise actuation of the time and wage segments 424 by the respective springs 289, the origin counter wheels 456 being in mesh with the gears 453 of the segments 424, are rotated clockwise until their respective "zero" pins 464 encounter the hook ends of the hook levers 477, whereupon the respective segments 424 are held. As appears from Fig. 78, the extent of clockwise rotation of each counter wheel 456 measures the value theretofor registered by it, whereby the extent of throw of its segment is commensurate with the theretofor registered value of its adding element.

Upon such commensurate actuation of the time and wage segments 424, the printing mechanism (see Fig. 33) is correspondingly actuated, whereupon the printing hammers are operated and the summations of elapsed time and wage values respectively printed.

On the printed time card or strip shown in Fig. 54 (Sheet 20), the summations of elapsed time appear in line 5 of the second column, showing elapsed time for four days of the employee "390", and in line 5 of the third column showing corresponding wage for the aforesaid elapsed time period; and also in line 9 of the aforesaid column, representing summations of elapsed time and corresponding wage of the employee "394".

GRAND TOTALIZING MECHANISM.

The grand totalizing mechanism is similar in construction and operation to the total or adding mechanism. The grand totalizing mechanism is indicated at 452, see Figs. 2 and 65, and shown enlarged in Fig. 66. The individual adding mechanisms of the grand totalizing mechanism correspond similarly to the individual adding mechanism of the aforesaid totalizing mechanism, like parts being marked with like reference characters, the grand totalizing mechanism being positioned more forwardly of the machine, relative to the adding mechanism, and in general alignment therewith, and controlled by the mesh control shaft 489, similar to the mesh control shaft 488 as appears in Figs. 66, 67, 68; also controlled in common with the adding mechanisms by the carry-over links 496 and cams 503, mounted on the common cam shaft 502.

In view of the absence in the usual pay roll records of the need of any grand total or summation of elapsed time periods, the grand total mechanism for the summation of elapsed time periods has been omitted; should such grand totalizing be, however, desired, the same may be associated with the adding mechanism of the elapsed time period determining mechanism, similar to the grand totalizing mechanism of the wage value determining mechanism shown in the drawings.

The recording of the grand total of wage value is controlled by the "Gr. total" key, the same controlling the "clearing" of the grand totalizing mechanism, similar to the "Total" key 547 as aforesaid, and similarly controlled in operation and in proper sequence by corresponding actuation parts forming a portion of the general actuating mechanism, as appears more fully hereinafter.

As shown in Figs. 2 and 65, the grand totalizing mechanism comprises additional individual adding or counter mechanisms and associated segments, similar to the aforesaid monetary segments 424, to accommodate totalizing greater values, i. e., the hundred, thousand and decimal thousand dollar values, said additional segments being designated 514, 515, 516, see Figs. 48, 49, the additional adding mechanisms being constructed and co-ordinated to summate the monetary values as successively registered, including the carrying-over from lower to higher denominations as required, the same being controlled and operated similar to corresponding parts of the adding mechanism. Said segments 514, 515, 516 are provided with fingers 670, and cams or disks 671, 672, 673, respectively, each said disk being plain, i. e., without any recess excepting a neutral clearance, 580, similar to the other wage disks 348 to 351.

During the stage of printing a grand total of monetary value upon the depression of the "Gr. total" key 548, each elapsed time segment is held in neutral position by its individual dog 511, pivotally mounted on the shaft 455, of the gear 453 (454) tensioned by the spring 512 (see Fig. 32), and having a curved upper lip 513 adapted when its adding element is depressed to its meshing position to move the shaft 457 of the origin counter wheel 456, thereby moving its lower end into engagement with the teeth of the segment gear 424. Similarly, the segments 514, 515, 516 are held in neutral position by their individual dogs 511 when the total key 547 is depressed and the time and wage segments 424 are operated to print the individual elapsed time and wage values.

When the adding mechanisms are elevated to non-operative positions, the lips 513 of the dogs 511 are encountered by the shafts 457 of the respective counter wheels 456 and the dogs 511 automatically moved out of engagement with the segments.

It is understood that during the stage of registering of the wage values as successively determined, the wage adding mechanism 450 and the grand total mechanism 452 are operated in exact correspondence with one another. But upon depressing the grand total key 548, the wage adding mechanism 450 is not in mesh with the wage segments 424, and hence maintains its registered value while the adding mechanism of the grand totalizing mechanism 452 is "cleared" to zero, and vice versa, upon depressing the total key 547.

(5) *General actuating mechanism.*

The particular actuating mechanism of the machine as a whole comprises suitable actuated means, such as the handle 604 or the motor, described hereinafter, or equivalent, two general groups of driving and controlling parts and such other parts interconnecting such two groups of parts and connecting the particular operating and controlling parts specifically described hereinabove under the aforesaid headings.

Such two groups of general parts are shown located respectively adjacent the right-hand end of the machine, i. e., exteriorly of the right-hand end frame 3 and between the inner cross frames 5, 6, as is indicated in Figs. 2 and 3, the former being referred to generally hereinafter as the outer group of actuating parts and the latter as the inner group of actuating parts.

In the particular embodiment of the invention in which the handle 604 is employed, the actuation of the aforesaid groups of actuating parts ensues during six periods of movement of the handle 604 from its neutral position, see Figs. 1 and 79, anti-clockwise i. e., forwardly of the machine through a determined extent of throw and returning in clockwise rotation back to its neutral position, the forward movement being divided into three periods, respectively designated hereinbelow "Period 1," "Period 2" and "Period 3" and the rearward movement being also divided into three periods, respectively designated hereinbelow "Period 4," "Period 5" and "Period 6." It will be noted that intermediate each of the aforesaid six periods of operation of the mechanisms of the machine in the sequence set forth hereinafter, there is provided for a hiatus in the movements of the deriving mechanisms and parts thereof, and means arranged and operated to positively hold the theretofor moved parts to prevent all possible dislocation of such parts, whereby to ensure reliability of operation and absolute accuracy.

The construction and relation of the individual parts of the general actuating mechanisms and their operations are first set forth hereinbelow and thereafter the final mechanical results summarized under the respective aforesaid period headings.

As has been alluded to hereinabove, the operations of the actuating mechanisms are separable under two conditions, firstly, under the condition of manipulating the subtrahend and minuend keys and a multiplier key and thereafter operating the handle 604, to thereby derive and print the desired mathematical differences and products, and secondly, under the condition of manipulating either the "Total" key 547 or the "Gr. total" key 548 and thereafter operating the handle 604 to transfer and print the desired summations of the successive differences and the corresponding products or the total of the summations of the products. Accordingly, the summaries under the period headings are arranged in two orders, one order under the aforesaid first condition of operation and the other under the aforesaid second condition of operation.

The handle 604 is connected with the angular lever 631 by means of the pin 634, carried by said handle 604 and extending in the slot 632—633 of the angular lever 631, the slot portion 632 being longitudinal radially of the lever 631 and the slot portion 633 arcuate and communicating with the slot 632, as is apparent in Fig. 79. The angular lever 631 is fixed to the shaft 630, which is eccentric with respect to the stud 606 on which the handle 604 is loosely pivoted. On the shaft 630 is loosely pivoted the segment gear 636, the teeth of which mesh with the pinion 637 fixed to the main shaft 15. The angular lever 631 is connected to the segment gear 636 by means of the retractile spring 635 and as is apparent in Fig. 1, normally abuts the anterior face of the segment gear 636.

Accordingly, upon anti-clockwise movement of the handle 604, the segment 636 is similarly rotated anti-clockwise, causing the main shaft 15 to be rotated clockwise for an extent of movement determined by the manipulated starting and stopping time keys, as aforesaid, the further anti-clockwise movement of the angular lever 631 resulting in distending more and more the said spring 635.

Upon the anti-clockwise movement of the angular lever 631, its pin 651 idly encounters the hook 648 of the key-releasing mechanism, as will appear from the relation of the parts as shown in Fig. 80, and as hereinabove more fully referred to.

Such anti-clockwise movement of the angular lever 631 is indicated by the shaded full outline in Fig. 79, to the dotted outline denoted F; such movement causes the rotation of its shaft 630, and therewith the arm 629, fixed to the said shaft 630 and connected by the link 628 to the oscillating lever 622.

Of the aforesaid parts the handle 604 and angular lever 631 are positioned among the outer group of actuating parts, and the arm 629, link 628 and oscillating lever 622 are among the inner group of actuating parts, as appears in Figs. 2 and 3.

The aforesaid movement of the oscillating lever 622, is clockwise from its neutral position indicated in shaded full lines and the extreme position indicated in dotted outline. Said oscillating lever 622 is connected by the link 621 to the actuating segment gear 521 whose teeth 520 mesh with the pinion 519 fixed on the shaft 502, controlling the double cams 503 of the adding mechanisms, as aforesaid, the movement of said segment gear 521 being clockwise from its neutral position shown in full lines to the position denoted H and the rotation of the cam shaft 502 and the cam 518 anti-clockwise.

The oscillating lever 622 is provided with a pin 624 at its free end, said pin extending into the slot 625 of the link 626, connected at its forward end to one arm of the bell-crank 585, whose other arm is connected by the link 586 to the arm 587, controlling the cam shaft 492 of the stop-dogs 490 of the respective time and wage segments 424.

Such clockwise movement of the oscillating lever during the first period moves its pin 624 forwardly in the slot 625, without affecting any movement of the link 626 and its associated stop-dogs 490, but is preparatory to an actuating movement as appears hereinbelow under Period 6.

Of the last named parts, the segment gear 521, pinion 519, cam 518, link 626, lever 622, bell crank 585, link 586 and arm 587 are among the inner group of actuating parts.

During this period also, the shaft 599, is rotated anti-clockwise by reason of the arm 596, fixed thereto, being connected by the link 603 to the handle 604, these parts being positioned among the outer group of actuating parts. To the shaft 599 and positioned among the inner group of actuating parts, is the arm 600, carrying the pin 601 extending in the slot 596—597 of the lever 552, the slot portion 596 being arcuate and the latter radial. Said pin 601 also extends into the slot 593—594 of the arm 592, the slot 593 being initially arcuate, then non-arcuate and the slot 594 arcuate. Said arm 592 is fixed to the multiple segment release arms 301, as appears in Fig. 3, and is positioned among the inner group of parts.

Such movement of the pin 601 in the arcuate slot 596 and the initial arcuate portion of the slot 593 does not affect any movement of the control arm 552 nor initially of the arm 592, but is preparatory for subsequent operations of these parts and their respectively controlled parts as appears hereinafter.

During this period, also, as appears in Figs. 60, 61, 62, Sheet 11, the ratchet wheel 655 fixed to the main shaft 15, in coaction with its ratchet pawl 656, holds the main shaft 15, at its ultimate determined position, and precludes any possible rebound of the main shaft. As shown in Fig. 2, said ratchet wheel 655 is located between the cross frame 7 and the cross frame 6, and adjacent to said ratchet wheel 655 is the disk 607, also fixed to said main shaft 15. Returning to Figs. 60, 61, 62, Sheet 11, it will be noted that the ratchet pawl 656 is pivoted on the stud 657, carried by the cross frame 6, the tail 658 of said ratchet pawl 656 extending upwardly proximate the pin 664 carried by the cam arm 663 fixed to the stud 659 to which is fixed the control arm 660. The retractile spring 661 serves to snap the ratchet pawl 656 upon being moved by the cam 663 into inoperative position relatively to the ratchet wheel 655. The spring 656ª normally tensions the tail 658 of the ratchet pawl 656, to provide the normal ratchet action. Said arm 660 is positioned on the opposite side of the frame 6, relatively to the cam arm 663, said arm 660 being normally positioned in alignment with the path of longitudinal movement of the slide rod 531, and upon longitudinal movement of the slide rod 531 to the right (see also Fig. 64) the arm 660 is rotated anti-clockwise to move the ratchet pawl 656 out of engagement with the ratchet wheel 655, as appears more fully hereinafter under Period 3.

SUMMARY—PERIOD 1.

(a.) The main shaft 15 is rotated commensurate with the mathematical difference to be derived;

(b.) The camshaft 502 and double cams 503 are rotated to rock the carry-over links 496 and carry-over fingers 462, preparatory for such mathematical carry-over operation as may be necessary; and (c.) The cam 518 is rotated preparatory to its actuation movement for restoring the slide bar 531, as set forth in Period 6.

PERIOD 2.

During this period, the pin 601, see Fig. 79, Sheet 25, by reason of the non-arcuate portion of slot 593, rotates the control arm 592 clockwise, thereby releasing the release arms 301 of the respective time and wage segments 424 under action of their individual springs 289 whereupon the respective determining fingers 220 are actuated toward the respective time and wage determining cams in correspondence to the time and wage values to be derived and their respective printing devices operated in correspondence therewith. During this period the pin 601 continues to move through the remaining portion of the arcuate slot 596 of the control arm 552, without actuating the cam 552. Also, the pin 651, of the handle 604 moves into and partially along the arcuate slot 633 of the angular lever 631, and maintains the angular lever 631 in its projected position F.

SUMMARY—PERIOD 2.

The time and wage segments and printing mechanisms actuated in correspondence with the derived elapsed time and wage values.

PERIOD 3.

During this period the pin 601 attains the end of the arcuate slot 596 and enters the radial slot 597 of the control arm 552 thereby rotating the same clockwise. Said control arm 552 is provided at its upper end with the roller 582, extending into the slot 583 of the lever 584, said lever 584 at its forward end being pivotally connected to the bell crank 585, as appears in Fig. 2, said bell crank 585, as stated above in Period 1, controlling in common the stop-dogs 490 of the respective time and wage segments 424. Such clockwise rotation of the control arm 552 pushes forwardly the lever 584 to its position indicated in dotted outline in Fig. 79, and thereby oscillates bell crank 585 clockwise to operate the cam shaft 492 and effect retention of the respective segments 424 by means of their individual stop-dogs 490.

During this actuation of the control arm 552 by the pin 601 entering the slot 597, the arm 592 is maintained in projected position by the pin 601 entering the arcuate slot 594, which is of greater length than the said non-arcuate slot 597 of the control arm 552. The extreme position of the handle 604 is shown in dotted outline in Fig. 79.

During this period, also, the clockwise actuation of the control arm 582, actuates the link 588, connected to the bell crank 589, in turn connected by the link 590 to the arm 591 fixed to the printing release cam 271 thereby releasing the locks 266 of the printing hammers 265. The actuated positions of the bell crank 589 and link 590 are indicated in dotted outline.

During this period, also, as appears in Fig. 64, the clockwise actuation of the control arm 552 causes its roller 551 to engage semi-circular lug 550, fixed to the slide rod 531. Said slide rod 531 is slidably and rotatably mounted in the spaced bearings 532, projecting from the cross frame 6. Fixed to said slide rod 531 is the semi-circular rod 533 adapted normally to engage the arm 560, pivoted at its end 563 to the frame 6, and carrying intermediate its length the roller 561. Said slide rod 531 is also provided with the spaced forks 534, respectively normally extending toward and receiving the arms 524, respectively fixed to the mesh-control shafts 488, of the adding and grand totalizing mechanisms.

Upon the clockwise rotation of the control arm 552 and consequent engagement with the semi-circular lug 550, the slide rod 531 is pushed longitudinally to the right, see Fig. 64, whereby the arm 560 is oscillated anti-clockwise, bringing its roller 561 into engagement with the cam 518 previously rotated as set forth under Period 1 also the longitudinal movement of the slide bar 531 to the right, causes the forks 534 to respectively actuate the mesh-control shafts 488 to effect the operative relation of the adding elements with their respective time and wage value segments. Such longitudinal movement of the slide rod 531 to the right, Fig. 60, rotates the arm 660 of the cam 658 controlling the ratchet pawl 656, to release the ratchet wheel 655 free from the pawl 656, and thereby free the main shaft 15.

SUMMARY—PERIOD 3.

(a.) The printing of the derived elapsed time and wage values is effected; and (b.) The adding mechanisms are brought into operative relation with their respective segments.

PERIOD 4.

During this period, the beginning period of the return movement of the handle 604, rotating clockwise, causes the pin 601 to encounter the termination of the arcuate slot 596 of the control arm 552 thereby rotating the arm 552 anti-clockwise and is rotated to lock the locks 266 of the printing hammers 265 in neutral position, while the pin 582 of said control arm 552 moves idly in the slot 583 of the link 584. Also, the pin 634 of the handle 604 returns through the arcuate slot 633 of the angular lever 631, while retaining the angular lever 631 in its projected position, indicated in dotted lines. During this period, the slide rod 531 is retained in its advanced position, as described in Period 3.

PERIOD 5.

The pin 601 enters the non-arcuate portion of the arm 592 of the multiple arms 301, actuates the same in anti-clockwise direction (see also Fig. 33) thereby actuating the time and wage segments 424 by means of the respective links 300 to their neutral positions through arcs of movement respectively determined by the extents of projected movement of their determining fingers, commensurate with the derived time and wage values; during which return actuation of the time and wage segments the individual adding elements are operated to register and add the respective time and wage values.

SUMMARY—PERIOD 5.

The derived elapsed time and corresponding wage values are registered on the elapsed time adding mechanism 451 and the wage adding mechanism 450, and also on the grand totalizing mechanism 452.

PERIOD 6.

At the beginning of this period, the pin 634 of the handle 604 (see Fig. 79) reaches the radial slot 632 of the angular lever 631 thereby rotating the angular lever 631 clockwise and therewith the shaft 630, arm 629 actuating link 628 to oscillate the lever 622 anti-clockwise, whereby its pin 624 encountering the left hand termination of the slot 625 of the link 626 and thereupon returns the link 626, to the left thereby oscillating the bell crank 585 to lock the dogs 490 away from the time and wage segments 424.

Also, by reason of the link 621, connecting the oscillating lever 622 with the segment gear 521, the shaft 502 is rotated clockwise, whereby the cam 518 rotates against the roller 561 to oscillate the control arm 560 to the left, see Fig. 64, whereby its arm 562, encountering the semi-circular lug 533, returns the slide rod 531 back to its neutral position, and the forks 534 respectively engaging the arms 524 of the respective mesh control shafts 488 of the adding mechanisms, rotate the same clockwise to unmesh the respective adding elements from their time and wage value segments.

Also, by reason of the clockwise rotation of the shaft 502, the double cams 503 of the individual adding mechanisms oscillate anti-clockwise the respective adding fingers 462 of the individual adding mechanisms, to carry-over as may be required, from any individual adding element to its associated adding element or elements of higher denomination. As will be recalled, hereinabove, the double cams 503 are arranged to effect the operative oscillation of the carry-over fingers 462 in sequence beginning with the lowest denominations; the initial carry-over operation taking place during a sub-period of this period subsequent to the unmeshing of the respective individual elements from their time and wage segments.

Also, during the final sub-period of this period the angular lever 631 encounters the segment gear 636, thereby rotating the main shaft 15 anti-clockwise, to restore the main shaft to its neutral position. Also, during the return of the angular lever to neutral, its pin 651 engages the hook 648 and trips the bell-cranks 647, 122 as appears from Fig. 80, to release the set time keys and stops. Upon the return or anti-clockwise rotation of the main shaft 15, the pin 664 on the ratchet wheel 655, fixed to the main shaft 15, encounters the cam lever 663 and restores the latter to neutral position, to restore the ratchet pawl 656 to ratchet relation with the ratchet wheel 655.

SUMMARY—PERIOD 6.

(a.) The adding mechanisms are restored to non-operative relation with the time and wage value segments;

(b.) The required carry-over operations of the adding mechanisms are performed;

(c.) The main shaft and time and wage cams restored to neutral, preparatory as may be desired.

(1.) For the next calculation, initiated by manipulating the proper time and wage rate keys and repeating the aforesaid operations of the individual mechanisms; or preparatory for (2.) Printing the summations of the successively derived elapsed time values and corresponding wage values, or the grand total of the summations of the wage values.

When printing summations as desired, initiated by depressing the total key 547, to print the summation of the elapsed time and corresponding wage values or by depressing the grand total key 548, to print the total of the summations of the wage values, the above described actions and operations of the actuating parts are repeated in the successive six periods, except as noted hereinbelow under the respective period headings.

SUMMATING.

Referring to Figs. 64 and also 61 and 60, upon depressing the total key 547, its hook 545 encounters the free arm of the bell-crank 542, oscillating the same.

It will be noted that the bell-crank 542 is fixed to a pivot or stud extending through a recess in the cross-frame 6, and on the opposite side of the frame 6 is fixed to the arm 614. The bell-crank 542 is also connected by the link 541 to one arm of the bell-crank 539, pivoted at its center 540 to the frame 6, the other arm of the bell-crank 549 being connected by the link 538 to the slide plate 537, slidably carried by the frame 6, and provided with the notch 578, receiving the longitudinal lip 536, fixedly carried by the slide rod 531.

Such oscillation of the bell-crank 542, upon depression of the key 547, causes the slide plate 537 to be depressed (see Fig. 61) thereby rotating the slide rod 531 to disengage the forks 534 from the respective arms 524 respectively controlling the two mesh-control shafts 488. The eccentrically positioned spring 577 (see Fig. 60) serves to snap the bell-crank 542, upon partial oscillation, to expedite the freeing of the arms 524 from the forks 534 and to rotate the slide rod 531.

Also, upon depressing the key 547 its pin 553 encounters the arm 523, fixed to the right-hand mesh control shaft 488, thereby rocking the same anti-clockwise to position the elapsed time and wage value adding mechanism in meshed relation with their respective time and wage segments 424. Upon meshing the adding mechanism, the dogs 511 are released to engage the respective segments 514, 515, 516 precluding any movement of the same. Such anti-clock oscillation of the right-hand mesh control shaft 488, rocks the associated arm 527 to the left, preparatory for restoring the cam shaft 488, as appears more fully hereinafter.

It will be clear that the mesh-control shaft 488 of the grand totalizing m. is in unmeshed position and accordingly the grand totalizing mechanism is undisturbed during the totalizing operation.

The depressed key 547 is promptly elevated by its stem spring 549.

Alternately, upon depression of the grand total key 548, the left-hand mesh-control shaft 488 is similarly rocked into its meshed position, and the dogs 511 are released to lock the time segments, and the adding mechanism of the grand totalizing mechanism 452 positioned in operative relation with their wage segments 424, 514, 515 and 516. Associated with the key 548 is the bell-crank 544, connected by the link 543 with the aforesaid bell-crank 542, and similarly controlling the slide plate 537 and therewith the rotation of the slide rod 531.

Under either alternate summating condition, the following modified or further operations take place, as is noted hereinbelow. There are no modified or further operations in Periods 4 and 5.

PERIOD 1.

Upon clockwise actuation through a slight arc of rotation of the main shaft 15 by the handle 504, as aforesaid, the pin 611, see Fig. 61, on the rear face of the control disk 607 is brought against the under face of the lever 614 and held thereby and also holding the control disk 607, and therewith the main shaft 15, to position the neutral clearances 580 of the respective time and wage cams in alignment with the fingers of the time and wage segments to provide an unobstructed path of movement for the determining fingers, which ensues in the succeeding Period 2.

PERIOD 2.

The time and wage value segments 424, as set forth under the corresponding heading, are now actuated by their springs 289 to rotate clockwise the determining fingers moving into the neutral clearances, the respective adding elements being in operative mesh with their segments and rotating clockwise until their respective zero pins 461 encounter and are held by their respective hook levers 477, the respective segments being therefore actuated commensurate with the registrations of the individual adding elements and their respective printing type casings elevated commensuratingly. Accordingly, the adding mechanism affected by the depressed key 547 or key 548, as the case may be, is "cleared" to zero registration. The dogs 511 hold in neutral position the segments not affected by the depressed summation key, as noted above.

PERIOD 3.

During this period, the slide bar 531 is pushed longitudinally to the right, Fig. 60, as set forth above under the corresponding heading, but in this instance, the slide rod 531 previously rotated upon the depression of either the adding key 547 or the grand total key 548, and the corresponding roller 529 previously rocked clockwise and brought into contact with the outer face of its fork 534, is rocked anti-clockwise by the corresponding fork 534, thereby oscillating the arm 527 to actuate the mesh-control shaft 488 clockwise and disengaging the individual adding mechanisms from their respective segments. During this Period 3, as set forth above under corresponding heading, the type hammers are actuated to print, in this instance, the summations of elapsed time and wage values, if the key 547 has been depressed, or the grand total of the summations of the wage values if the key 548 has been depressed.

PERIOD 6.

During this period, as noted above in the corresponding heading, the slide rod 531 will have been pushed back to its neutral position and the main shaft 15 is being returned in anti-clockwise direction toward its neutral position, during which operation the dog 608, see Fig. 60, encounters the lever 614, the bell crank 642, and trips said lever 614 to oscillate the bell cranks 542, 544, clockwise, to neutral, thereby raising the slide plate 537 and rotating the longitudinal lip 536 to restore the slide rod 531 to its neutral rotative position.

All actuating parts are again in their neutral positions.

The modification of the elapsed time mechanism shown in Figs. 100 and 101 embodies the general construction referred to in detail hereinabove, but providing for the direct control of the time wheel by any fractional hour stopping key similar to the above-described nature of control of the time wheel by any fractional hour starting key.

By comparison of Fig. 100 with Fig. 10, the similarity in general construction of the several parts will be apparent, the like parts, or equivalent, being designated by like reference characters. The view shown in Fig. 100 is from the opposite side of that shown in Fig. 10. In Fig. 100, as in Fig. 10, the starting time "40" key of the keys 10 and the stopping time "30" key of the keys 11 are shown depressed.

In lieu of the notches of the respective cams 180 of the keys 77, and the throw controlling stop edges 181, for determining the extents of throw of the link 194 commensurately with the relative values of the keys, as shown in Fig. 10, the keys 77 are each provided with positively actuating cams 880 having effective cam faces 881 commensurate with the relative values of the keys, said cams 880 respectively coacting with the double bar 183, carrying the spaced rollers 184. Thus, upon depression of any key 77, say the indicated "30" key, its cam face 881 will have engaged its forward roller 184 and upon the full depression of the key, the cam 880 is lodged between said forward roller 184 and the rearward roller 184, thereby securely holding the bar 183, and therewith the links 169, 194 and actuating arm 166 against displacement.

The comparative actions of the two constructions will be apparent from Figs. 15, 16, and 17, the first-named figure showing neutral positions, Fig. 16 showing the positions upon depressing the "40" starting time key and Fig. 17 showing the positions upon depressing the "30" stopping time key of the construction shown in Fig. 10. The distance denoted "C," comparative of Figs. 15 and 16, indicates the chord of the arc of movement of the actuating arm 166 ensuing upon depressing the starting time "40" key and the distance denoted "D" comparative of Figs. 16 and 17 indicates the chord of the arc of movement of the actuating arm 166, which is potential upon the depression of the stopping time "30" key in the construction shown in Fig. 10 and becoming effective upon rotation of the main shaft 15, as aforesaid.

However, in the construction shown in Fig. 100, the cam 881 of the depressed stopping time "30" key (similarly for any other fractional hour stopping key 77) directly and positively actuates the arm 166 for a distance "D" in a direction opposite to the direction of actuation of the depressed starting time key.

The bar 199 as shown in Figs. 100 and 101 corresponds generally to the like numbered bar 199 in Fig. 10, excepting that its operation in the former construction is effective as soon as any key 77 is depressed, thereby at once effecting the coupling of the link 194 with the link 169, by positioning the pin 167 in the proper lateral slot 197, whereas in the latter construction the coupling of the link 194 with the link 169 is effected during the period of depression of the key at an interval subsequent to the operation of its cam 880 on the double bar 183.

In the modified construction, to attain such object the bar 199 is provided with the fingers 886 projecting toward the respective key stems 76, cooperating with the pins 888, and upon anti-clockwise movement (see Fig. 101) of the bar 199, the same is held by retaining means comprising the respective collars 882, each having a notch 883, and the respective pins 883 mounted on the flat springs 885.

Upon the release of the depressed key, its pin 887 strikes the free end of its flat spring 885, raising the pin 884 out of the notch 883, whereby the bar 199 is rotated clockwise under action of its restoring spring 202, as aforesaid.

It will be observed that the specific embodiments of my invention include the provision of lost motion or play within defined limits to thereby insure absolute mathematical accuracy notwithstanding the physical impossibility of causing two elements to engage one another and also be moved relatively to one another, maintaining engaging relation of two elements, generally notwith- standing wear and usage, making two or more similar elements of the same or proportional lengths, etc.

Thus, in the mechanisms comprising the determining fingers and stop-provided cams, I have arranged for limited lost motion by the provision of the partial teeth 678 (see Fig. 66, Sheet 22) and the intermediate clearance 679 on each segment 424 in cooperation with the pinion 453 (454) whereby the segment may be oscillated to a limited extent, to permit its finger to be cleared of its coacting cam while the latter is being operated. Such partial teeth and clearance locks the segment against undue play and as well the pinion 453 (454) so that the pinion 453 is held in proper meshable relation to its counter wheel 456, whenever required.

Again, in the construction of the wage determining fingers and means for suspending and controlling associated sets of the same, I have arranged the stop lug 405, on each link 401 of a determining finger and the multi-sided recess 406 (see Fig. 36), which in cooperation with the stirrup 406, suspending a set of links 401, and the pin and slot connection 422—403 between each link 401 and its associated transfer member permits the associated wage determining cams to be moved without interference with any determining finger and insures against dislocation of any finger or its link irrespective of whether the same is in set or non-set position. Specifically, each link 401 is precluded by its link 405 from being dislocated longitudinally and by the sides of the recess 406 engaging the stop rod 417 in two transverse planes, to prevent rotative dislocation, when the link is suspended in its stirrup; and by the rest-rod 416, the pin and slot connection 422—403 and the upper edge of the aperture of the stirrup 407 (see Fig. 39) against longitudinal or rotative dislocation when in set position. It will be apparent from Fig. 39, that the aperture of the stirrup 407 is sufficiently deep to provide a clearance for each lug 405 when the stirrup is dropped upon setting any set of determining fingers.

It is here generally noted that my invention provides for the required movements for engaging any two or more elements by means constructed and operated to effect the same positively and directly and independently of any spring or other resilient element, and accordingly in the preferred forms of my invention no reliance is made upon any resilient or any other form intermediary element which is subject to variation in actuation or other effect.

As appears in Fig. 32, the resilient means for effecting the movements of the time and wage segments preferably includes the expansion springs 289ª coacting with the compression springs 289, the latter being referred to above as the means for operating the determining segments. Each such spring 289ª may be a coiled spring surrounding the respective release rods 300. The disposition of such expansion springs 289ª acts to exert a force substantially parallel to the direction of length of each release rod 300, tending to force each segment from its release arm 301, whereas the function of each compression spring 289 acts to exert a force tending to rotate its segment about its pivot 420. Thus, the combination of the aforesaid forces acting on each segment gives rise to a resultant which is equal to the sum of the respective strengths of the compression spring 289 and the expansion spring 289ª. By apportioning each spring 289ª as of substantially equal value as its compression spring 289, the amount of effort, i. e., mechanical work done, is reduced to practically one-fourth of that required when a single compression spring 289 of double strength is solely employed.

To extend the scope of commercial usefulness, my invention comprises other features as appear hereinafter.

*Reference number mechanism.*

The reference number mechanism of the machine is applicable for printing a reference designation of whatsoever character as may be desired, dependent upon the particular problem or data to be derived. Thus, the reference number may be the designation number of the workman, the designation number of the job, a record of either the subtrahend or minuend, or of the multiplier, i. e., the wage rate, or such other numerical value which is explicative or associated with the mathematical computation derived by the machine.

Such reference number is preferably printed in close adjacency to the mathematical derivation with which it is associated, as by printing the same to one side of the time card or printed list, as appears in Fig. 54. In this figure, the outside left-hand column indicates the designation numbers of the respective workmen.

The reference number mechanism, as indicated in Figs. 2, 3 and 4, may be conveniently positioned toward the left-hand end of the machine. As here shown, the reference number mechanism comprises three operating number keys 306, 307, 308, which in this instance effects the printing of three integers; for printing reference numbers of greater number of integers, the number of reference keys is accordingly increased.

Said keys 306, 307, 308 are respectively mounted on bell cranks 309, see also Fig. 36, pivoted on the rod 310, extending from the cross frame 7 to the left end frame 4. Adjacent the upper ends of the keys 306, 307, 308 are positioned the lugs 315 coacting with the notched plate 316 to hold the keys in the proper numerical positions (see Fig. 4) respectively corresponding to the integer of the reference number. The lower ends of the bell cranks 309 are respectively connected by the links 311 to the respective arms 312 of the corresponding shafts 313, the last-named respectively extending to the type casings 305 respectively, as appears in Fig. 53, also shown in Figs. 48, 49. In Fig. 53, the type carriers 305 have been operated to print the reference number 390, the corresponding types appearing on the printing line 304—304. This particular reference number is the uppermost reference number appearing printed on the time card or list shown in Fig. 54. The type carriers 305 are constructed similarly to the type carriers 351 and provided with type hammers 265, controlled by hammer stops 266, in turn controlled and operated by means of the common cam 270 and coordinated parts as more particularly set forth hereinabove.

(7) *Whole period mechanism.*

The derivation of whole period wage values is ascertained by means of the aforesaid mechanism for deriving the product of any multiplier value and any multiplicand under the control of the key board by the employment of the keys thereof to represent correspondingly the multiplier and multiplicand values involved.

As appears in Fig. 4, the scale 766 representing the number of whole day periods is applicable for use with the keys 10, the respective five keys in this instance representing, in conjunction with the said day scale 766, whole days instead of fractional time intervals.

In the use of the whole day scale 766, the "0" key of the keys 9 is first manipulated, then the proper key of the keys 10 representing the number of whole days is manipulated, thereafter the key "W" of the keys 12 is manipulated, the proper wage key corresponding to the daily wage having been previously manipulated.

The full week wage is obtained by first depressing the "0" key of the set of keys 9 and the "W" key of the set of keys 12.

Such manipulation of the proper keys of the sets of keys 9, 10, 12, upon actuation of the main shaft 15, effects the differential rotation of the time wheels 13, 14, as aforesaid. In this instance, the extent of rotation of the main shaft is determined by the setting of the pin 42 of the time wheel 13, by the "0" key, and the stop-pin 64 of the time wheel by the "W" key, modified by an extent of anti-clockwise rotation of the time wheel 13 commensurate with depressed whole day key of the keys 10.

In combination therewith, the elapsed time determining cams 210, 211, 212, are provided with stops disposed along the lines of projection in accordance with the principle heretofore set forth, to effect the proper actuation of the time segments by means of the respective determining fingers 220, 232, and 234, to thereby correspondingly actuate the respective type carriers and present the proper types at the printing line to record the determined elapsed time in whole day periods.

The elapsed time of whole day periods in hours, on the basis of 9 hours per day, are respectively 9, 18, 27, 36 and 45; and the elapsed time of a whole week is accordingly, fifty hours, in view of the usual short working day on Saturday of but five hours. It will be understood that these values are purely illustrative and subject to modification according to the particular basis of the employment.

To attain the aforesaid specific hour values, the time cams are correspondingly constructed to derive the respective unit and decimal integer values. Thus referring to the specific time cams shown in Figs. 25, 26, 27, the minute time cam 210 shown in Fig. 25, in this instance, does not include any such stop along its line of projection, since minute values do not occur in the aforesaid specific whole day or week periods. The unit hour cam, however, is affected in this particular instance, and is provided with the stops 759, 760, 761, 762, 763, respectively representing the values of 5, 6, 7, 8 and 9; the zero value, representing the unit integer of "50" hours, is provided for at 764, namely at the circumference of the unit hour cam 211. In correspondence therewith, the decimal hour cam 212 is provided with the stops 753, 754, 755, 756 and 757 respectively representing the values of "4," "3," "2," "1" and "0"; the stop 758 represents the value of "5," the decimal integer of "50" hours.

Fig. 89 shows the unit hour cam 211 and the decimal hour 212 in cooperative positions with respect to their respective determining fingers 232, 234, for determining the value of "45" hours, namely for a five day period.

In correspondence with the aforesaid stop values of the time cams, the wage cams are similarly provided with stops coacting with the respective determining fingers for deriving the wage values corresponding to the elapsed time of whole day and week periods, at the particular wage rate.

Thus, for the wage rate of 25 cents per hour, the monetary cams 348, 349, 350, and 351, referred to above, in connection with Figs. 40, 41, 42, 43, are respectively provided with stops commensurate with the wage values involved to wit, "2.25," "$4.50 . . . . $11.25" for the full day periods up to five days and the further value of "$12.50" for the fifty hour or whole week period.

The unit cent wage cam 348 is provided with stops 770, 771, and 772 alternating with the five "0" stops 773, 774, 775, and 776, the first named three stops representing the value of 5. Similarly, the decimal cent cam 349 with the stops 778, 779, 780, 781, 782 and 783 respectively representing "2," "0," "7," "5," "2" and "5"; the unit dollar cam 350 with the stops 785, 786 . . . 789, respectively representing "1," "9," "6," "4," "2," "2" and the decimal integer hour cam 351 with the three stops 791, 792, 793 respectively representing "1," "0" and "1," the "0" stop 792 being relatively long since it applies to four successive wage values.

In Fig. 90, the wage determining fingers 350, 356, 357 and 358 are shown in projected positions relatively to their respective wage value cams for determining the wage for five days at the 25¢ hour wage rate or the monetary value of $11.25 in correspondence to the elapsed time of 45 hours of the time cams 211, 212, indicated in Fig. 89. Fig. 91 indicates the time wheels 13, 14 rotated substantially a complete circumference, upon the depression of the "0" key of the keys 9 and the "W" key of the keys 12, for determining the elapsed time of a whole week period.

Further adaptation of the machine is exemplified by the derivation of wage values at salary rates, for which purpose the salary scale 795 is positioned adjacent the wage keys (replacing the hour wage rate scale 330) and the corresponding group of salary wage cams replaced in the machine. The time keys are operated for full and fractional hours as set forth hereinabove.

For salary computations by day or weekly basis, the wage value cams are similarly constructed with stops in correspondence to the monetary values involved and positioned as a group in the machine; the proper rate key is operated, and the time keys manipulated as hereinabove described.

The salary wage cams are similarly provided with stops in correspondence to the monetary values involved. Thus as shown in Figs. 92 to 95, for the salaries appearing on the scale 796, the unit cent cam 797 is provided with the stops 801, 802 . . . 809; the decimal cent cam 798 with the stops 810, 811 . . . 816; the unit dollar cam with the stops 817, 818 and 819 and the decimal dollar cam with the full "0" stop represented by its full circumference whereby upon depressing the "0" key of the set of keys 9 and the key of the set of keys 12 appearing in alignment with the particular salary desired to be printed, added, etc.; the aforesaid salary monetary cams effect the actuation of the monetary segments and the corresponding printing type carriers to print the desired wage value in the wage column, see Fig. 54. The keys 12, in such computations, do not represent the hour values denoted thereon in Fig. 4.

Referring to Figs. 96 to 99, the monetary cams are shown in their correlative positions to indicate the salary value of $28.50, corresponding to the manipulation of the key "11" of the set of keys 12, in combination with the scale 796. In this instance, the unit cent determining finger 385 encounters the zero value of the unit cent cam 800, the finger 357 the "8" stop on the unit dollar cam 798 and the finger 358 the "2" value on the decimal dollar cam 797.

Further application of my machine for the computation of interest is afforded by designating a set of twelve keys 9 to respectively represent the several months, a set of keys 10, of suitable number, to denote days or other fractional month periods, a set of keys 11, of suitable number also to denote days or other fractional month periods and a set of twelve keys 12 to respectively denote the several months the keys 9, 10 representing the date at which the interest begins and the keys 12, 11, the date at which the interest terminates. The principal of such monetary values are computed on the several bases as above set forth.

*Motor mechanism.*

In Figs. 82 to 85, I have illustrated one method of actuating the machine under power, namely, by means of an electric motor.

The motor indicated at 682 is mounted on a suitable frame 683, providing bearings 684 for the shaft 685, carrying the worm 731, said shaft being preferably detachable from the motor shaft 687, proper, as by means of the coupling 686. The worm gear 688, on the shaft 689, meshes with the worm 731, thereby driving the pinion 690, in turn driving the gear 691, mounted on the crank shaft 692, carrying the crank disk 693, provided with the crank pin 694.

The crank disk 693 is provided also with two recesses 695, 695, forming stops cooperating with the stop pawls 697, 698. The pawl 697 is tensioned by the spring 728. The pawl 698 is connected by the link 699 to the switch arm 700, pivoted at 701 to the contact 702, Fig. 82. The switch arm 706 carries the contact 703 coacting with the fixed contact 704. One line of the motor circuit, or controlling circuit thereof, is connected to the contact 704.

The "Motor" key 705, see Fig. 85, is mounted on the stem 706, normally tensioned upwardly by the retractile spring 729 and pivotally connected to an insulated end portion 707 of the switch arm 700.

The switch arm 700 carries the pin 708 coacting with the hook 709, of the rocking member 710, pivoted at 711, and connected at its insulated end portion 713 to the link 714, in turn connected to the trip arm 715, pivoted at 716, and coacting with the pin 717 on the crank disk 693.

Pivoted on the gear 691 is the pawl 718 coacting with the control disk 719, and tensioned by the spring 725. Mounted above and adjacent the pawl 718 is the releasing pin 720, fixed to the shaft 721, suitably journaled in the frame 683. The shaft 721 carries the pin 722, connected by the link 723 to the lever 724, pivoted at 732. The lever 724 is connected at 733 to the link 714. The pin 722 normally holds the pawl 718 out of the notch of the control disk 719. The stop pin 726 on the shaft 721 coacts with the stop 727, fixed on the frame 683.

The crank pin 694, see Fig. 85, is entered in the slot of the pivoted link 736, connected by the link 737, to the tail-piece 738, integral with the arm 604, carrying the pin 634. The arm 604 is substantially a duplicate of the heretofore described handle 604.

*Operation of motor mechanism.*

After the proper wage rate and time keys are manipulated, the motor key 705 is depressed, thereby depressing the switch arm 700 until it abuts its stop pin 734, thereby closing the motor circuit at the contacts 703, 704.

Also, upon depression of the switch arm 700, the pawl 698 is raised out of engagement with the crank disk 688.

Upon depression of the switch arm 700 the spring 712, oscillates the rocking member 710 until its hook 709 locks the pin 708 of the switch arm 700, and in the interim the link 714 is lifted to raise the trip arm 715 toward the path of movement of the coacting pin 717, on the crank disk 688.

Also, upon the link 714 being raised, the lever 724 is rocked and by means of the link 723 and arm 722, oscillates the shaft 721 anti-clockwise, to rock its pin 720 anti-clockwise, see Fig. 83, to thereby release the pawl 718, which under action of its spring 725 enters the notch of the control disk 719.

Upon closing of the circuit through the contacts 703, 704, as aforesaid, the motor shaft is rotated, driving the worm 731, worm gear 688, shaft 689, pinion 690 and the gear 691, which by means of the pawl 718, now seated in the notch of the control disk 719, rotates anti-clockwise the shaft 692 (see arrow in Fig. 83) and therewith the crank disk 693, which by means of its pin 694, slotted link 736, link 737, oscillates the arm 604 anti-clockwise initiating the above referred to forward oscillation of the handle 604 through the cycle comprising Periods 1, 2 and 3.

Upon the crank disk 693 attaining almost a complete single revolution, the arm 604 is oscillated its full forward and thereafter its full rearward strokes, the same being completed upon the pin 717, on the crank disk 693 encountering the trip arm 715, forces the same downwardly to depress the link 714 to its neutral position, as shown in Fig. 63, thereby releasing the pin 708 on the switch arm 700, from the hook 709 of the rocking lever 710 and by means of the springs 712, 729, the switch arm and key stem 706 are elevated and the contact 703 moved out of contact with the contact 704, thereby breaking the circuit of the motor.

Upon the depression of the link 714, the oscillating shaft 721 is rocked clockwise, whereupon its pin 720 encountering the tail of the pawl 718 as the gear 691 continues in its anti-clockwise rotation, raises the pawl 718 out of engagement with the control disk 719, whereupon the crank disk 693 ceases its rotation.

The mechanical disconnecting of the actuating crank disk 693 from the motor shaft, ancillary to breaking the motor circuit, enables the armature of the motor to continue rotation under its momentum and gradually die down. Such arrangement also enables the machine to be operated manually by the handle when desired, without disturbing the motor attachment.

Whereas I have set forth my invention by reference to specific forms thereof, it will be understood that many changes and modifications may be made in accordance with the principles of the invention.

I claim.

1. A calculating machine comprising means for deriving a mathematical derivation involving a plurality of values, means controlled by said deriving means for deriving a different but interrelated mathematical derivation involving any third value, a key-board comprising keys arranged in sets respectively controlling said first named and second named deriving means and means for simultaneously indicating the different mathematical derivations.

2. A calculating machine comprising means for deriving a mathematical derivation involving a plurality of values, means controlled by said deriving means for deriving a different but interrelated mathematical derivation involving any third value, a key-board comprising keys arranged in sets respectively controlling said first named and second named deriving means and means for simultaneously recording the different mathematical derivations.

3. In a calculating machine, the combination of means for mechanically computing the difference between two values, means for mechanically computing the product of said difference and any third value, a key-board controlling said computing means and including a set of keys for the subtrahend values and a set of keys for the minuend values, and means for indicating simultaneously the resulting product and the difference.

4. In a calculating machine, the combination of means for mechanically computing the difference between two values, means for mechanically computing the product of said difference and any third value, a key-board controlling said computing means and including a set of keys representing integer and fractional subtrahend values and a set of keys representing integer and fractional minuend values, and means for indicating simultaneously the resulting product and the difference.

5. In a calculating machine, the combination of means for mechanically computing the difference between two values, including a rotary element, rotary means for mechanically computing the product of said difference and any third value, said product computing means being controlled in extent of rotation by said rotary element, and means for recording the resulting product, said recording means being controlled by said product computing means.

6. In a calculating machine, the combination of means for mechanically computing the difference between two values, means for mechanically computing the product of said difference and any third value, a key-board controlling said computing means and including a set of keys for the subtrahend values and a set of keys for the minuend values, and means for recording simultaneously the resulting product and said difference.

7. In a calculating machine, the combination of means for mechanically computing the difference between two values, means for mechanically computing the product of said difference and any third value, a key-board controlling said computing means and including a set of keys representing integer and fractional subtrahend values and a set of keys representing integer and fractional minuend values, and means for recording simultaneously the resulting product and said difference.

8. In a calculating machine, the combination of means for mechanically computing the difference between any subtrahend and minuend values, means for mechanically computing the product of said difference and any multiplier value, a key-board comprising keys for the subtrahend and minuend values and keys for the multiplier value, and means for indicating simultaneously the resulting product and the difference.

9. In a calculating machine, the combination of means for mechanically computing the difference between any subtrahend and minuend values, means for mechanically computing the product of said difference and any multiplier value, a key-board comprising keys for the subtrahend and minuend values and keys for the multiplier value, and means for recording simultaneously the resulting product and the difference.

10. In a calculating machine, the combination of means for mechanically computing the difference between any subtrahend and minuend values, means for mechanically computing the product of said difference and any multiplier value, a key-board comprising keys for the subtrahend and minuend values and separate keys for the multiplier value, and means for indicating simultaneously the resulting product and the difference.

11. In a calculating machine, the combination of means for mechanically computing the difference between any subtrahend and minuend values, means for mechanically computing the product of said difference and any multiplier value, a key-board comprising keys for the subtrahend and minuend values and separate keys for the multiplier value, and means for recording simultaneously the resulting product and the difference.

12. In a calculating machine, the combination of means for mechanically computing the difference between any subtrahend and minuend values, means for mechanically computing the product of said difference and any multiplier value, a key-board comprising keys for the subtrahend and minuend values and keys for the multiplier value and means for recording simultaneously the resulting product and the difference.

13. In a calculating machine, the combination of means for mechanically computing the difference between any subtrahend and minuend values, means for mechanically computing the product of said difference and any multiplier value, a key-board comprising keys for the subtrahend and minuend values and keys for the multiplier value and means for indicating simultaneously the resulting product and said difference.

14. In a calculating machine, the combination of means for mechanically computing the difference between any subtrahend and minuend values, means for mechanically computing the product of said difference and any multiplier value, a key-board comprising keys for the subtrahend and minuend values and separate keys for the multiplier value and means for recording simultaneously the resulting product and the difference.

15. In a calculating machine, the combination of means for mechanically computing the difference between any subtrahend and minuend values, means for mechanically computing the product of said difference and any multiplier value, a key-board comprising keys for the subtrahend and minuend values and separate keys for the multiplier value and means for indicating simultaneously the resulting product and the difference.

16. In a calculating machine, the combination of means for mechanically computing the difference between two values, said computing means including a rotary element, rotary means for mechanically computing the product of said difference and any third value, said product computing means being controlled in extent of rotation by said rotary element, means for recording the derived product, releasable connecting means between said recording means and said product deriving means and manual means for operating said releasable connecting means.

17. In a calculating machine, the combination of means for mechanically computing the difference between two values, said computing means including a rotary element, rotary means for mechanically computing the product of said difference and any third value, said product computing means being controlled in extent of rotation by said rotary element, means for recording the derived product and the derived difference, releasable connecting means between said recording means and said product deriving means and said difference means, and manual means for operating said releasable connecting means.

18. In a calculating machine, the combination of means for mechanically computing the successive differences between any plurality of subtrahend and minuend values and the successive products of such successive differences and any multiplier value or values, a key-board comprising sets of keys controlling the subtrahend and minuend values and the multiplier values, means for recording the successive differences and separate means for recording the successive products.

19. In a calculating machine, the combination of means for mechanically computing the successive differences between any plurality of subtrahend and minuend values, said difference computing means including a rotary element, means for mechanically computing the successive products of such successive differences and any multiplier value or values, said product computing means including a rotary, stepped element; rotatable means connecting said first named rotary element with said second named rotary-stepped element, a key-board controlling said computing means; counter means for registering the successive differences; and separate counter means for registering the successive products.

20. In a calculating machine, the combination of means for mechanically computing the successive differences between a plurality of subtrahend and minuend values, said difference computing means including a plurality of mutually rotatable elements, means for mechanically computing the successive products of such differences and any multiplier value or values, said product computing means comprising a rotary, stepped member, rotatable means connecting said plurality of mutually rotatable elements with said rotatable stepped member, a key-board controlling said computing means; counter means for registering the successive differences; separate counter means for registering the successive products; recording means controlled by said first named counter means; and separate recording means controlled by said second named counter means.

21. In a calculating machine, the combination of means for mechanically computing the successive difference between a plurality of subtrahend and minuend values, means for mechanically computing the successive products of such differences and any multiplier value or values, a key-board controlling said computing means, means for recording the successive difference values, means for recording the successive product values and, means for rendering said difference value recording means and said product value recording means ineffectual.

22. In a calculating machine the combination of means for mechanically deriving the respective defferences between a plurality of any subtrahend and minuend values, means for mechanically deriving the product of the respective differencæs and any mulitplier value, a key-board of manipulatable keys representing subtrahend and minuend values and separate, manipulatable keys representing multiplier values, means for operating said deriving means under control of the manipulated keys and means for indicating simultaneously the respective products and the respective differences.

23. In a calculating machine, the combination of means for mechanically deriving the respective differences between a plurality of any subtrahend and minuend values, means for mechanically deriving the product of the respective differences and any multiplier value, a key-board of manipulatable keys representing subtrahend and minuend values and separate, manipulatable keys representing multiplier values, means for operating said deriving means under control of the manipulated keys, means for restoring the manipulated subtrahend and minuend value keys to neutral and means for indicating simultaneously the respective products and the respective differences.

24. In a calculating machine, the combination of means for mechanically deriving the respective differences between a plurality of any subtrahend and minuend values, means for mechanically deriving the product of the respective differences and any multiplier value, a key-board of manipulatable keys representing subtrahend and minuend values and separate, manipulatable keys representing multiplier values, means for operating said deriving means under control of the manipulated keys, means operable upon the operation of said operating means for restoring the manipulated subtrahend and minuend value keys to neutral and means for indicating simultaneously the respective products and the respective differences.

25. In a calculating machine, the combination of means for mechanically deriving the respective differences between a plurality of any subtrahend and minuend values, means for mechanically deriving the product of the respective differences and any multiplier value, a key-board of manipulatable keys representing subtrahend and minuend values and separate, manipulatable keys representing multiplier values, means for operating said deriving means under control of the manipulated keys and separated means for respectively registering the respective differences and products.

26. In a calculating machine, the combination of means for mechanically deriving the respective differences between a plurality of any subtrahend and minuend values, means for mechanically deriving the product of the respective differences and any multiplier value, a key-board of manipulatable keys representing subtrahend and minuend values and separate, manipulatable keys representing multiplier values, means for operating said deriving means under control of the manipulated keys, means for restoring the manipulated subtrahend and minuend value keys to neutral and separate means for respectively registering the respective differences and products.

27. In a calculating machine, the combination of means for mechanically deriving the respective differences between a plurality of any subtrahend and minued values, means for mechanically deriving the product of the respective differences and any multiplier value, a key-board of manipulatable keys representing subtrahend and minuend values and separate, manipulatable keys representing multiplier values, means for operating said deriving means under control of the manipulated keys, means operable upon the operation of said operating means for restoring the manipulated subtrahend and minuend value keys to neutral and separate means for respectively registering the respective differences and products.

28. In a calculating machine, the combination of means for mechanically deriving the respective differences between a plurality of any subtrahend and minuend values, means for mechanically deriving the product of the respective differences and any multiplier value, a key-board of manipulatable keys representing subtrahend and minuend values and separate, manipulatable keys representing multiplier values, means for operating said deriving means under control of the manipulated keys and separate means for respectively recording the respective products and the respective differences.

29. In a calculating machine, the combination of means for mechanically deriving the respective differences between a plurality of any subtrahend and minuend values, means for mechanically deriving the product of the respective differences and any multiplier value, a key-board of manipulatable keys representing subtrahend and minuend values and separate, manipulatable keys representing multiplier values, means for operating said deriving means under control of the manipulated keys, means for restoring the manipulated subtrahend and minuend value keys to neutral and separate means for respectively recording the respective products and the respective differences.

30. In a calculating machine, the combination of means for mechanically deriving the respective differences between a plurality of any subtrahend and minuend values, means for mechanically deriving the product of the respective differences and any multiplier, a key-board of manipulatable keys representing subtrahend and minuend values and separate, manipulatable keys representing multiplier values, means for operating said deriving means under control of the manipulated keys, means operable upon the operation of said operating means for restoring the manipulated subtrahend and minuend value keys to neutral and separate means for respectively recording the respective products and the respective differences.

31. In a calculating machine, the combination of means for mechanically deriving the difference between any subtrahend and any minuend value and for deriving the product of said difference and any multiplier, a key-board of manipulatable keys representing subtrahend and minuend values and separate manipulatable keys representing multiplier values, means for operating said deriving means under control of the manipulated keys, means for restoring the manipulated subtrahend and minuend value keys to neutral, separate means for restoring the manipulated multiplier value key to neutral, means for indicating the products and separate means for indicating the differences.

32. In a calculating machine, the combination of means for mechanically deriving the difference between any subtrahend and any minuend value and for deriving the product of said difference and any multiplier, a key-board of manipulatable keys representing subtrahend and minuend values, and separate, manipulatable keys representing multiplier values, means for operating said deriving means under control of the manipulated keys, means operable upon the operation of said operating means for restoring the manipulated subtrahend and minuend value keys to neutral, separate means for restoring the manipulated multiplier value key to neutral, means for indicating the products and separate means for indicating the differences.

33. In a calculating machine, the combination of means for mechanically deriving the difference between any subtrahend and any minuend value and for deriving the product of said difference and any multiplier, a key-board of manipulatable keys representing subtrahend and minuend values and separate manipulatable keys representing multiplier values, means for operating said deriving means under control of the manipulated keys, means for restoring the manipulated subtrahend and minuend value keys to neutral, separate means for restoring the manipulated multiplier value key to neutral and means for indicating simultaneously the products and the differences.

34. In a calculating machine, the combination of means for mechanically deriving the difference between any subtrahend and any minuend value and for deriving the product of said difference and any multiplier, a key-board of manipulatable keys representing subtrahend and minuend values, and separate, manipulatable keys representing multiplier values, means for operating said deriving means under control of the manipulated keys, means operable upon the operation of said operating means for restoring the manipulated subtrahend and minuend value keys to neutral, separate means for restoring the manipulated multiplier value key to neutral, and means for indicating simultaneously the products and the differences.

35. In a calculating machine, the combination of means for mechanically deriving the difference between any subtrahend and any minuend value and for deriving the product of said difference and any multiplier, a key-board of manipulatable keys representing subtrahend and minuend values and separate manipulatable keys representing multiplier values, means for operating said deriving means under control of the manipulated keys, means for restoring the manipulated subtrahend and minuend value keys to neutral, separate means for restoring the manipulated multiplier value key to neutral, means for recording the products and separate means for recording the differences.

36. In a calculating machine, the combination of means for mechanically deriving the difference between any subtrahend and any minuend value and for deriving the product of said difference and any multiplier, a key-board of manipulatable keys representing subtrahend and minuend values, and separate, manipulatable keys representing multiplier values, means for operating said deriving means under control of the manipulated keys, means operable upon the operation of said operating means for restoring the manipulated subtrahend and minuend value keys to neutral, separate means for restoring the manipulated multiplier value key to neutral, means for recording the products and separate means for recording the differences.

37. In a calculating machine, the combination of means for mechanically deriving the difference between any subtrahend and any minuend value and for deriving the product of said difference and any multiplier, a key-board of manipulatable keys representing subtrahend and minuend values and separate manipulatable keys representing multiplier values, means for operating said deriving means under control of the manipulated keys, means for restoring the manipulated subtrahend and minuend value keys to neutral, separate means for restoring the manipulated multiplier value key to neutral, means for recording simultaneously the products and the differences.

38. In a calculating machine, the combination of means for mechanically deriving the difference between any subtrahend and any minuend value and for deriving the product of said difference and any multiplier, a key-board of manipulatable keys representing subtrahend and minuend values, and separate, manipulatable keys representing multiplier values, means for operating said deriving means under control of the manipulated keys, means operable upon the operation of said operating means for restoring the manipulated subtrahend and minuend value keys to neutral, separate means for restoring the manipulated multiplier value key to neutral, and means for recording simultaneously the products and the differences.

39. In a calculating machine, the combination of means for deriving the product of any multiplier value and the difference between any subtrahend and any minuend value, a key-board comprising keys for the multiplier and subtrahend and minuend values, means for restoring the operated subtrahend and minuend keys to neutral, and separate means for restoring the operated multiplier key to neutral.

40. In a calculating machine, the combination of means for deriving the product of any multiplier value and the difference between any subtrahend and any minuend value, a key-board comprising keys for the multiplier and subtrahend and minuend values, means for operating said deriving means under control of the operated keys, means for restoring the operated subtrahend and minuend keys to neutral and separate means for restoring the operated multiplier key to neutral.

41. In a calculating machine, the combination of means for deriving the product of any multiplier value and the difference between any subtrahend and any minuend value, a key-board comprising a bank of keys for the multiplier values and a separate bank of keys for the subtrahend and minuend values, means for operating said deriving means under control of the operated keys, means for restoring the operated subtrahend and minuend keys to neutral and separate means for restoring the operated multiplier key to neutral.

42. In a calculating machine, the combination of means for deriving the product of any multiplier value and the difference between any subtrahend and any minuend value, a key-board comprising a bank of keys for the multiplier, and a separate bank of keys for the subtrahend and minuend values, means for operating said deriving means under control of the operated keys, means operative upon the operation of said operating means for restoring the operated subtrahend and minuend keys to neutral and separate means for restoring the operated multiplier keys to neutral.

43. In a calculating machine, the combination of means for deriving the product of any multiplier value and the difference between any subtrahend and any minuend value, a key-board comprising a bank of keys for the multiplier and a separate bank of keys for the subtrahend and minuend values, means for operating said deriving means under control of the operated keys, means operative upon the operation of said operating means, for restoring the operated subtrahend and minuend keys to neutral and separate means for restoring the operated multiplier key to neutral.

44. In a calculating machine, the combination of means for deriving the product of any multiplier value and the difference between any subtrahend and any minuend values, a key-board comprising keys for the multiplier and subtrahend and minuend values, means for restoring the operated subtrahend and minuend keys to neutral, separate means for restoring any operated multiplier key, means for indicating the differences and separate means for indicating the products.

45. In a calculating machine, the combination of means for driving the product of any multiplier value and the difference between any subtrahend and any minuend value, a key-board comprising keys for the multiplier, and subtrahend and minuend values, means for restoring the operated subtrahend and minuend keys to neutral, separate means for restoring the operated multiplier key to neutral, means for indicating the differences and separate means for indicating the products.

46. In a calculating machine, the combination of means for deriving the product of any multiplier value and the difference between any subtrahend and any minuend value, a key-board comprising keys for the multiplier and subtrahend and minuend values, means for operating said deriving means under control of the operated keys, means for restoring the operated subtrahend and minuend keys to neutral, separate means for restoring any operated multiplier key to neutral, means for indicating the differences and separate means for indicating the products.

47. In a calculating machine, the combination of means for deriving the product of any multiplier value and the difference between any subtrahend and any minuend value, a key-board comprising keys for the multiplier and subtrahend and minuend values, means for operating said deriving means under control of the operated keys, means for restoring the operated subtrahend and minuend keys to neutral, separate means for restoring any operated multiplier key to neutral, means for indicating the differences and separate means for indicating the products.

48. In a calculating machine, the combination of means for deriving the product of any multiplier value and the difference between any subtrahend and any minuend value, a key-board comprising keys for the multiplier, and subtrahend and minuend values, means for operating said deriving means under control of the operated keys, means operative upon the operation of said operating means, for restoring the operated subtrahend and minuend keys to neutral, separate means for restoring any operated multiplier keys to neutral, means for indicating the differences and separate means for indicating the products.

49. In a calculating machine, the combination of means for deriving the product of any multiplier value and the difference between any subtrahend and any minuend value, a key-board comprising keys for the multiplier and subtrahend and minuend values, means for operating said deriving means under control of the operated keys, means operative upon the operation of said operating means for restoring the operated subtrahend and minuend keys to neutral, separate means for restoring any operated multiplier key to neutral, means for indicating the differences and separate means for indicating the products.

50. In a calculating machine, the combination of means for deriving the product of any multiplier value and the difference between any subtrahend and any minuend values, a key-board comprising keys for the multiplier and subtrahend and minuend values, means for restoring the operated subtrahend and minuend keys to neutral, and means for indicating simultaneously the products and the differences.

51. In a calculating machine, the combination of means for deriving the product of any multiplier value and the difference between any subtrahend and any minuend value, a key-board comprising keys for the multiplier and subtrahend and minuend values, means for restoring the operated subtrahend and minuend keys to neutral, separate means for restoring any operated multiplier key to neutral and means for indicating simultaneously the products and the differences.

52. In a calculating machine, the combination of means for deriving the product of any multiplier value and the difference between any subtrahend and any minuend value, a key-board comprising keys for the multiplier and subtrahend and minuend values, means for operating said deriving means under control of the operated keys, means for restoring the operated subtrahend and minuend keys to neutral and means for indicating simultaneously the products and the differences.

53. In a calculating machine, the combination of means for deriving the product of any multiplier value and the difference between any subtrahend and any minuend value, a key-board comprising keys for the multiplier and subtrahend and minuend values, means for operating said deriving means under control of the operated keys, means for restoring the operated subtrahend and minuend keys to neutral, separate means for restoring any operated multiplier key to neutral and means for indicating simultaneously the products and the differences.

54. In a calculating machine, the combination of means for deriving the product of any multiplier value and the difference between any subtrahend and any minuend value, a key-board comprising keys for the multiplier, and subtrahend and minuend values, means for operating said deriving means under control of the operated keys, means operative upon the operation of said operating means for restoring the operated subtrahend and minuend keys to neutral, separate means for restoring any operated multiplier keys to neutral and means for indicating simultaneously the products and differences.

55. In a calculating machine, the combination of means for deriving the product of any multiplier value and the difference between any subtrahend and any minuend value, a key-board comprising keys for the multiplier and subtrahend and minuend values, means for operating said deriving means under control of the operated keys, means operative upon the operation of said operating means for restoring the operated subtrahend and minuend keys to neutral, separate means for restoring any operated multiplier key to neutral and means for indicating simultaneously the products and the differences.

56. In a calculating machine, the combination of means for deriving the product of any multiplier value and the difference between any subtrahend and any minuend values, a key-board comprising keys for the multiplier and subtrahend and minuend values, means for restoring the operated subtrahend and minuend keys to neutral, means for recording the differences and separate means for recording the products.

57. In a calculating machine, the combination of means for deriving the product of any multiplier value and the difference between any subtrahend and any minuend value, a key-board comprising keys for the multiplier and subtrahend and minuend values, means for operating said deriving means under control of the operated keys, means operative upon the operation of said operating means for restoring the operated subtrahend and minuend keys to neutral, separate means for restoring any operated multiplier key to neutral, means for recording the differences and separate means for recording the products.

58. In a calculating machine, the combination of means for deriving the product of any multiplier value and the difference between any subtrahend and any minuend values, a key-board comprising keys for the multiplier and subtrahend and minuend values, means for restoring the operated subtrahend and minuend keys to neutral, and means for recording simultaneously the products and the differences.

59. In a calculating machine, the combination of means for deriving the product of any multiplier value and the difference between any subtrahend and minuend values, a key-board comprising keys for the multiplier and the subtrahend and minuend values, adding means and means for indicating simultaneously the products and the differences and for indicating separately the addition of any desired products.

60. In a calculating machine, the combination of means for deriving the product of any multiplier value and the difference between any subtrahend and minuend values, a key-board comprising keys for the multiplier and the subtrahend and minuend values, adding means, means for operating said deriving means under control of the operated keys, and means for indicating simultaneously the products and the differences and for indicating separately the addition of any desired products.

61. In a calculating machine, the combination of means for deriving the product of any multiplier value and the difference between any subtrahend and minuend values, a key-board comprising keys for the multiplier and the subtrahend and minuend values, adding means and means for operating said deriving means under control of the operated keys, a key controlling the adding means and means for indicating simultaneously the products and the differences and for indicating separately the addition of any desired products.

62. In a calculating machine, the combination of means for deriving the product of any multiplier value and the difference between any subtrahend and minuend values, a key-board comprising keys for the multiplier and the subtrahend and minuend values, adding means and means for operating said deriving means under control of the operated keys, means for restoring the operated keys to neutral and means for indicating simultaneously the products and the differences and for indicating separately the addition of any desired products.

63. In a calculating machine, the combination of means for deriving the product of any multiplier value and the difference between any subtrahend and minuend values, a key-board comprising keys for the multiplier and the subtrahend and minuend values, adding means and means for operating said deriving means under control of the operated keys, means operative upon the operation of said operating means for restoring the operated keys to neutral and means for indicating simultaneously the products and the differences and for indicating separately the addition of any desired products.

64. In a calculating machine, the combination of means for deriving the product of any multiplier value and the difference between any subtrahend and minuend values, a key-board comprising keys for the multiplier and the subtrahend and minuend values, adding means and means for indicating simultaneously the products and the differences and for indicating separately the addition of any desired products and of any desired differences.

65. In a calculating machine, the combination of means for deriving the product of any multiplier value and the difference between any subtrahend and minuend values, a key-board comprising keys for the multiplier and the subtrahend and minuend values, adding means, means for operating said deriving means under control of the operated keys, and means for indicating simultaneously the products and the differences and for indicating separately the addition of any desired products and of any desired differences.

66. In a calculating machine, the combination of means for deriving the product of any multiplier value and the difference between any subtrahend and minuend values, a key-board comprising keys for the multiplier and the subtrahend and minuend values, adding means and means for operating said deriving means under control of the operated keys, a key controlling the adding means and means for indicating simultaneously the products and the differences and for indicating separately the addition of any desired products and of any desired differences.

67. In a calculating machine, the combination of means for deriving the product of any multiplier value and the difference between any subtrahend and minuend values, a key-board comprising keys for the multiplier and the subtrahend and minuend values, adding means and means for operating said deriving means under control of the operated keys, means for restoring the operated keys to neutral and means for indicating simultaneously the products and the differences and for indicating separately the addition of any desired products and of any desired differences.

68. In a calculating machine, the combination of means for deriving the product of any multiplier value and the difference between any subtrahend and minuend values, a key-board comprising keys for the multiplier and the subtrahend and minuend values, adding means and means for operating said deriving means under control of the operated keys, means operative upon the operation of said operating means for restoring the operated keys to neutral and means for indicating simultaneously the products and the differences and for indicating separately the addition of any desired products and of any desired differences.

69. In a calculating machine, the combination of means for deriving the difference between any subtrahend and minuend values and the product of such difference and any multiplier value, a key-board comprising keys for the subtrahend and minuend values and keys for the multiplier values, a totalizing device for the difference values, a separate totalizing device for the product values, a grand totalizing device, keys respectively controlling said totalizing means and said grand totalizing means and means for indicating the desired products, the desired totals of any of said products and the desired grand totals of any of said totals.

70. In a calculating machine, the combination of means for deriving the difference between any subtrahend and minuend values and the total of the products of such difference at any multiplier values, a key-board comprising keys for the subtrahend and minuend values and keys for the multiplier values, means for totaling any desired difference values, means for totaling any desired product values, means for grand totaling said product value totals, keys respectively controlling said difference totaling means and said product value totaling means and said grand totaling means and means for indicating the said difference value totals, the said product value totals and the said grand totals.

71. In a calculating machine, the combination of means for deriving the difference between any subtrahend and minuend values and the product of such difference and any multiplier value, a key-board comprising keys for the subtrahend and minuend values and keys for the multiplier values, means for operating said deriving means under control of the operated keys, a totalizing device for the difference values, a totalizing device for the product values, a grand totalizing device, keys respectively controlling said totalizing devices and said grand totalizing device, and means indicating the desired products, the desired totals of any of said products and the desired grand totals of any of said totals.

72. In a calculating machine, the combination of means for deriving the difference between any subtrahend and minuend values and the product of such difference and any multiplier value, a key-board comprising keys for the subtrahend and minuend values and keys for the multiplier values, means for operating said deriving means under control of the operated keys, means for restoring the operated keys to neutral, totalizing device for the difference values, a totalizing device for the product values, a grand totalizing device, keys respectively controlling said totalizing devices and said grand totalizing device, and means for indicating the desired products, the desired totals of any of said products and the desired grand totals of any of said totals.

73. In a calculating machine, the combination of means for deriving the difference between any subtrahend and minuend values and the product of such difference and any multiplier value, a key-board comprising keys for the subtrahend and minuend values and keys for the multiplier value, means for operating said deriving means under control of the operated keys, means operative upon the operation of said operating means for restoring the operated keys to neutral, a totalizing device for the difference values, a totalizing device for the product values, a grand totalizing device, keys respectively controlling said totalizing devices and said grand totalizing device, and means for indicating the desired products, the desired totals of any of said products and the desired grand totals of any of said totals.

74. In a calculating machine, the combination of means for deriving the difference between any subtrahend and minuend values and the product of such difference and any multiplier value, a key-board comprising keys for the subtrahend and minuend values and keys for the multiplier values, means for operating said deriving means under control of the operated keys, a totalizing device for the difference values, a totalizing device for the product values, a grand totalizing device, keys respectively controlling said totalizing devices and said grand totalizing device, and means for indicating the desired products, the desired totals of any of said differences and the desired grand totals of any of said totals.

75. In a calculating machine, the combination of means for deriving the difference between any subtrahend and minuend values and the product of such difference and any multiplier value, a key-board comprising keys for the subtrahend and minuend values and keys for the multiplier values, means for operating said deriving means under control of the operated keys, means for restoring the operated keys to neutral, a totalizing device for the difference values, a totalizing device for the product values, a grand totalizing device, keys respectively controlling said totalizing devices and said grand totalizing device, and means for indicating the desired products, the desired totals of any of said differences and the desired grand totals of any of said totals.

76. In a calculating machine, the combination of means for deriving the difference between any subtrahend and minuend values and the product of such difference and any multiplier value, a key-board comprising keys for the subtrahend and minuend values and keys for the multiplier values, means for operating said deriving means under control of the operated keys, means operative upon the operation of said operating means for restoring the operated keys to neutral, a totalizing device for the difference values, a totalizing device for the product values, a grand totalizing device, keys respectively controlling said totalizing devices and said grand totalizing device, and means for indicating the desired products, the desired totals of any of said differences and the desired grand totals of any of said totals.

77. In a calculating machine, the combination of means for deriving the difference between any subtrahend and minuend values and the product of such difference and any multiplier value, a key-board comprising keys for the subtrahend and minuend values and keys for the multiplier values, means for operating said deriving means under control of the operated keys, a totalizing device for the difference values, a totalizing device for the product values, a grand totalizing device, keys respectively controlling said totalizing devices and said grand totalizing device, and means for indicating the desired products, the desired totals of any of said products and differences and the desired grand totals of any of said totals.

78. In a calculating machine, the combination of means for deriving the difference between any subtrahend and minuend values and the product of such difference and any multiplier value, a key-board comprising keys for the subtrahend and minuend values and keys for the multiplier values, means for operating said deriving means under control of the operated keys, means for restoring the operated keys to neutral, a totalizing device for the difference values, a totalizing device for the product values, a grand totalizing device, keys respectively controlling said totalizing devices and said grand totalizing device, and means for indicating the desired products, the desired totals of any of said products and differences and the desired grand totals of any of said totals.

79. In a calculating machine, the combination of means for deriving the difference between any subtrahend and minuend values and the product of such difference and any multiplier value, a key-board comprising keys for the subtrahend and minuend value and keys for the multiplier values, means for operating said deriving means under control of the operated keys, means operative upon the operation of said operating means for restoring the operated keys to neutral, a totalizing device for the difference values, a totalizing device for the product values, a grand totalizing device, keys respectively controlling said totalizing devices and said grand totalizing device, and means for indicating the desired products, the desired totals of any of said products and differences and the desired grand totals of any of said additions.

80. In a calculating machine, the combination of means for deriving the difference between any subtrahend and minuend values, a key-board comprising keys for the subtrahend and minuend values, said deriving means including a plurality of relatively movable elements, a plurality of stop devices carried by said elements and means operated by said keys for operating corresponding stop devices respectively of said plurality of sets of stop devices.

81. In a calculating machine, the combination of means for deriving the difference between any subtrahend and minuend values, a key-board comprising sets of keys respectively for the subtrahend and minuend values, said deriving means including a plurality of relatively movable elements, a plurality of sets of stop devices respectively carried by said movable elements, links respectively operated by said plurality of sets of keys for operating the stop devices respectively of said sets of stop devices and means for relatively moving said movable elements.

82. In a calculating machine, the combination of means for deriving the difference between any subtrahend and minuend values, a key-board comprising keys for the subtrahend and minuend values, said deriving means including a plurality of relatively movable elements, a plurality of sets of stop devices respectively carried by said movable elements, a series of interconnected links operated respectively by said keys for operating certain stop devices of said plurality, of stop devices, means for causing relative movement between said movable elements and for restoring the operated keys and operated stop devices to neutral positions.

83. In a calculating machine, the combination of means for deriving the difference between any subtrahend and minuend values, a key-board comprising keys for the subtrahend and minuend values, said deriving means including a plurality of relatively rotatable elements, a plurality of sets of stop devices, means for movably mounting a set of stop devices on each of said movable elements and means respectively connecting said keys with corresponding stop devices for operating the same to operated position.

84. In a calculating machine, the combination of means for deriving the difference between any subtrahend and minuend values, a key-board comprising keys for the subtrahend and minuend values, said deriving means including a plurality of relatively rotatable elements, a plurality of sets of stop devices, means for movably mounting a set of stop devices on each of said rotatable elements, means respectively connecting said keys with corresponding stop devices for operating the same to operated position, means for relatively moving said rotatable elements and means for restoring the operated keys and the operated stop devices to neutral positions.

85. In a calculating machine, the combination with means for deriving the difference between any subtrahend and minuend values, a key-board comprising a set of keys representing whole and fractional subtrahend values and a set of keys representing whole and fractional minuend values, a plurality of relatively movable elements, a set of stop devices mounted on each of said movable elements, means respectively connecting the keys of said sets of keys with certain stop devices of said sets of stop devices and means for effecting relative movement between said movable elements.

86. In a calculating machine, the combination with means for deriving the difference between any subtrahend and minuend values, a key-board comprising a set of keys representing whole and fractional subtrahend values and a set of keys representing whole and fractional minuend values, a plurality of relatively movable elements, a set of stop devices mounted on each of said movable elements, means respectively connecting the keys of said sets of keys with certain stop devices of said sets of stop devices and means controlled by a fractional value key for effecting relative movement between said movable elements.

87. In a calculating machine, the combination with means for deriving the difference between any subtrahend and minuend values, a key-board comprising a set of keys representing whole and fractional subtrahend values and a set of keys representing whole and fractional minuend values, a plurality of relatively movable elements, a set of stop devices movably mounted on each of said movable elements, means respectively connecting the keys of said sets of keys with certain stop devices of said sets of stop devices to operate the same to operated position, means for effecting relative movement between said movable elements and means for restoring the operated keys and the operated stop devices to neutral position.

88. In a calculating machine, the combination of means for deriving the difference between any subtrahend and minuend values, a key-board comprising keys for the subtrahend and minuend values, said deriving means including a plurality of relatively rotatable elements, a plurality of stop devices carried by said elements, a plurality of links operated by said keys for operating corresponding stop devices respectively of said plurality of sets of stop devices and variable connection means between said links comprising notches corresponding in number to the positions of relative movement between said rotatable elements.

89. In a calculating machine, the combination with means for deriving the difference between any subtrahend and minuend values, a key-board comprising a set of keys representing whole and fractional subtrahend values and a set of keys representing whole and fractional minuend values, a plurality of relatively rotatable elements, a set of stop devices movably mounted on each of said rotatable elements, means respectively connecting the keys of said set of keys with certain stop devices of said sets of stop devices to operate the same to operated position, means for effecting relative movement between said rotatable elements and means for restoring the operated keys and the operated stop devices to neutral position.

90. In a calculating machine, the combination of means for deriving the difference between any subtrahend and minuend values, a key-board comprising a set of keys representing subtrahend values and a set of keys representing minuend values, a pair of relatively movable elements, a set of stop devices mounted on each of said elements, means connecting the keys of said first set with corresponding stop devices on one of said movable elements, means connecting the keys of said second set with corresponding stop devices on the other of said pair of movable elements and means for effecting relative movement between said pair of movable elements.

91. In a calculating machine, the combination of means for deriving the difference between any subtrahend and minuend values, said means including an element, a set of stop-devices carried by said element, a second element, a set of stop-devices carried by said second element, a set of keys representing subtrahend values, means connecting said set of keys with said first named set of stop-devices, a second set of keys, means connecting said second set of keys with said second named set of stop devices, means for moving said elements relatively to one another, and means for indicating the relative movement of one of said elements to the other.

92. In a calculating machine, means for deriving a mathematical value comprising a link, a set of keys representing different values, a set of cams respectively controlled by said keys, said cams having effective cam portions commensurate with the values of said keys, a second set of keys representing different values, a second set of cams respectively controlled by said second set of keys, and having effective cam portions commensurate with the values of said second set of keys, means connecting any one of said second set of cams with said link and means controlled by said link for indicating the derived mathematical value.

93. In a calculating machine, means for deriving a mathematical value comprising a link, a set of keys representing different values, a set of cams respectively controlled by said keys and having effective cam portions commensurate with the values of said keys, a second set of keys representing different values, a second set of cams respectively controlled by said second set of keys and having effective cam portions commensurate with the values of said second set of keys, a second link normally disconnected from said first named link but adapted to be controlled by any cam of said second set of cams, means connecting said second named link with said first named link when said second named link is under control of said second set of cams and means controlled by said second named link for indicating the derived mathematical value.

94. In a calculating machine, for deriving a mathematical computation involving two values, a link controlling said deriving means, a set of keys representing different values, a set of cams respectively controlled by said keys, said cams having effective cam portions commensurate with the values of said keys, a second set of keys representing different values, a second set of cams respectively controlled by said second set of keys and having effective cam portions commensurate with the values of said keys, a second link controlled by any cam of said second set of cams, a pin and slot connection connecting said second named link with said first named link, and means for indicating the mathematical value commensurate with the extent of movement of said second link.

95. In a calculating machine, means for deriving the difference between any subtrahend and minuend values and the product of such difference and any multiplier value, a key-board bearing subtrahend and minuend and multiplier values and controlling said deriving means, and means controlled by said deriving means for simultaneously indicating the difference and the corresponding product.

96. In a calculating machine, means for deriving the difference between any subtrahend and minuend values and the product of such difference and any multiplier value, a key-board bearing subtrahend and minuend and multiplier values and controlling said deriving means, and means controlled by said deriving means for simultaneously recording the difference and the corresponding product.

97. In a calculating machine, means for deriving the difference between any subtrahend and minuend values and the product of such difference and any multiplier value, a key-board bearing subtrahend and minuend and multiplier values and controlling said deriving means, means for printing a reference character, and means controlled by said deriving means for simultaneously indicating the difference and the corresponding product.

98. In a calculating machine, means for deriving the difference between any subtrahend and minuend values and the product of such difference and any multiplier value, a key-board including a set of keys for the subtrahend and minuend and a separate set of keys for the multiplier values and controlling said deriving means, means for printing a reference character keys controlling said printing means, and means controlled by said deriving means for simultaneously indicating the difference and the corresponding product.

99. In a calculating machine, means for deriving the difference between any subtrahend and minuend values and the product of such difference and any multiplier value, a key-board including a set of keys for the subtrahend and minuend and a separate set of keys for the multiplier values and a separate set of keys for any reference character, means for printing a reference character, and means controlled by said deriving means for simultaneously recording the difference and the corresponding product.

100. In a calculating machine, the combination of means for deriving the difference between any subtrahend and minuend values and the product of such difference, and any multiplier value, a key-board bearing subtrahend and minuend and multiplier values, means for printing a reference character, keys controlling said printing means and means controlled by said deriving means for simultaneously recording the difference and the corresponding product.

101. The combination of a key-board comprising keys corresponding to subtrahend and minuend and multiplier values, means controlled by said keys for indicating the difference between any subtrahend and minuend values and separate means for indicating the product of such difference and any multiplier value.

102. The combination of a key-board comprising keys corresponding to subtrahend and minuend and multiplier values, means controlled by said keys for recording the difference between any subtrahend and minuend values and the product of such difference and separate means for indicating any multiplier value.

103. The combination of a key-board comprising keys corresponding to subtrahend and minuend and multiplier values and means controlled by said keys for simultaneously recording the difference between any subtrahend and minuend values and the product of such difference and any multiplier value.

104. The combination of a key board comprising keys corresponding to subtrahend and minuend and multiplier values, means controlled by said keys for deriving the difference between any subtrahend and minuend values; said difference indicating means comprising a plurality of projection carrying, relatively movable elements; means for deriving the product of such derived difference and any multiplier value, said product deriving means comprising a rotary-stepped element; rotary means connecting said plurality of rotary elements with said rotary-stepped element; means for adding any derived differences; means for indicating any differences; separate means for indicating any products; means for indicating the addition of such differences; and separate means for indicating the addition of any products.

105. The combination of a key-board comprising keys corresponding to subtrahend, and minuend and multiplier values, means controlled by said keys for deriving the difference between any subtrahend and minuend means, and the product of any difference and any multiplier value, means for adding any derived differences and means for recording simultaneously any successive differences and corresponding products and the addition of such differences and the addition of any products.

106. In a calculating machine, the combination of means for deriving the product of any multiplier value and the difference between any subtrahend and minuend values, a key-board comprising keys for the multiplier and the subtrahend and minuend values, keys corresponding to a plurality of reference characters, adding means for adding said product values, means for indicating the products and the differences, and separate means for indicating a reference mark of desired number of characters.

107. In a calculating machine, an element, stop-devices carried by said element, said stop-devices being disposed in a predetermined relation to one another, and normally in inoperative position, a second element, stop-devices carried by said second element, said second-named stop-devices being disposed in the same predetermined relation to one another, and normally in inoperative position, keys for operating the desired stop devices of said two sets of stop devices to operative position, means for moving said second-named element relative to said first-named element for the extent of the relative movement between the operated stop devices, and means for indicating the mathematical value commensurate with the extent of relative movement between said first named and said second named elements.

108. In a calculating machine, an element, stop-devices carried by said element, said stop-devices being disposed in a predetermined relation to one another, a second element, stop devices carried by said second element, said second-named stop-devices being disposed in the same predetermined relation to one another, a set of keys adapted to respectively move said second-named element relative to said first-named element in a certain direction, a second set of keys adapted to respectively move said second-named element relative to said first-named element in the opposite direction, and means for indicating the mathematical value commensurate with the extent of relative movement between said first named and said second named elements.

109. In a calculating machine, an element, stop-devices controlling said element, said stop-devices being disposed in a predetermined relation to one another, a second element, stop-devices controlling said second element, said second-named stop-devices being disposed in the same predetermined relation to one another, means for moving said second-named element relative to said first-named element, for an extent determined by the set stop devices of the respective elements, and means for indicating the mathematical value commensurate with said extent of relative movement.

110. In a computing machine, means for deriving the difference between two values, keys corresponding to a plurality of values and operating means controlled by said keys and controlling said difference deriving means. said operating means comprising a link controlling one of said rotatable elements, and parallelly movable mounting means for said link, said link being provided with a series of depressions corresponding to the number of positions of rotation of said one rotatable element relative to the other of said rotatable elements.

111. In a computing machine, means for deriving the difference between two values, keys corresponding to a plurality of values and operating means controlled by said keys and controlling said difference deriving means, said operating means comprising a link controlled by said keys, a second link controlled by said keys and parallelly moving mounting means for said links respectively.

112. In a computing machine, means for deriving the difference between two values, keys corresponding to a plurality of values and operating means controlled by said keys and controlling said difference deriving means, said operating means comprising a link controlling one of said rotatable elements and controlled by said keys, a second link controlled by said keys, one of said links being provided with a series of depressions corresponding to the positions of rotary movement of one of said rotatable elements, and a pin carried by the other of said links and co-acting with said depressions.

113. In a calculating machine, means for deriving the difference between any two values and including two rotatable elements, a set of keys for setting one value, a set of keys for setting a second value, a link connected to one of said rotatable elements, a link controlled by said first-named set of keys, and variable connection means between said first-named link and said second-named link.

114. In a calculating machine, means for deriving the difference between any two values and including two rotatable elements a set of keys for setting one value, a set of keys for setting a second value, a link connected to one of said rotatable elements, a link controlled by said first-named set of keys, and variable connection means between said first-named link and said second-named link, said variable connection means comprising a set of depressions disposed in one of said links corresponding to the number of positions of said rotatable element.

115. In a calculating machine, means for deriving a mathematical computation between a plurality of any values, keys representing the values and controlling said deriving means, said deriving means comprising a plurality of sets of cams, a set of movable segments coacting with said cams, means controlling the release of said segments, a set of counter wheels coacting with said segments, carry-over means for said counter wheels, said carry-over means comprising hook members, corresponding to said counter wheels and pins respectively controlled by said counter wheels and controlling said hook members, means for effecting operative relation between said counter wheels and said segments, when said release controlling means is operated and said segments respectively move for extents of movement determined by said cams, recording means and means connecting said recording means and said segments.

116. A key, a stirrup carried by said key, a set of links extending through said stirrup, a lug on each of said links intermediate its length and positioned adjacent said stirrup when said key is in neutral position, a stop rod disposed to the rear of said links, a lug disposed on each link at the rearward end thereof and having two sides extending in relatively transverse directions and adapted to engage said stop rod when said key is in neutral position, a rest rod adapted to movably support said links when said key is in operated position, a determining finger pivotally carried at the forward end of each link and means for registering the mathematical value corresponding to the extent of movement of said determining finger.

In testimony whereof I have signed this specification this 28th day of May 1918.

MICHELE G. DE SIMONE.